United States Patent
Inoue

(10) Patent No.: US 12,451,964 B2
(45) Date of Patent: Oct. 21, 2025

(54) METHOD AND APPARATUS FOR CORRECTING OPTICAL WAVEFORM DISTORTION AND OPTICAL SIGNAL RECEIVING APPARATUS

(71) Applicant: NATIONAL INSTITUTE OF ADVANCED INDUSTRIAL SCIENCE AND TECHNOLOGY, Tokyo (JP)

(72) Inventor: Takashi Inoue, Ibaraki (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 247 days.

(21) Appl. No.: 18/283,208

(22) PCT Filed: Jan. 13, 2022

(86) PCT No.: PCT/JP2022/000917
§ 371 (c)(1),
(2) Date: Sep. 21, 2023

(87) PCT Pub. No.: WO2022/201763
PCT Pub. Date: Sep. 29, 2022

(65) Prior Publication Data
US 2024/0178919 A1    May 30, 2024

(30) Foreign Application Priority Data
Mar. 25, 2021  (JP) .................................. 2021-052107

(51) Int. Cl.
*H04B 10/2507* (2013.01)
*H04J 14/02* (2006.01)

(52) U.S. Cl.
CPC .......... *H04B 10/2507* (2013.01); *H04J 14/02* (2013.01); *H04J 14/0201* (2013.01)

(58) Field of Classification Search
CPC .... H04B 10/2507; H04J 14/02; H04J 14/0201
See application file for complete search history.

(56) References Cited

U.S. PATENT DOCUMENTS

2010/0232796 A1\* 9/2010 Cai ...................... H04B 10/677
  398/208
2015/0288458 A1\* 10/2015 Honda ............... H04B 10/6163
  398/81

(Continued)

FOREIGN PATENT DOCUMENTS

| JP | 2015-201726 | 11/2015 |
| JP | 2019-118018 | 7/2019 |

(Continued)

OTHER PUBLICATIONS

Simon Haykin, "Adaptive Filter Theory (Third Editon)", Dec. 27, 1995, pp. 1-77, Prentice Hall.

(Continued)

*Primary Examiner* — Rhonda S Peace
(74) *Attorney, Agent, or Firm* — JCIPRNET

(57) ABSTRACT

This method includes optimizing, by a gradient descent method, a first parameter used in back propagation processing and associated with XPM and a second parameter used in the back propagation processing and associated with SPM and XPM, wherein the back propagation processing is processing to estimate a waveform at a time of transmission by alternately calculating linear terms and nonlinear terms in a nonlinear Schrödinger equation after receiving an optical signal whose waveform shape changed in a transmission line and digitizing a waveform of the received optical signal, and correct, for each channel of plural channels in the transmission line at a time of wavelength-division multiplexing (Continued)

transmission, waveform distortion caused by SPM that occurs in the channel and waveform distortion caused by XPM that occurs in relation with channels other than the channel; and executing the back propagation processing by using the optimized first and second parameters.

5 Claims, 40 Drawing Sheets

(56) References Cited

U.S. PATENT DOCUMENTS

| | | | |
|---|---|---|---|
| 2018/0343058 A1 | 11/2018 | Harley et al. | |
| 2018/0343059 A1 | 11/2018 | Harley et al. | |
| 2018/0343078 A1 | 11/2018 | Roberts et al. | |
| 2019/0266480 A1 | 8/2019 | Zhang et al. | |
| 2020/0036468 A1 | 1/2020 | Roberts et al. | |
| 2022/0094440 A1* | 3/2022 | Okamoto | H04B 10/6161 |
| 2022/0131619 A1 | 4/2022 | Sasai et al. | |
| 2023/0409877 A1* | 12/2023 | Koike Akino | G06N 3/08 |
| 2024/0178919 A1* | 5/2024 | Inoue | H04B 10/2543 |

FOREIGN PATENT DOCUMENTS

| | | |
|---|---|---|
| JP | 2020-145561 | 9/2020 |
| WO | 2018215850 | 11/2018 |

OTHER PUBLICATIONS

EZRA IP et al., "Compensation of Dispersion and Nonlinear Impairments Using Digital Backpropagation", Journal of Lightwave Technology, Oct. 15, 2008, pp. 3416-3425, vol. 26, No. 20.

Govind P. Agrawal, "Nonlinear Fiber Optics (Third Edition)", Jan. 17, 2001, pp. 1-466, Academic Press.

Eduardo F. Mateo et al., "Efficient compensation of inter-channel nonlinear effects via digital backward propagation in WDM optical transmission", Optics Express, Jul. 5, 2010, pp. 15144-15154, vol. 18, No. 14.

Takahito Tanimura et al., "Semi-blind Nonlinear Equalization in Coherent Multi-Span Transmission System with Inhomogeneous Span Parameters", 2010 Conference on Optical Fiber Communication (OFC/NFOEC), collocated National Fiber Optic Engineers Conference, Mar. 21, 2010, pp. 1-3.

Christian Hager et al., "Nonlinear Interference Mitigation via Deep Neural Networks", 2018 Optical Fiber Communications Conference and Exposition (OFC), Mar. 13, 2018, pp. 1-3.

Qirui Fan et al., "Advancing theoretical understanding and practical performance of signal processing for nonlinear optical communications through machine learning", Nature Communications, Jul. 23, 2020, pp. 1-11, vol. 11, No. 3694.

Bertold Ian Bitachon et al., "Deep learning based digital backpropagation demonstrating SNR gain at low complexity in a 1200 km transmission link", Optics Express, Sep. 28, 2020, pp. 1-17, vol. 28, No. 20.

Juntang Zhuang et al., "AdaBelief Optimizer: Adapting Stepsizes by the Belief in Observed Gradients", retrieved from arXiv database, arXiv:2010.07468v5 [cs.LG], Dec. 20, 2020, pp. 1-30.

"International Search Report (Form PCT/ISA/210) of PCT/JP2022/000917", mailed on Mar. 29, 2022, with English translation thereof, pp. 1-4.

"Written Opinion of the International Searching Authority (Form PCT/ISA/237) of PCT/JP2022/000917", mailed on Mar. 29, 2022, with English translation thereof, pp. 1-6.

\* cited by examiner (a)

(b)

○ [EMBODIMENT] BACK PROPAGATION WITH LEARNING [$P_{in}$ = 1dBm]
(1 step/span; SPM AND XPM ARE CORRECTED)

+ BACK PROPAGATION WITH LEARNING [$P_{in}$ = 0dBm]
(1 step/span; ONLY SPM IS CORRECTED)

△ BACK PROPAGATION WITHOUT LEARNING [$P_{in}$ = 0dBm]
(2 steps/span; ONLY SPM IS CORRECTED)

□ NO NONLINEAR WAVEFORM DISTORTION CORRECTION [$P_{in}$ = -1dBm]

○ [EMBODIMENT] BACK PROPAGATION WITH LEARNING [$P_{in}$ = 1dBm]
(1 step/span; SPM AND XPM ARE CORRECTED)

+ BACK PROPAGATION WITH LEARNING [$P_{in}$ = 0dBm]
(1 step/span; ONLY SPM IS CORRECTED)

△ BACK PROPAGATION WITHOUT LEARNING
(APPLY TRUE VALUES) [$P_{in}$ = 0dBm]
(2 steps/span; ONLY SPM IS CORRECTED)

□ NO NONLINEAR WAVEFORM DISTORTION CORRECTION [$P_{in}$ = -1dBm]

○ [EMBODIMENT] BACK PROPAGATION WITH LEARNING [$P_{in}$ = 0dBm]
(1 step/span; SPM AND XPM ARE CORRECTED)

+ BACK PROPAGATION WITH LEARNING [$P_{in}$ = -1dBm]
(1 step/span; ONLY SPM IS CORRECTED)

△ BACK PROPAGATION WITHOUT LEARNING [$P_{in}$ = -1dBm]
(2 steps/span; ONLY SPM IS CORRECTED)

□ NO NONLINEAR WAVEFORM DISTORTION CORRECTION [$P_{in}$ = -2dBm]

METHOD AND APPARATUS FOR CORRECTING OPTICAL WAVEFORM DISTORTION AND OPTICAL SIGNAL RECEIVING APPARATUS

CROSS-REFERENCE TO RELATED APPLICATION

This application is a 371 application of the International PCT application serial no. PCT/JP2022/000917, filed on Jan. 13, 2022, which claims the priority benefits of Japan Patent Application No. 2021-052107, filed on Mar. 25, 2021. The entirety of each of the above-mentioned patent applications is hereby incorporated by reference herein and made a part of this specification.

TECHNICAL FIELD

The present invention is a technique for correcting signal waveform distortion caused by nonlinearity of optical fibers in optical signal transmission using the optical fibers.

BACKGROUND ART

Optical fiber transmission lines have various factors that cause the signal waveform distortion. Among these distortions, it is known that waveform distortion caused by a linear frequency response of a transmission line such as group velocity dispersion can be effectively corrected by a linear adaptive equalizer (see, for example, Non-Patent Literature 1). On the other hand, the property of the optical fiber causes a phenomenon that is called the Kerr effect in which the refractive index becomes high in proportion to the intensity of incident light, and a combination of this effect and a group velocity dispersion effect distorts a waveform of an optical signal that propagates through the optical fiber. Hereinafter, this distortion will be referred to as nonlinear waveform distortion. In case where plural optical signals with different frequencies or wavelengths are multiplexed by Wavelength-Division Multiplexing (WDM) and are transmitted through optical fibers, phase shift that occurs in a waveform of a signal channel due to the occurrence of the Kerr effect during propagation is called Self-Phase Modulation (SPM), and phase shift caused by interactions of waveforms in different channels is called Cross-Phase Modulation (XPM). Nonlinear waveform distortion caused by a combination of these phase shifts and the group velocity dispersion effect cannot be effectively corrected by the linear adaptive equalizer.

As a method for correcting nonlinear waveform distortion, Digital Back Propagation (DBP) has been proposed (see, for example, Non-Patent Literature 2). This method uses the following nonlinear Schrödinger equation for describing optical wave propagation in an optical fiber.

[Expression 1]

$$i\frac{\partial A_p}{\partial z} + \frac{\beta_2}{2}\frac{\partial^2 A_p}{\partial t^2} - i\frac{\beta_3}{6}\frac{\partial^3 A_p}{\partial t^3} - \frac{8}{9}\gamma_0\left(|A_p|^2 + \delta|A_{3-p}|^2\right)E_p = -i\frac{\alpha}{2}A_P \quad (1)$$

And, a Digital Signal Processor (DSP) in a receiver estimates the waveform at a time of transmission, and corrects waveform distortion by performing calculation for propagating a received waveform of the optical signal in an opposite direction of a transmission line. Here, $A_p$ (z, t) represents a complex envelope amplitude of an optical signal waveform corresponding to either of two orthogonal polarization components (p=1, 2), and is a function of a distance z in a longitudinal direction of a fiber and a time t. Note that Fourier transform is defined as follows as a precondition of expression (1).

[Expression 2]

$$\tilde{A}(\omega) = \mathcal{F}[A(t)] = \int_{-\infty}^{\infty} A(t)e^{-i\omega t}dt \quad (2)$$

$\beta_2$ and $\beta_3$ represent second-order and third-order group velocity dispersions of an optical fiber, and $\alpha$ represents a propagation loss coefficient. Furthermore, $\gamma_0$ represents a nonlinear coefficient, and furthermore, $\delta$ represents a coefficient that indicates a degree of cross-polarization phase modulation, and is generally put as $\delta=1$. When back propagation calculation according to expression (1) is performed, one span (that means an interval sandwiched by repeaters that perform optical amplification) of a transmission line is split into finite steps (sections), and calculation (linear step) in a case of only linear terms in expression (1) and calculation (nonlinear step) in a case of only nonlinear terms are alternately repeated in each step to approximately calculate $A_p$ (z, t) that is a solution of expression (1).

This calculation method is referred to as a split-step Fourier method (see, for example, Non-Patent Literature 3), and increasing the number of steps enhances calculation accuracy and improves performance of correcting nonlinear waveform distortion, yet increases a calculation amount simultaneously. Hence, to implement this method in a DSP having limited calculation resources, it is preferable to find a method for enhancing correction performance while reducing the calculation amount.

According to DBP proposed by Non-Patent Literature 2, only a single channel of a received signal waveform is usually extracted by a filter, only this waveform is back-propagated using expression (1), therefore, distortion caused by SPM in the nonlinear waveform distortion can be corrected, yet distortion caused by XPM cannot be corrected for a WDM signal. On the other hand, Non-Patent Literature 4 proposes DBP that approximately calculates the amount of phase shift caused by XPM for the WDM signal, and corrects the distortions of not only SPM but also XPM. However, this method has a problem that, when the number of steps per span in a transmission line is less than two, a calculation amount is a realistic amount, yet calculation accuracy is lowered and therefore correction performance deteriorates remarkably.

On the other hand, to correct the nonlinear waveform distortion by DBP, it is demanded to highly accurately estimate values of $\beta_2$, $\beta_3$, and $\gamma$ that are physical parameters of an optical fiber that is a transmission line, and use these values for calculation. Among these values, the values of $\beta_2$, $\beta_3$, and $\alpha$ indicating group velocity dispersion and propagation loss that are linear responses can be relatively accurately obtained. Especially, as a method for measuring a distribution in a longitudinal direction of $\alpha$, a method called Optical Time-Domain Reflectometry (OTDR) is available. Moreover, while it is difficult to obtain local values $\beta_2$ and $\beta_3$, it is possible to accurately measure an integral value in a measurement interval. However, it is not easy to directly measure the value of the nonlinear coefficient $\gamma$, and it is only possible to indirectly learn the value by, for example, estimating the value from an effective core cross-sectional area of the optical fiber. When the nonlinear waveform distortion correction is performed by DBP using wrong parameters as fiber parameters, a correction effect does not increase, and, on the contrary, the waveform distortion may become large.

Hence, Non-Patent Literature 5 proposes a method for learning optimal values of fiber parameters used by DBP by repeating trial of DBP using the steepest descent method such that a correction result of nonlinear waveform distortion becomes the best in a situation that true values of the fiber parameters are unknown.

Furthermore, Non-Patent Literature 6 uses a neural network to replace a linear step of the split-step Fourier method with a Finite Impulse Response (FIR) filter in a time domain, then allocate it to Affine transformation, and allocate a nonlinear step to an activation function, and thereby applies a DBP structure that uses the nonlinear Schrödinger equation to the neural network. By using, as initial values of Affine transformation connecting coefficients, FIR tap coefficients calculated from the group velocity dispersion among the fiber parameters estimated from a transmission line configuration, and training the neural network to maximize the nonlinear waveform distortion correction performance, it is possible to perform effective nonlinear waveform distortion correction, even when an arbitrary linear response that is not limited to the group velocity dispersion is included in the transmission line in a situation that optical fiber parameters are unknown.

While, generally, in a neural network used for a purpose of image recognition or the like, Affine transformation coefficients are initialized using random numbers, and a Rectified Linear Unit (ReLU) is frequently used as an activation function, the method according to Non-Patent Literature 6 uses physical parameters as initial values, moreover, applies nonlinear terms included in a physical evolution equation to the activation function, and therefore may be called a neural network specialized in physical phenomena. An additional effect obtained by this physical phenomenon-specialized neural network includes that the nonlinear waveform distortion correction performance does not deteriorate even when the number of steps per span is reduced. Non-Patent Literature 6 specifically reports a result that the neural networks whose number of steps per span are one and two respectively exceed the correction performance of the conventional DBP whose numbers of steps are two and three.

In response to this result, Non-Patent Literatures 7 and 8 report results of the nonlinear waveform distortion correction of the physical phenomenon-specialized neural networks under various conditions. However, every method that uses the physical phenomenon-specialized neural network targets at only a correction of waveform distortion caused by SPM, and does not take the distortion caused by XPM into account, and therefore cannot exhibit an effective correction performance for a WDM transmission system in which the distortion caused by XPM is a main waveform deterioration factor.

DBP proposed by Non-Patent Literature 2 targets at the correction of only waveform distortion caused by SPM, and therefore cannot correct the distortion caused by XPM. Non-Patent Literature 4 proposes a method for correcting the distortion caused by XPM in addition to SPM, yet has a problem in which the method cannot exhibit performance unless the number of steps that split one span is increased, and a calculation amount increases. Furthermore, these methods have a problem in which it is not possible to provide original performance when parameters of a transmission line are not accurately estimated and input.

Furthermore, the physical phenomenon-specialized neural network proposed by Non-Patent Literature 6 can exhibit optimal correction performance for the nonlinear waveform distortion caused by SPM by learning the parameters, yet cannot provide effectiveness for the distortion caused by XPM.

PRIOR TECHNICAL LITERATURES

Patent Literatures

Patent Literature 1: Patent Laid-Open No. 2020-145561

Non-Patent Literatures

Non-Patent Literature 1: S. Haykin, "Adaptive Filter Theory," Pearson (2013)
Non-Patent Literature 2: E. Ip and J. M. Kahn, "Compensation of Dispersion and Nonlinear Impairments Using Digital Backpropagation," J. Lightw. Technol., vol. 26, no. 20, pp. 3416-3425 (2008)
Non-Patent Literature 3: G. P. Agrawal, "Nonlinear Fiber Optics," Academic Press (2001)
Non-Patent Literature 4: E. F. Mateo, F. Yaman, and G. Li, "Efficient compensation of inter-channel nonlinear effects via digital backward propagation in WDM optical transmission," Opt. Express, vol. 18, no. 14, pp. 15144-15154 (2010)
Non-Patent Literature 5: T. Tanimura, T. Hoshida, T. Tanaka, L. Li, S. Oda, H. Nakashima, Z. Tao, and J. C. Rasmussen, "Semi-blind Nonlinear Equalization in Coherent Multi-Span Transmission System with Inhomogeneous Span Parameters," Proceedings of OFC/NFOEC2010, Paper OMR6
Non-Patent Literature 6: C. Hager and H. D. Pfister, "Nonlinear Interference Mitigation via Deep Neural Networks," Proceedings of OFC2018, Paper W3A.4
Non-Patent Literature 7: Q. Fan, G. Zhou, T. Gui, C. Lu, A. P. T. Lau, "Advancing theoretical understanding and practical performance of signal processing for nonlinear optical communications through machine learning," Nat. Commun, vol. 11, 3694 (2020)
Non-Patent Literature 8: B. Bitachon, A. Ghazisaeidi, M. Eppenberger, B. Baeuerle, M. Ayata, and J. Leuthold, "Deep learning based digital backpropagation demonstrating SNR gain at low complexity in a 1200 km transmission link," Opt. Express, vol. 28, no. 20, pp. 29318-29334 (2020)
Non-Patent Literature 9: J. Zhuang, T. Tang, Y. Ding, S. Tatikonda, N. Dvornek, X. Papademetris, and J. S. Duncan, "AdaBelief Optimizer: Adapting Step sizes by the Belief in Observed Gradients," arXiv, 2010.07468 (2020)

SUMMARY OF INVENTION

Problem to be Solved by Invention

Therefore, according to one aspect, an object of the present invention is to provide a new technique for suppressing a calculation amount for appropriately correcting waveform distortion caused by both of SPM and XPM, even when parameters of a transmission line are unknown.

Means to Solve Problem

A method for correcting optical waveform distortion, which relates to the present invention, includes (A) a step of optimizing, by a gradient descent method, a first parameter that is used in back propagation processing and is associated with cross-phase modulation and a second parameter that is used in the back propagation processing and is associated with self-phase modulation and the cross-phase modulation, wherein the back propagation processing is processing to estimate a waveform at a time of transmission by alternately calculating linear terms and nonlinear terms in a nonlinear Schrödinger equation after receiving an optical signal whose waveform shape changed in a transmission line and digitizing a waveform of the received optical signal, and correct, for each channel of plural channels in the transmission line at a time of wavelength division multiplexing transmission, waveform distortion caused by the self-phase modulation that occurs in the channel and waveform distortion caused by the cross-phase modulation that occurs in relation with channels other than the channel; and (B) a step of executing the aforementioned back propagation processing by using the optimized first and second parameters.

MODES TO IMPLEMENT PRESENT INVENTION

Basic Idea in Embodiment of Present Invention

Figure 1:
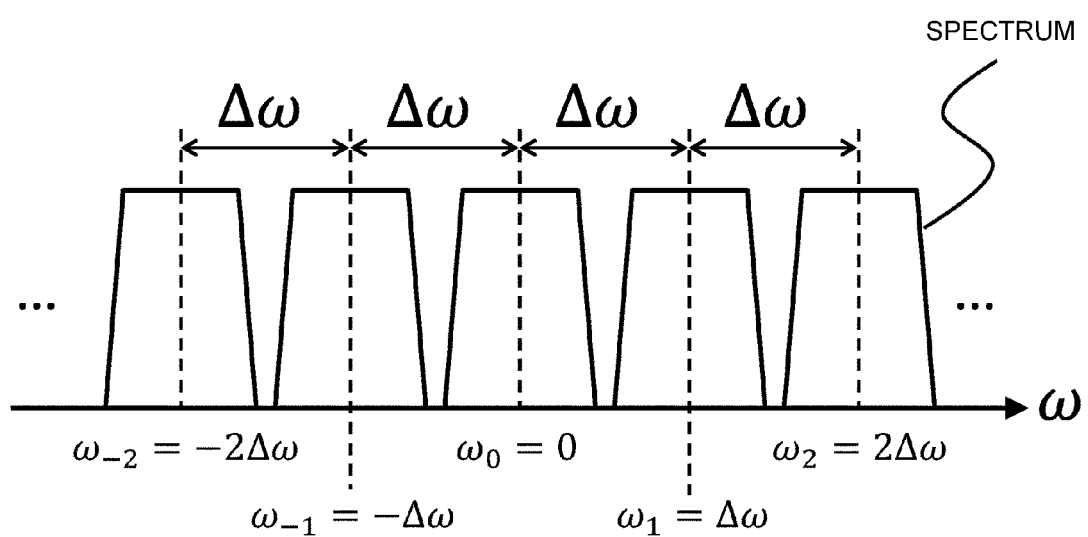
FIG. 1 is a diagram schematically illustrating the spectrum of a WDM signal.

A technique of correcting nonlinear waveform distortion according to the present embodiment targeting at a WDM signal whose frequency interval is $\Delta\omega$ will be described. FIG. 1 is a schematic view of the spectrum of the WDM signal. Here, a signal to be corrected is a channel number 0, the center frequency of this signal takes a reference value $\omega_0=0$, and the center frequency of a signal of another channel number n is $\omega_n=n\Delta\omega$ ($n=\pm 1, \pm 2$, and . . . ). In this case, an envelope amplitude in expression (1) is expressed as follows as a sum of envelope amplitudes of respective channels.

[Expression 3]

$$A_p(t) = \Sigma_n A_{p,n}(t) e^{i\omega_n t} \qquad (3)$$

In this regard, $A_{p,n}(t)$ represents an envelope amplitude of a baseband (that means that the center frequency is 0) related to a polarization component p of the channel n.

Moreover, only the linear terms of the nonlinear Schrödinger equation expressed in expression (1) are written out as follows.

[Expression 4]

$$i\frac{\partial A_p}{\partial z} + \frac{\beta_2}{2}\frac{\partial^2 A_p}{\partial t^2} - i\frac{\beta_3}{6}\frac{\partial^3 A_p}{\partial t^3} = -i\frac{\alpha}{2}A_p \qquad (4)$$

A solution of expression (4) for a waveform obtained by using, as an input, a waveform $A_{p,n}$ at a coordinate z=0 (z=0, t) in a longitudinal direction of an optical fiber and after propagation over a distance h can be separated for each channel in a frequency domain and is as follows.

[Expression 5]

$$\tilde{A}_{p,n}(h, \omega) = \tilde{A}_{p,n}(0, \omega) \exp\left[i(D_2\omega^2 + D_3\omega^3 - T_n\omega) - \frac{\alpha}{2}h\right] \qquad (5)$$

Here, $D_2(h) = -\beta_2 h/2$ and $D_3 = -\beta_3 h/6$ are respective cumulative values of second-order and third-order group velocity dispersions. Furthermore, $T_n(h, \omega_n) = (\beta_2\omega_n + \beta_3\omega_n^2/2)h$ represents group delay (walk-off) produced in the signal of the channel number n. The waveform of expression (5) is represented in a time domain using an operator F that represents Fourier transform as follows.

[Expression 6]

$$A_{p,n}(h, t) = \exp\left(-\frac{\alpha}{2}h\right)\mathcal{F}^{-1}\exp\left[i(D_2\omega^2 + D_3\omega^3 - T_n\omega)\right]\mathcal{F}A_{p,n}(0, t) \qquad (6)$$

On the other hand, only nonlinear terms in the nonlinear Schrödinger equation (1) are written out as follows.

[Expression 7]

$$i\frac{\partial A_p}{\partial z} - \frac{8}{9}\gamma_0 \left(|A_p|^2 + \delta|A_{3-p}|^2\right) A_p = -i\frac{\alpha}{2}A_p \quad (7)$$

Here, a term of propagation loss on the right side is originally a linear term, yet is included to take into account a change of nonlinearity that occurs as a signal intensity attenuates due to propagation loss. In a case where an envelope amplitude $B_p$ is defined as $A_p = B_p(z)\exp(-\alpha z/2)$, $B_p$ represents an amplitude from which the attenuation amount due to propagation loss is separated, and expression (7) is expressed for $B_p$ as follows.

[Expression 8]

$$i\frac{\partial B_p}{\partial z} - \frac{8}{9}\gamma(z)\left(|B_p|^2 + \delta|B_{3-p}|^2\right)B_p = 0 \quad (8)$$

Here, $\gamma(z) = \gamma_0 \exp(-\alpha z)$ holds.

Expression (8) expresses that, when a signal amplitude attenuates due to the propagation loss, a nonlinear effect in the nonlinear Schrödinger equation can be described in such a way that the original nonlinear coefficient $\gamma_0$ attenuates in the longitudinal direction. When expression (8) is decomposed for each channel, the amplitude of the channel number 0 is expressed as follows.

[Expression 9]

$$\frac{\partial B_{p,0}}{\partial z} =$$

$$-i\frac{8}{9}\gamma(z)\left[|B_{p,0}|^2 + \delta|B_{3-p,0}|^2 + \sum_{n\neq 0}\left\{2|B_{p,n}|^2 + \delta|B_{3-p,n}|^2\right\}\right]B_{p,0} \quad (9)$$

On the right side of expression (9), a term including $|B_{p, 0}|$ (p=1, 2) that is a time waveform of the signal intensity of the channel number 0 causes SPM, and a term including $|B_{p, n}|$ (p=1, 2) that is a time waveform of the signal intensity of the channel number $n\neq 0$ causes XPM.

As proposed by Non-Patent Literature 4, by introducing some assumptions related to a change of the waveform at a time of propagation in expression (9), it is possible to obtain an approximate solution. The first assumption is that, supposing that a time waveform intensity of the signal of the channel number 0 is invariable with respect to the distance z, $|B_{p, 0}(z, t)|^2 = |B_{p, 0}(0, t)|^2$ is assumed, and this assumption is usually used for calculation of the split-step Fourier method.

The second assumption is that, while a time waveform of the signal intensity of the channel number $n\neq 0$ is invariable with respect to the distance z, $|B_{p, n}(z, t)|^2 = |B_{p, n}(0, t-d_n z)|^2$ is assumed taking the occurrence of the group delay due to walk-off into account. This equation expresses that, while the shape of the intensity does not depend on a propagation distance and is kept as the initial waveform, the delay $d_n z$ proportional to the propagation distance occurs in a time domain. Here, do expressed below represents a parameter that represents walk-off, and corresponds to a reciprocal of the group velocity.

[Expression 10]

$$d_n = \beta_2 \omega_n + \frac{\beta_3}{2}\omega_n^2 \quad (10)$$

As a result of introduction of the assumptions, it is possible to integrate expression (9) with z in the frequency domain, and obtain a following solution for the waveform after propagation over the distance h.

[Expression 11]

$$B_{p,0}(h, t) = B_{p,0}(0, t)\exp\left[i\{\varphi_{SPM}(h, t) + \varphi_{XPM}(h, t)\}\right] \quad (11)$$

[Expression 12]

$$\varphi_{SPM}(h, t) = gH_0(h)[P_{p,0}(t) + \delta P_{3-p,0}(t)] \quad (12)$$

[Expression 13]

$$\varphi_{XPM}(h, t) = g\mathcal{F}^{-1}\left[\sum_{n\neq 0} H_n(h, \omega)\{2\tilde{P}_{p,n}(\omega) + \delta\tilde{P}_{3-p,n}(\omega)\}\right] \quad (13)$$

In this regard, when the integration of the length h is performed with respect to the distance z to derive expressions (11) to (13), an integration interval is [−h/2, h/2]. Moreover, symbols used for these expressions are defined as follows.

[Expression 14]

$$g = -\frac{8}{9}\gamma_0, \quad (14)$$

$$P_{p,0}(t) = |B_{p,0}(t)|^2, \quad \tilde{P}_{p,n}(\omega) = \mathcal{F}\left[|B_{p,n}(t)|^2\right],$$

$$H_0(h) = \frac{2}{\alpha}\sinh\left(\frac{\alpha h}{2}\right), \quad H_n(h, \omega) = \frac{2}{k_n}\sinh\left(\frac{k_n h}{2}\right),$$

$$k_n(\omega) = \alpha_n + id_n\omega$$

The linear step of the split-step Fourier method is described by expression (6), and the nonlinear step that takes effects of both of SPM and XPM into account is described by expression (11) for the signal waveform of the channel number 0. Hereinafter, a method for performing calculation of back-propagating an optical signal waveform received through a certain optical fiber transmission line based on these expressions, and estimating a transmitted waveform will be described.

Figure 2:
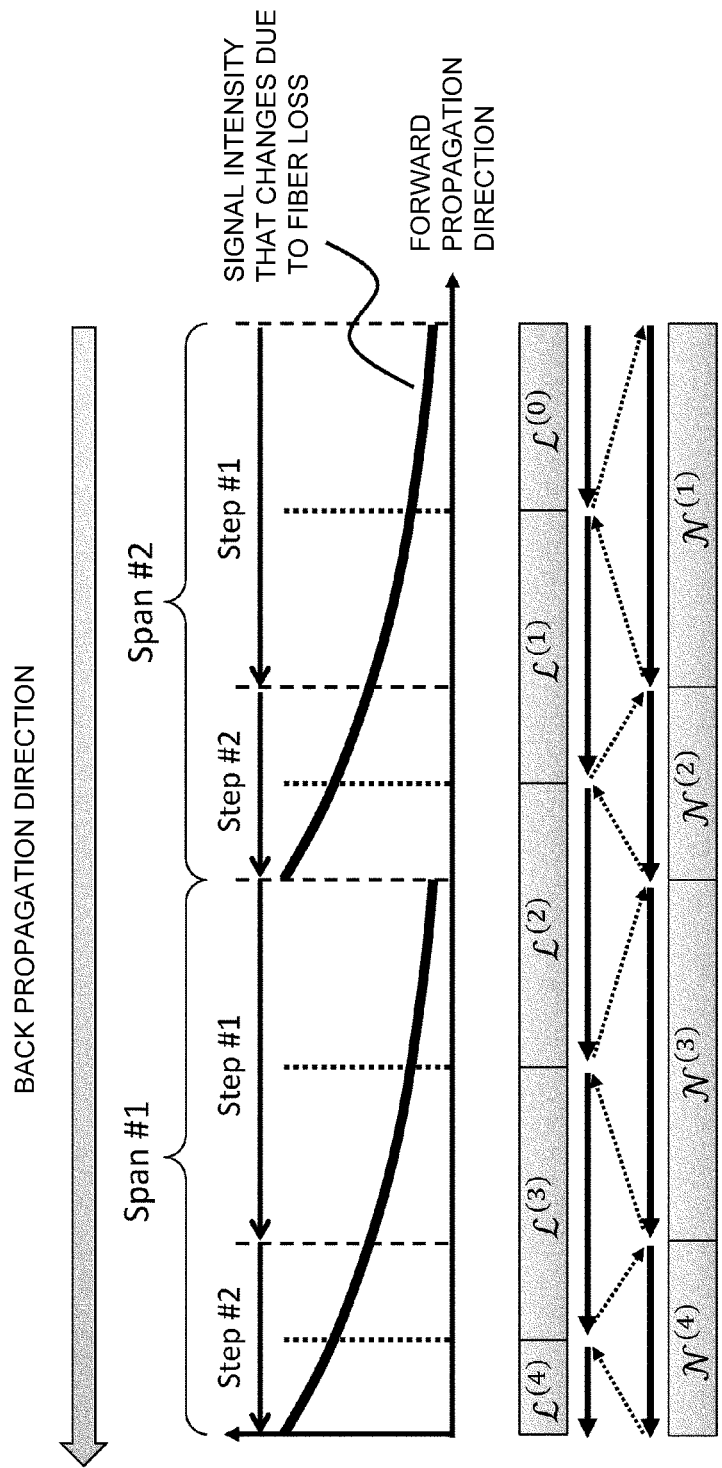
FIG. 2 is a diagram for describing a relationship between spans and steps.

To describe a procedure of back propagation calculation, FIG. 2 illustrates a schematic view illustrating splitting of steps in a case where the number of steps per span is two in a transmission line whose number of spans is two, and a calculation order of the linear steps and the nonlinear steps. Note that even in a case of a different number of spans or a different number of steps, FIG. 2 can be easily generalized. In FIG. 2, a direction from the left to the right is a forward propagation direction, and spans 1 and 2 are defined from a start point to an end point. On the contrary, a direction from the right to the left is a back propagation direction, and steps 1 and 2 are defined in the back propagation direction in each span. The ratio of the lengths of respective steps is not equipartitioned in each span, and is set such that each integral value of the nonlinear coefficient $\gamma(z) = \gamma_0 \exp(-\alpha z)$ that takes into account attenuation of signal power due to fiber loss is equal. In a case where, for example, the number of steps is two, and in a case where a start point of the span is put as z=0, an end point is put as $z=z_s$, and split of the steps is put as $z=z_1$, $z_1$ is defined such that a following expression holds.

[Expression 15]

$$\int_0^{z_1} \gamma(z)dz = \int_{z_1}^{z_S} \gamma(z)dz \tag{15}$$

Note that, even in a case where the ratio of the lengths of respective steps is equally partitioned in the span, the present embodiment is applicable as is. Moreover, although a difference in how to split steps in a span influences a waveform distortion correction result according to the methods that are described in Non-Patent Literatures 2 and 4 and do not perform the learning, Non-Patent Literatures 5 to 8 and the present embodiment, which perform the learning, do no more than influence only initial value setting of the learning, and have no difference after the learning converges and is optimized. Moreover, in a case where the number of steps per span is one, the entire one span is calculated as one step.

Next, when calculation of each step is performed, calculation is performed based on the "symmetrical type" split-step Fourier method (see Non-Patent Literature 3). That is, one step whose distance is h is equally split into a first half and a second half, and calculation that uses expression (6) as the linear step is first performed on a distance h/2 of the first half of the step.

Next, by using a waveform obtained as an output of the linear step as an input, calculation according to expression (11) of the nonlinear step is performed on the distance h of the entire step. Lastly, by using a waveform obtained as an output of the nonlinear step as an input, calculation according to expression (6) of the linear step is performed on the distance h/2 of the second half of the step. Although this operation is repeated per step, calculation is performed for the linear step of a second half of a certain step together with the linear step of a first half of a next step.

In the example in FIG. 2, after a step #1 in a span #2 is split into two, calculation for a linear step $L^{(0)}$ of the first half is performed for the input waveform, and calculation for a nonlinear step $N^{(1)}$ is performed, then calculation for $L^{(1)}$ obtained by coupling the linear step of the first half of the step #1 and a step #2 of the span #2 is performed, and calculation is performed likewise thereafter. In a transmission line whose number of spans is $N_{span}$, and whose number of steps per span is $N_{step}$, in a case where $m=N_{span} \times N_{step}$ is put, there are (m+1) linear steps and m nonlinear steps in total. In the example in FIG. 2, $N_{span}=2$ and $N_{step}=2$ hold, and therefore m=4 holds, the number of linear steps is m+1=5 times from $L^{(0)}$ to $L^{(4)}$, and the number of nonlinear steps is m=4 times from $N^{(1)}$ to $N^{(14)}$.

Figure 3:
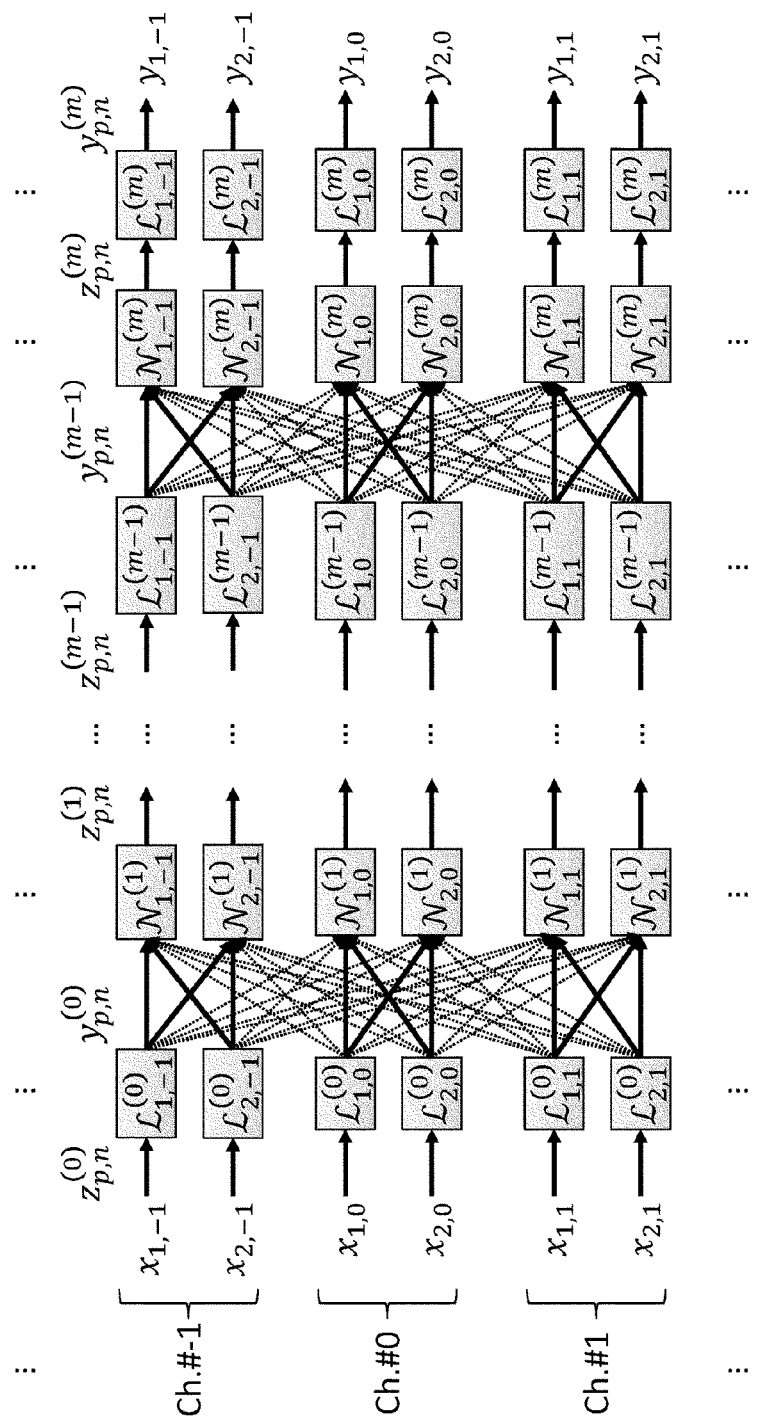
FIG. 3 is a schematic diagram illustrating linear steps, nonlinear steps, and a route of each channel signal component.

Although a signal waveform of each channel independently develops in the linear step of expression (6), signal waveforms of other channels are taken into account to perform calculation taking XPM into account when development of a signal waveform of one channel is calculated in the nonlinear step indicated in expressions (11) to (13). FIG. 3 illustrates a back propagation calculation procedure that indicates this process. As described above, the linear steps and the nonlinear steps are alternately calculated. In the back propagation calculation, an input waveform of the channel number n and the polarization component is put as $x_{p,n}$, and an output waveform is put as $y_{p,n}$. In this regard, $x_{p,n}$ represents a waveform received by a receiver after the transmission, and $y_{p,n}$ corresponds to an estimation result of a transmitted waveform.

In a case where the input and output waveforms in a j-th linear step $L^{(j)}$ are put as $z_{p,n}^{(j)}$ and $y_{p,n}^{(j)}$, input/output waveforms of a nonlinear step $N^{(j)}$ are $y_{p,n}^{(j-1)}$ and $z_{p,n}^{(j)}$. Moreover, as illustrated in FIG. 3, $z_{p,n}^{(0)}=x_{p,n}$ and $y_{p,n}^{(m)}=y_{p,n}$ hold. In a case where the output waveform $y_{p,n}^{(j)}$ of $L^{(j)}$ is input to $N^{(j+1)}$, a route indicated by a solid line arrow is a flow of waveform data to calculate the phase shift due to SPM in a channel, which is indicated by expression (12), and a route indicated by a dotted line arrow is a flow of waveform data to calculate the phase shift due to XPM between channels, which is indicated by expression (13).

Next, a method according to the present embodiment for optimizing parameters used for the back propagation calculation by the gradient descent method, and maximizing the performance of the nonlinear waveform distortion correction will be described. A specific learning method will be described below. An error function $J(\theta)$ is defined as follows.

[Expression 16]

$$J(\theta) = \Sigma_t |e_t(\theta)|^2 \tag{16}$$

Here, $\theta$ represents a vector including the parameters used for the back propagation calculation, and $e_t(\theta)=y_t(\theta)-d_t$ represents an error at a time t. $y_t(\theta)$ represents a value of the signal waveform at the time t after the back propagation calculation and is regarded as a function of the parameter $\theta$, and $d_t$ represents a value of a desired signal at the time t. Here, a waveform of a transmitted signal is used as the desired signal.

Here, a form of the error function in equation (16) is referred to as a Mean Squared Error (MSE). A dataset is composed by plural sets of the waveform $d_t$ of the transmitted signal and a waveform $y_t(\theta)$ obtained after calculation for a back propagation transmission line of the parameter $\theta$ is performed, and the parameter $\theta$ is optimized so as to minimize the error function $J(\theta)$ by the stochastic gradient descent method based on repeated calculation. As described in Non-Patent Literature 1, an update formula for the parameter $\theta$ based on the stochastic gradient descent method can be obtained as follows.

[Expression 17]

$$\theta_{i+1} = \theta_i - \frac{\eta}{2}\nabla J \tag{17}$$

In this regard, $\theta_i$ represents a parameter vector that is obtained as an i-th update result, $\eta$ represents a minute positive number for determining a learning speed, and $\nabla J$ represents a gradient of the error function for the parameter and is calculated as represented in a following expression.

[Expression 18]

$$\nabla J = \frac{\partial J}{\partial \theta} = \sum_t \frac{\partial}{\partial \theta} |e_t(\theta)|^2 = 2\sum_t \text{Re}\left[\frac{\partial e_t}{\partial \theta} e_t^*\right] \tag{18}$$

Here, the desired signal, that is, the transmitted signal does not depend on the parameter $\theta$, and a following expression is held.

[Expression 19]

$$\frac{\partial e_t}{\partial \theta} = \frac{\partial y_t}{\partial \theta} \tag{19}$$

Therefore, the update formula for the parameter can be eventually obtained as follows.

[Expression 20]

$$\theta_{i+1} = \theta_i - \eta \sum_t \mathrm{Re}\left[\frac{\partial y_t}{\partial \theta}(y_t^* - d_t^*)\right] \quad (20)$$

When all parameters that are elements of θ and are being subjected to the back propagation calculation are updated using expression (20), ∂y$_t$/∂θ that is a gradient for each parameter is used for the output signal y$_t$. A calculation formula for calculating this is derived according to the differential chain rule.

According to expression (6), the relationship between the input and output waveforms $z_{p,n}^{(j)}$ and $y_{p,n}^{(j)}$ in the linear step $L_{p,n}^{(j)}$ is as follows.

[Expression 21]

$$y_{p,n}^{(j)} = e^{-\frac{\alpha}{2}h}\mathcal{F}^{-1}e^{i\left(D_2^{(j)}\omega^2 + D_3^{(j)}\omega^3 - T_n^{(j)}\omega\right)}\mathcal{F}z_{p,n}^{(j)} \quad (21)$$

By directly differentiating expression (21), the following expression can be obtained.

[Expression 22]

$$\frac{\partial y_{p,n}^{(j)}}{\partial D_2^{(j)}} = e^{-\frac{\alpha}{2}h}\mathcal{F}^{-1}(i\omega^2)e^{i\left(D_2^{(j)}\omega^2 + D_3^{(j)}\omega^3 - T_n^{(j)}\omega\right)}\mathcal{F}z_{p,n}^{(j)} \quad (22)$$

[Expression 23]

$$\frac{\partial y_{p,n}^{(j)}}{\partial D_3^{(j)}} = e^{-\frac{\alpha}{2}h}\mathcal{F}^{-1}(i\omega^3)e^{i\left(D_2^{(j)}\omega^2 + D_3^{(j)}\omega^3 - T_n^{(j)}\omega\right)}\mathcal{F}z_{p,n}^{(j)} \quad (23)$$

Consequently, it is possible to calculate gradients of $D_2^{(j)}$ and $D_3^{(j)}$ of the output waveform $y_{p,n}^{(j)}$ using the input waveform $z_{p,n}^{(j)}$. The gradients obtained here are sent to the next step according to the differential chain rule, and is finally modified in a form of gradients for the output waveform $y_{p,n} = y_{p,n}^{(m)}$. A gradient of $y_{p,n}^{(j)}$ for an arbitrary parameter ε included in a step before $L_{p,n}^{(j)}$ can be obtained as follows.

[Expression 24]

$$\frac{\partial y_{p,n}^{(j)}}{\partial \varepsilon} = e^{-\frac{\alpha}{2}h}\mathcal{F}^{-1}e^{i\left(D_2^{(j)}\omega^2 + D_3^{(j)}\omega^3 - T_n^{(j)}\omega\right)}\mathcal{F}\frac{\partial z_{p,n}^{(j)}}{\partial \varepsilon} \quad (24)$$

Consequently, it is possible to calculate the gradient of the output waveform $y_{p,n}^{(j)}$ for the parameter using a gradient $\partial z_{p,n}^{(j)}/\partial \varepsilon$ output from an immediately prior nonlinear step. In this regard, a walk-off value $T_n^{(j)}$ is expressed as follows using walk-off parameters $d_n^{(j)}$ and $d_n^{(j+1)}$ included in the nonlinear steps $N_{p,n}^{(j)}$ and $N_{p,n}^{(j+1)}$ before and after the linear step $L_{p,n}^{(j)}$.

[Expression 25]

$$T_n^{(0)} = \frac{h_1}{2}d_n^{(1)},\; T_n^{(j)} = \frac{h_j d_n^{(j)} + h_{j+1} d_n^{(j+1)}}{2},\; T_n^{(m)} = \frac{h_m}{2}d_n^{(m)} \quad (25)$$

Here, h$_j$ represents an interval width of the nonlinear step $N_{p,n}^{(j)}$.

Next, a relationship between the input and output waveforms $y_{p,n}^{(j)}$ and $z_{p,n}^{(j)}$ in the nonlinear step $N_{p,n}^{(j)}$ for the signal waveform of the channel 0 is as follows according to expression (11).

[Expression 26]

$$z_{p,0}^{(j)} = y_{p,0}^{(j-1)} \exp\left[i\varphi_{p,0}^{(j)}(t)\right] \quad (26)$$

[Expression 27]

$$\varphi_{p,0}^{(j)}(t) = g^{(j)}\mathcal{F}^{-1}\Big[H_0^{(j)}\big\{\tilde{P}_{p,0}^{(j-1)}(\omega) + \delta^{(j)}\tilde{P}_{3-p,0}^{(j-1)}(\omega)\big\} + \sum_{n \neq 0} H_n^{(j)}(\omega)\big\{2\tilde{P}_{p,n}^{(j-1)}(\omega) + \delta^{(j)}\tilde{P}_{3-p,n}^{(j-1)}(\omega)\big\}\Big] \quad (27)$$

[Expression 28]

$$H_0^{(j)} = \frac{2}{\alpha_0^{(j)}}\sinh\left(\frac{h}{2}\alpha_0^{(j)}\right),$$
$$H_n^{(j)}(\omega) = \frac{2}{k_n^{(j)}}\sinh\left(\frac{h}{2}k_n^{(j)}\right), \quad (28)$$
$$k_n^{(j)} = \alpha_n^{(j)} + id_n^{(j)}\omega$$

In this regard, $P_{p,n}^{(j-1)} = |y_{p,n}^{(j-1)}|^2$ represents the intensity of an input waveform $y_{p,0}^{(j-1)}$, and also has the following relationship.

[Expression 29]

$$\tilde{P}_{p,n}^{(j-1)}(\omega) = \mathcal{F}[P_{p,n}^{(j-1)}(t)] \quad (29)$$

Then, the gradient of the output waveform $z_{p,n}^{(j)}$ for parameters $g^{(j)}$, $\delta^{(j)}$, $\alpha_0^{(j)}$, $\alpha_n^{(j)}$, and $d_n^{(j)}$ used in the nonlinear step $N_{p,n}^{(j)}$ can be obtained as follows by directly differentiating expression (26).

[Expression 30]

$$\frac{\partial z_{p,0}^{(j)}}{\partial g^{(j)}} = i\mathcal{F}^{-1}\Big[H_0^{(j)}\big\{\tilde{P}_{p,0}^{(j-1)}(\omega) + \delta^{(j)}\tilde{P}_{3-p,0}^{(j-1)}(\omega)\big\} + \sum_{n \neq 0} H_n^{(j)}(\omega)\big\{2\tilde{P}_{p,n}^{(j-1)}(\omega) + \delta^{(j)}\tilde{P}_{3-p,n}^{(j-1)}(\omega)\big\}\Big]z_{p,0}^{(j)} \quad (30)$$

[Expression 31]

$$\frac{\partial z_{p,0}^{(j)}}{\partial \delta^{(j)}} = ig^{(j)}\mathcal{F}^{-1}\Big[H_0^{(j)}\tilde{P}_{3-p,0}^{(j-1)}(\omega) + \sum_{n \neq 0} H_n^{(j)}(\omega)\tilde{P}_{3-p,n}^{(j-1)}(\omega)\Big]z_{p,0}^{(j)} \quad (31)$$

[Expression 32]

$$\frac{\partial z_{p,0}^{(j)}}{\partial \alpha_0^{(j)}} = ig^{(j)}\frac{\partial H_0^{(j)}}{\partial \alpha_0^{(j)}}\left[P_{p,0}^{(j-1)}(t) + \delta^{(j)}P_{3-p,0}^{(j-1)}(t)\right]z_{p,0}^{(j)} \quad (32)$$

[Expression 33]

$$\frac{\partial z_{p,0}^{(j)}}{\partial \alpha_n^{(j)}} = ig^{(j)}\mathcal{F}^{-1}\left[\frac{\partial H_n^{(j)}(\omega)}{\partial \alpha_n^{(j)}}\big\{2\tilde{P}_{p,n}^{(j-1)}(\omega) + \delta^{(j)}\tilde{P}_{3-p,n}^{(j-1)}(\omega)\big\}\right]z_{p,0}^{(j)} \quad (33)$$

[Expression 34]

$$\frac{\partial z_{p,0}^{(j)}}{\partial d_n^{(j)}} = ig^{(j)}\mathcal{F}^{-1}\left[\frac{\partial H_n^{(j)}(\omega)}{\partial d_n^{(j)}}\big\{2\tilde{P}_{p,n}^{(j-1)}(\omega) + \delta^{(j)}\tilde{P}_{3-p,n}^{(j-1)}(\omega)\big\}\right]z_{p,0}^{(j)} \quad (34)$$

Consequently, it is possible to calculate the gradient using the output waveform $z_{p,n}^{(j)}$, the intensity $P_{p,n}^{(j-1)}$ of the input waveform, and a frequency waveform $\tilde{P}_{p,n}^{(j-1)}$ thereof (P~ is a symbol with ~ above P).

Moreover, for the gradient of $z_{p,n}^{(j)}$ for the arbitrary parameter included in a step before $N_{p,n}^{(j)}$, the following equations can be obtained by differentiating expression (26) with ε.

[Expression 35]

$$\frac{\partial z_{p,0}^{(j)}}{\partial \varepsilon} = \left[ i \frac{\partial \varphi_{p,0}^{(j)}}{\partial \varepsilon} y_{p,0}^{(j-1)} + \frac{\partial y_{p,0}^{(j-1)}}{\partial \varepsilon} \right] \exp\left[ i \varphi_{p,0}^{(j)}(t) \right] \quad (35)$$

[Expression 36]

$$\frac{\partial \varphi_{p,0}^{(j)}}{\partial \varepsilon} = g^{(j)} \mathcal{F}^{-1} \left[ H_0^{(j)} \left\{ \frac{\partial \tilde{P}_{p,0}^{(j-1)}(\omega)}{\partial \varepsilon} + \delta^{(j)} \frac{\partial \tilde{P}_{3-p,0}^{(j-1)}}{\partial \varepsilon} \right\} + \sum_{n \neq 0} H_n^{(j)}(\omega) \left\{ 2 \frac{\partial \tilde{P}_{p,n}^{(j-1)}}{\partial \varepsilon} + \delta^{(j)} \frac{\partial \tilde{P}_{3-p,n}^{(j-1)}}{\partial \varepsilon} \right\} \right] \quad (36)$$

Note that, although expressions (26) to (36) describe the calculation formulae in the nonlinear steps for the signal of the channel number 0, it is possible to describe a calculation formula likewise for a signal of a general channel number.

To sum up, expressions (22) and (23) are used in the linear step and equations (30) to (34) are used in the nonlinear step to respectively calculate the gradient of the output waveform of that step, which is represented by the parameters used in that step, and the calculation result is passed to a next step. Moreover, expression (24) is used in the linear step and expressions (35) and (36) are used in the nonlinear step to update the gradient passed from the previous step to a gradient of an output of that step, and the updated gradient is passed to a next step. By continuing such calculation from an input side to an output side, it is possible to calculate a gradient of the final output waveform $y_{p,n} = y_{p,n}^{(m)}$, which is represented by all parameters used for the back propagation calculation, and update the parameters according to expression (20).

Note that, in FIG. 3, the dispersion parameters $D_2^{(j)}$ and $D_3^{(j)}$ are shared between linear steps $L_{1,n}^{(j)}$ and $L_{2,n}^{(j)}$ for each orthogonal polarization component of the channel number n, and an average of gradients of both polarization components is collectively calculated when a gradient is calculated in the learning. Moreover, the parameters $g^{(j)}$, $\delta^{(j)}$, $\alpha_0^{(j)}$, $\alpha_n^{(j)}$, and $d_n^{(j)}$ are commonly used in the nonlinear steps $N_{1,n}^{(j)}$ and $N_{2,n}^{(j)}$ likewise.

Furthermore, in the example described below, for a signal other than a channel number n=0, calculation for the nonlinear step is not performed, and only calculation for the linear step is performed. Although XPM nor SPM is corrected in a case where calculation for the nonlinear step is ignored, it has been confirmed that it is possible to ignore the nonlinear waveform distortion produced in waveforms of channels other than the channel number n=0 when an influence caused by XPM on the channel of the channel number n=0 due to channels other than the channel number n=0 is calculated.

According to the above-described method, it is possible to optimize the transmission line parameters for correcting the nonlinear waveform distortion including XPM by the gradient descent method, and maximize the correction effect.

A method for reducing a calculation amount by selecting parameters to be optimized, and further applying approximation thereto will be described below.

Expression (23) expresses a method for calculating a gradient for the third-order group velocity dispersion of a transmission line, however, an influence of the third-order group dispersion on a waveform of a single channel is little to such a degree that this influence can be ignored for a signal whose symbol rate is several tens of Gbaud or less, therefore, a certain initial value can be set and then fixed without performing the learning, or a third-order group velocity dispersion effect itself can be also ignored. Here, it is assumed that the third-order group velocity dispersion is fixed without performing the learning after the initial value is set. In this regard, although the third-order group velocity dispersion causes walk-off between channels to change at a second-order with respect to a frequency difference between the channels, this effect is taken into account to set walk-off $T_n^{(j)}$ and an initial value of the walk-off parameter $d_n^{(j)}$.

Although expressions (32) and (33) express methods for calculating a gradient related to a loss coefficient of each channel, the loss coefficient is a parameter that can be easily measured, and therefore it is assumed that the initial value is kept fixed without calculating the gradient.

Figure 4A:
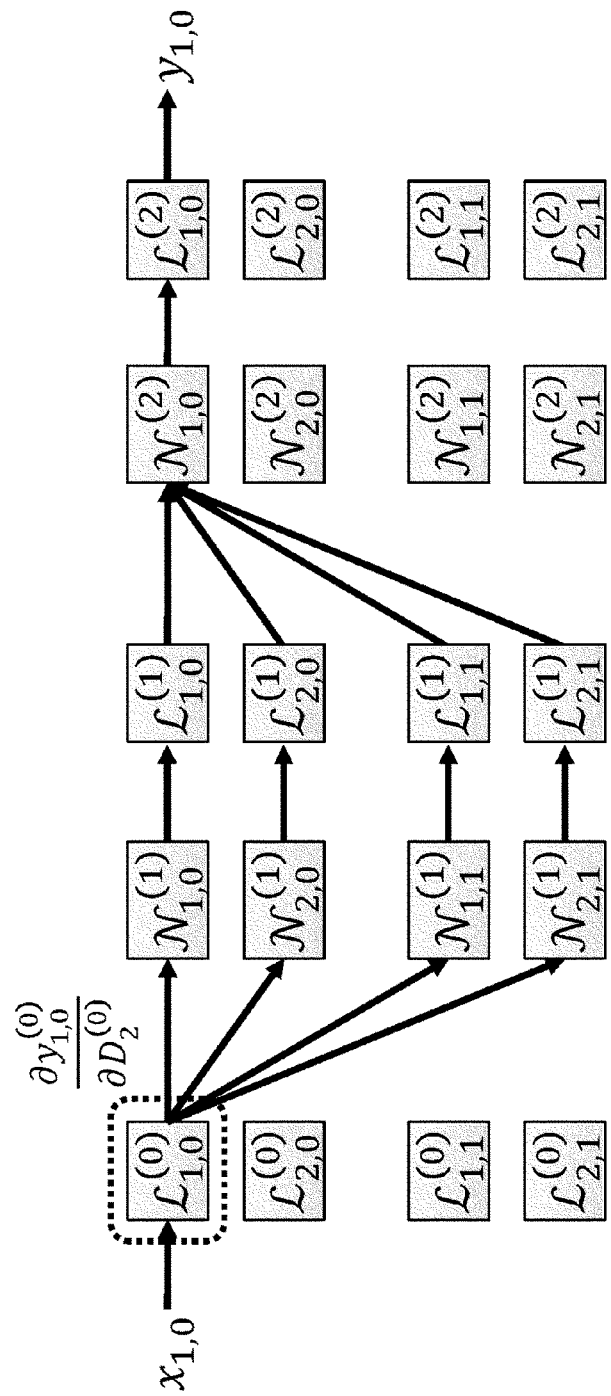
FIG. 4A is a diagram illustrating exact routes through which a gradient of $D_2^{(0)}$ spreads from a linear step $L_{1,0}^{(0)}$ and to later stages.
Figure 4B:
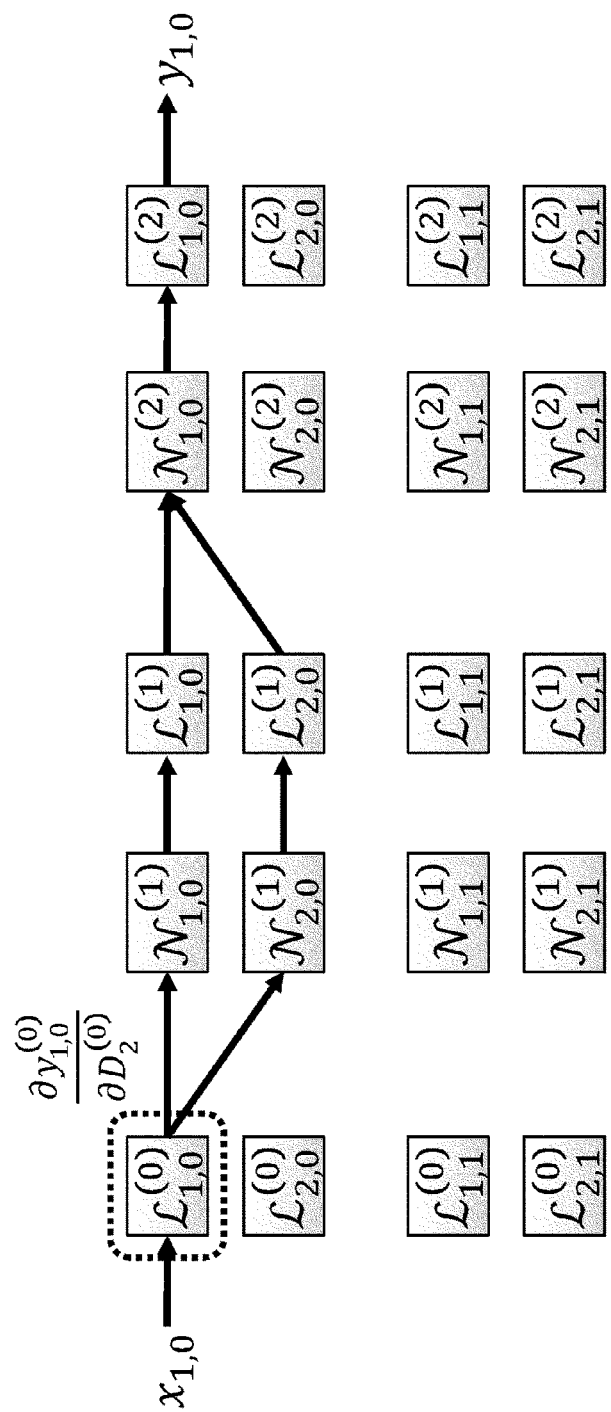
FIG. 4B is a diagram illustrating approximate routes through which the gradient of $D_2^{(0)}$ spreads from the linear step $L_{1,0}^{(0)}$ to the later stages.

Next, how the gradient propagates is restricted. FIGS. 4A and 4B illustrate routes of the linear step and the nonlinear step in a case of m=2 for the input waveforms $x_{p,n}$ (p=1, 2; n=0, 1) of dual-polarization signals of two channels whose channel numbers are n=0 and 1. In this regard, a route through which a gradient for the second-order group velocity $D_2^{(0)}$ used in a linear step $L_{1,0}^{(0)}$ reaches a step of a later stage will be considered.

An output waveform $y_{1,0}^{(0)}$ of the linear step $L_{1,0}^{(0)}$ is sent to a nonlinear step $N_{p,n}^{(1)}$ (p=1, 2; n=0, 1). An output waveform $z_{p,n}^{(1)}$ is calculated in each nonlinear step according to expressions (26) to (28), and a gradient $\partial z_{p,n}^{(1)}/\partial \varepsilon$ for $\varepsilon = D_2^{(0)}$ is calculated according to expressions (35) and (36) and sent to a subsequent step. The gradient for $D_2^{(0)}$ propagates to a nonlinear step $N_{1,0}^{(2)}$ via a linear step $L_{p,n}^{(1)}$ (p=1, 2; n=0, 1).

The solid lines in FIG. 4A indicate propagation routes of the gradient for $D_2^{(0)}$. However, when a value of $D_2^{(0)}$ commonly used in $L_{p,0}^{(0)}$ (p=1, 2) changes, $y_{p,0}^{(0)}$ influences the waveform of the channel number n=1 due to XPM, and an influence caused by XPM on a signal waveform $z_{p,0}^{(2)}$ of the channel number n=0 in a nonlinear step $N_{p,0}^{(2)}$ is very little, and can be ignored. Taking this into account, propagation routes of a gradient of the certain parameter can be limited in a channel, and are routes indicated by solid lines illustrated in FIG. 4B. In this case, a term including $H_n^{(j)}(\omega)$ is ignored in expression (36), and the following expression is obtained as a result.

[Expression 37]

$$\frac{\partial \varphi_{p,0}^{(j)}}{\partial \varepsilon} = g^{(j)} H_0^{(j)} \left\{ \frac{\partial P_{p,0}^{(j-1)}(t)}{\partial \varepsilon} + \delta^{(j)} \frac{\partial P_{3-p,0}^{(j-1)}(t)}{\partial \varepsilon} \right\}$$
$$= 2g^{(j)} H_0^{(j)} \operatorname{Re}\left[ \frac{\partial y_{p,0}^{(j-1)}}{\partial \varepsilon} \{y_{p,0}^{(j-1)}\}^* + \delta^{(j)} \frac{\partial y_{3-p,0}^{(j-1)}}{\partial \varepsilon} \{y_{3-p,0}^{(j-1)}\}^* \right] \quad (37)$$

To sum up the above-described method with the approximation, calculation can be performed in the linear step by using expression (21) as the development of the waveform, expression (22) as the calculation formula of the gradient related to second-order group velocity dispersion used in that step, and expression (24) as the update formula for the gradient related to the arbitrary parameter having propagated from a previous step. Moreover, in the nonlinear step, it is possible to use expressions (26) to (28) as the development of the waveform, expressions (30), (31), and (34) as the calculation formulae of the gradients related to the parameters $g^{(j)}$, $\delta^{(j)}$, and $d_n^{(j)}$ used in that step, and expressions (35) and (37) as the update formulae for the gradients related to the arbitrary parameter $\varepsilon$ having sent from a previous step.

Figure 5A:
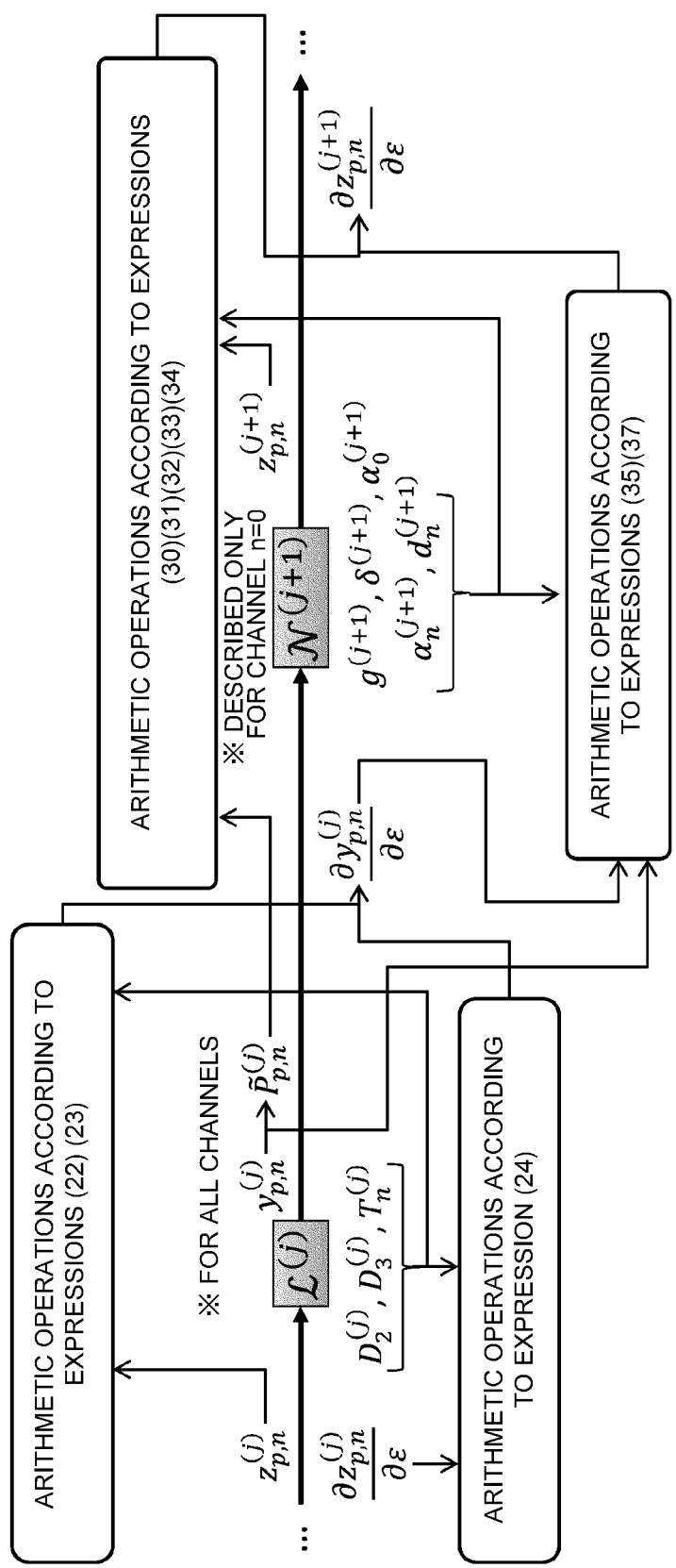
FIG. 5A is a diagram illustrating a flow of processing of calculating a gradient of a waveform by each transmission line parameter in parameter optimization processing.

FIG. 5A illustrates a flow of processing of calculating a gradient of a waveform by respective transmission line parameters in parameter optimization processing. Although the waveform is developed from $z_{p,n}^{(1)}$ to $y_{p,n}^{(j)}$ according to expression (21) in the linear step $L^{(j)}$, gradients $(\partial y_{p,n}^{(j)}/\partial D_2^{(j)}$ and $\partial y_{p,n}^{(j)}/\partial D_3^{(j)})$ of a waveform for each transmission line parameter ($D_2^{(j)}$ and $D_3^{(j)}$) used in $L^{(j)}$ are calculated by arithmetic operations according to expressions (22) and (23). Moreover, the gradients of the waveforms for all of the transmission line parameters ε included in a previous step before $L^{(j)}$ are calculated by an arithmetic operation according to expression (24), and $\partial z_{p,n}^{(j)}/\partial \varepsilon$ is updated to $\partial y_{p,n}^{(j)}/\partial \varepsilon$. $\partial y_{p,n}^{(j)}/\partial D_2^{(1)}$ and $\partial y_{p,n}^{(j)}/\partial D_3^{(j)}$ are included in $\partial y_{p,n}^{(j)}/\partial \varepsilon$, and are collectively sent to $N^{(j+1)}$ that is a next step.

Next, although the waveform is developed from $y_{p,n}^{(j)}$ to $z_{p,n}^{(j+1)}$ according to expressions (26) to (28) in a nonlinear step $N^{(j+1)}$, the gradient of the waveform ($\partial z_{p,n}^{(j+1)}/\partial g^{(j+1)}$, $\alpha z_{p,n}^{(j+1)}/\partial \delta^{(j+1)}$, $\partial z_{p,n}^{(j+1)}/\partial \alpha_0^{(j+1)}$, $\partial z_{p,n}^{(j+1)}/\partial \alpha_n^{(j+1)}$), and $\alpha z_{p,n}^{(j+1)}/\partial d_n^{(j+1)}$) for each transmission line parameter ($g^{(j+1)}$, $\delta^{(j+1)}$, $\alpha_0^{(j+1)}$, $\alpha_n^{(j+1)}$, and $d_n^{(j+1)}$, used in $N^{(j+1)}$ is calculated by arithmetic operations according to expressions (30) to (34). Moreover, the gradients of the waveforms for all of the transmission line parameters ε included in a step before $N^{(j+1)}$ are calculated by arithmetic operations according to expressions (35) and (37), and $\partial y_{p,n}^{(j)}/\partial \varepsilon$ is updated to $\partial z_{p,n}^{(j+1)}/\partial \varepsilon$. Note that expression (36) may be used instead of expression (37). $\partial z_{p,n}^{(j+1)}/\partial g^{(j+1)}$, $\partial z_{p,n}^{(j+1)}/\partial \delta^{(j+1)}$, $\alpha \delta^{(j+1)}$, $\partial z_{p,n}^{(j+1)}/\partial \alpha_0^{(j+1)}$, $\partial z_{p,n}^{(j+1)}/\partial \alpha_n^{(j+1)}$, and $\alpha z_{p,n}^{(j+1)}/\partial d_n^{(j+1)}$ are included in $\alpha z_{p,n}^{(j+1)}/\alpha \varepsilon$, and are collectively sent to $L^{(j+1)}$ that is a next step.

By repeating such calculation per step, $\alpha y_t/\partial \theta$ that is the gradient of a final output $y_t$ for all of the parameters θ in the transmission line is calculated.

Figure 5B:
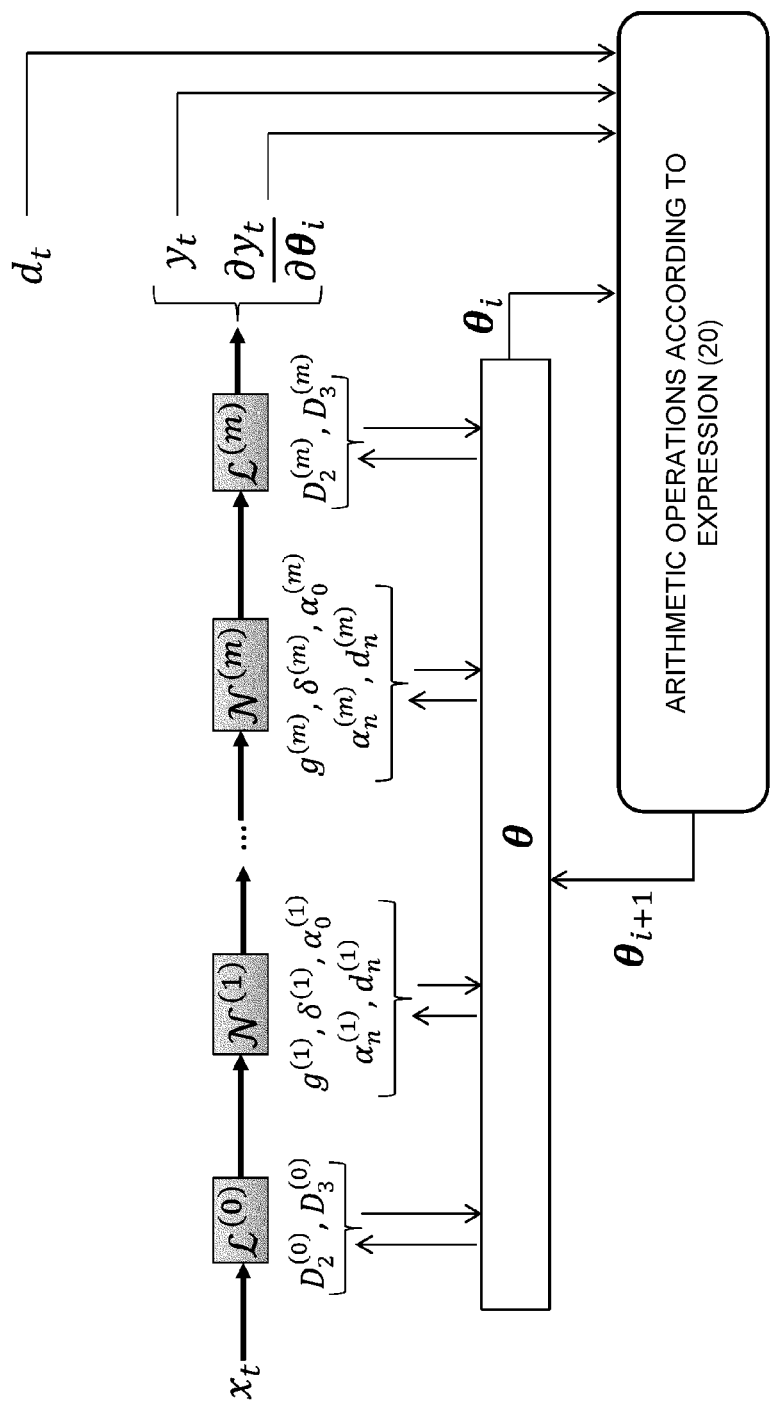
FIG. 5B is a diagram illustrating a processing flow of updating each transmission line parameter in the parameter optimization processing.

Furthermore, FIG. 5B illustrates a flow of processing of updating each transmission line parameter in the parameter optimization processing. That is, the output waveform $y_t$, a gradient $\partial y_t/\partial \theta_i$ for each transmission line parameter $\theta_i$ and the desired signal $d_t$ are used to update the transmission line parameter $\theta_i$ of an i-th step using expression (20). As illustrated in FIG. 5B, the transmission line parameters $D_2$ and $D_3$ are updated in the linear step, and g, δ, $\alpha_0$, $\alpha_n$, and $d_n$ are updated as the transmission line parameters θ in the nonlinear step.

Note that, in a case where it is found that the loss coefficients $\alpha_0$ and $\alpha_n$ of the optical fiber and a value of the coefficient δ that corresponds to cross-polarization cross phase modulation is one, learning these transmission line parameters may be omitted. Moreover, in a case where the third-order dispersion effect in a channel can be ignored, the learning of $D_3$ may be omitted.

System Configuration According to Embodiment

Figure 5C:
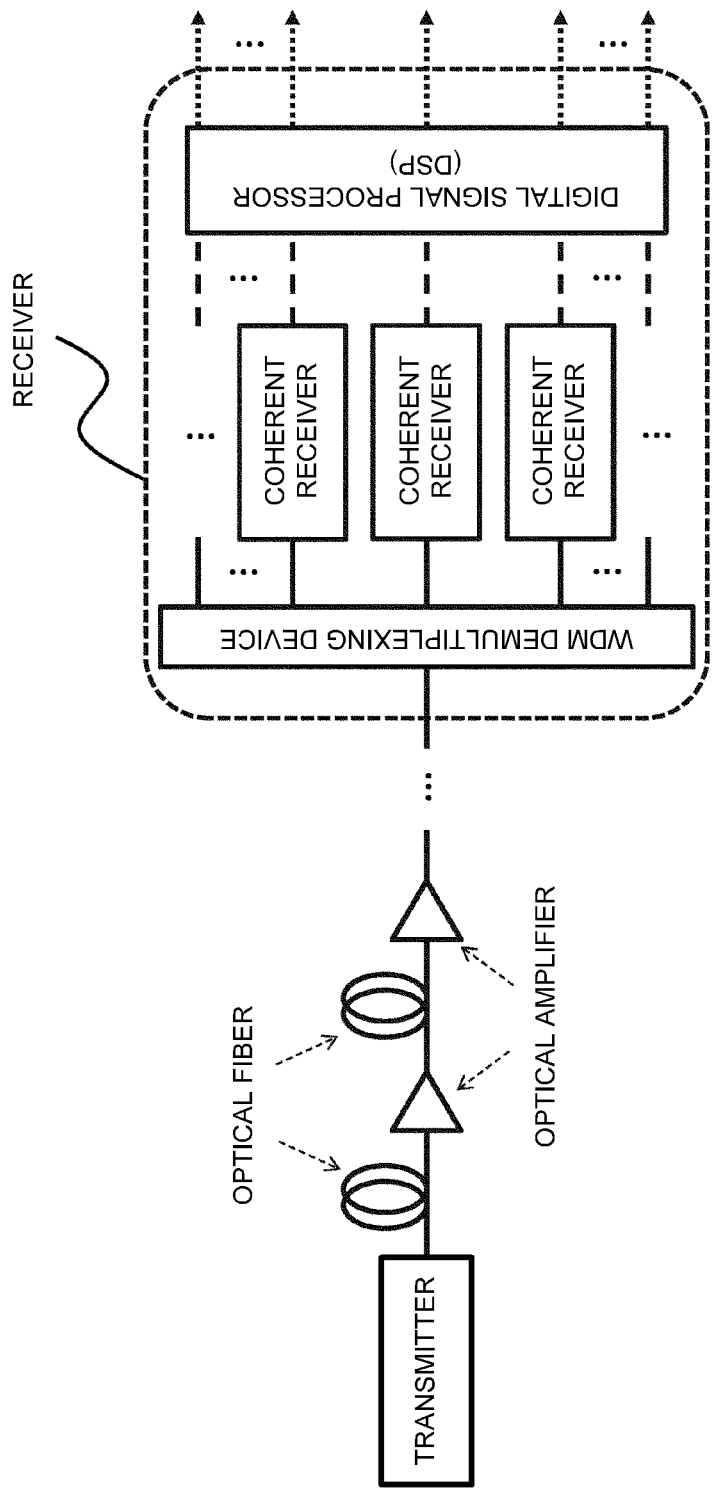
FIG. 5C is a schematic diagram of an optical transmission system according to the present embodiment.

FIG. 5C illustrates a schematic view of an optical transmission system according to the present embodiment. A WDM signal generated by a transmitter propagates in a transmission line including optical fibers and optical amplifiers, and reaches a receiver. The receiver splits a WDM signal for each channel using a demultiplexing device such as an arrayed-waveguide grating. The demultiplexed optical signal waveform of each channel is converted into an electric signal waveform by a coherent receiver, and then input to a Digital Signal Processor (DSP) for signal processing. In the DSP, the electrical signal waveform is converted into numerical data by Analog-to-Digital (AD) conversion, and calculation for various demodulation processing to finally convert the numerical data into a received bit sequence and output the received bit sequence is performed. The demodulation processing includes temporal sampling timing control, sampling rate conversion, clock synchronization, filtering, polarization rotation, carrier recovery, linear waveform distortion correction such as an adaptive equalizer, nonlinear waveform distortion correction according to the present embodiment, symbol decision, and error correction processing and the like. Note that, although a function of executing the above-described parameter optimization processing can be implemented in the DSP, it is also possible to make an external computer perform the parameter optimization processing instead of making the DSP perform the parameter optimization processing, and download the optimized parameters to apply to the nonlinear waveform distortion correction according to the present embodiment. An AD conversion function may be separated from the DSP, and installed between the DSP and the coherent receiver. Although the DSP is independently provided for each channel and the DSPs do not basically operate in conjunction with each other in a conventional optical transmission system, a single processor collectively handles waveform data of plural channels as illustrated in FIG. 5C, or plural independent processors exchange data with each other to calculate the above-described phase shift caused by XPM in the present embodiment.

Figure 5D:
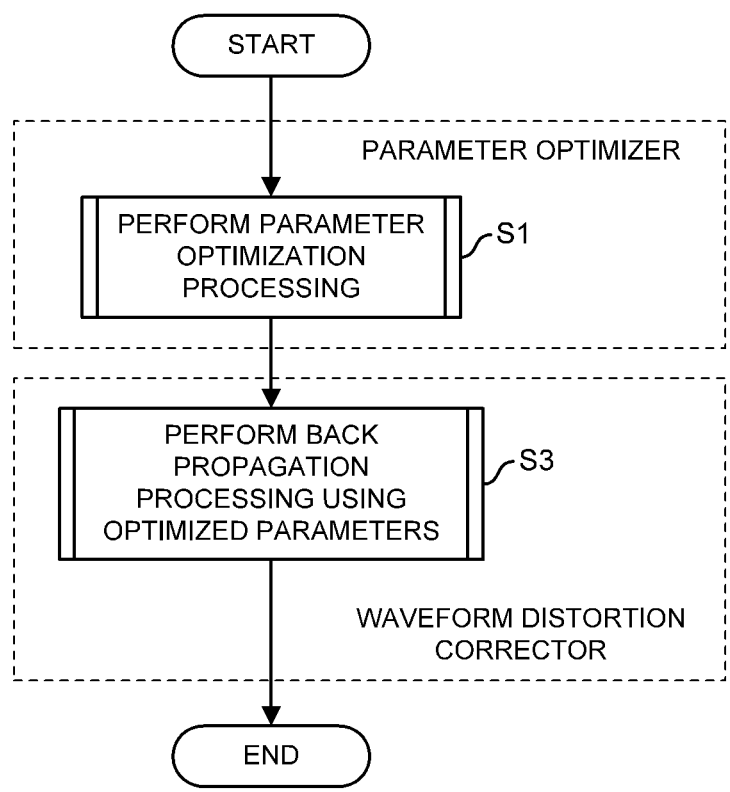
FIG. 5D is a diagram illustrating a processing flow according to the present embodiment.

FIG. 5D illustrates a processing flow executed by the DSP and related to the present embodiment. First, a signal with a known waveform shape is transmitted, and parameter optimization processing for optimizing transmission line parameters in the DSP or in the external computer based on a received signal waveform demodulated by the DSP in the receiver is executed (process S1). This processing includes arithmetic operations according to the flows illustrated in FIGS. 5A and 5B. The parameter optimization processing is executed by a parameter optimizer configured in the DSP, or the external computer. Next, a waveform distortion corrector configured in the DSP executes back propagation processing using the optimized transmission line parameters (process S3). As described with reference to FIGS. 2 and 3, in this back propagation processing, keeping respectively optimized transmission line parameters for the linear step and nonlinear step for each of the plural channels at a time of wavelength division multiplexing transmission, and sequentially performing these calculation, the waveform distortion caused by self-phase modulation occurring within a channel to be processed, and the waveform distortion caused by cross-phase modulation occurring between the channel to be processed and channels other than the channel to be processed are corrected, and a waveform at a time of transmission is estimated. This back propagation processing is executed by the DSP. By performing this processing, it is possible to improve accuracy while suppressing a calculation amount.

EXAMPLE

An effect of the nonlinear waveform distortion correction for a WDM optical signal by a method described in the present embodiment will be described based on a specific example that is based on optical transmission simulation that uses numerical value calculation. An optical signal that is a target to study is a signal obtained by performing 9-channel wavelength division multiplexing on Dual-Polarization (DP) 64-Quadrature Amplitude Modulation (QAM) signal whose symbol rate is 32 Gbaud at 50 GHz in frequency interval, random noise is given to this signal, and an SN ratio is set to 25 dB. Assume that the spectrum of a transmitted signal is one that a root Nyquist filter whose roll-off factor is 0.05 is applied. Channel numbers −4 to +4 are allocated to WDM signals of nine channels in order from a lower frequency, and signal quality of the center channel number 0 is focused upon to test an operation of the nonlinear waveform distortion correction.

Figure 6:
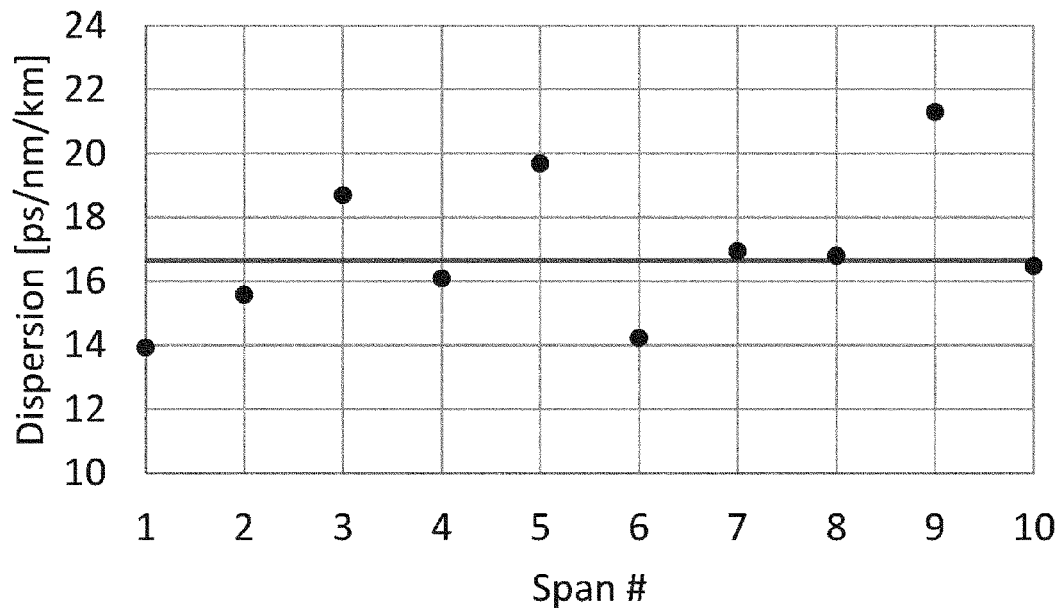
FIG. 6 is a diagram illustrating a group velocity dispersion value and a nonlinear constant in each span of a realistic transmission line.
Figure 6:
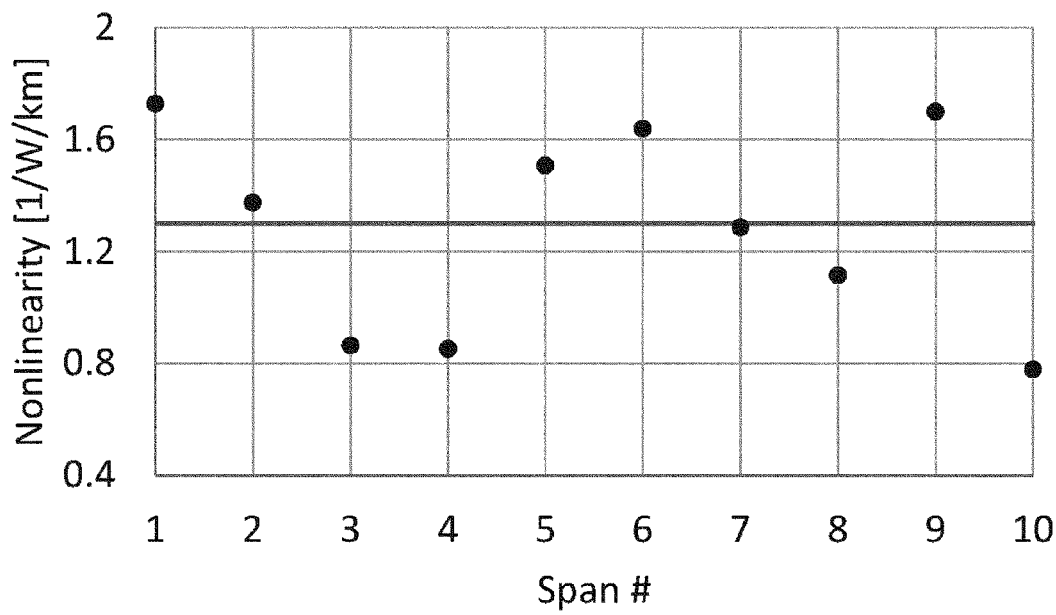

One span includes a Standard Single-Mode Fiber (SSMF) whose length is 80 km and an optical amplifier that amplifies the propagation loss of the optical fiber, transmission lines of four spans to 10 spans is assumed, and calculation for transmitting an optical signal using these transmission lines is performed. In an ideal transmission line, assuming that SSMFs of all spans have the same parameters, second-order and third-order group velocity dispersion values are put as 16.641 ps/nm/km and 0.06 ps/nm$^2$/km, respectively, a nonlinear coefficient is put as 1.3 W$^{-1}$km$^{-1}$, and a propagation loss coefficient is put as 0.192 dB/km. On the other hand, in a realistic transmission line, various parameters are different per span or per spot, power of an optical signal also fluctuates from an ideal state, and an effect of the group velocity dispersion and a magnitude of the nonlinear effect eventually vary. A transmission line for which the second-order group velocity dispersion value and the nonlinear coefficient are fluctuated per step as illustrated in FIG. 6 will be considered separately from the ideal transmission line to take this situation into account, and this transmission line will be referred to as a realistic transmission line hereinafter. Note that gray solid lines in FIG. 6 respectively illustrate average values of parameters of all 10 spans for the second-order group velocity dispersion value (a) and the nonlinear coefficient (b). In this regard, in a case where short transmission lines of four to eight spans will be considered, average values in an existing span will be considered.

Numerical value calculation for performing optical transmission simulation handles waveform data that was sampled 32 times the symbol rate on the time axis. By setting one of 4, 6, 8 and 10 as the number of spans and using the split-step Fourier method in which 800 is set as the number of steps per span in the ideal transmission line having the same parameters in each span or in a transmission line having the parameters illustrated in FIG. 6, how an optical signal propagates through the transmission line is calculated according to the nonlinear Schrödinger equation expressed by expression (1) to obtain output waveform data. 1 is set as a value of the coefficient δ corresponding to the cross-polarization cross phase modulation in expression (1), and values obtained by normalizing the parameters of the optical fiber included in the transmission line are used for the other parameters. Moreover, a noise index of the optical amplifier is put as 6 dB, and random Gaussian distribution noise having noise power determined based on a gain and the noise index is added as spontaneous emission light noise to a signal at a time of amplification. Optical signal power at a time of start of propagation in each span will be referred to as "span launch power", and transmission simulation is performed on some kinds of span launch power. When the span launch power is small, while remarkable nonlinear waveform distortion does not occur, noise remarkably deteriorates the SN ratio, and signal quality is lowered. Although the SN ratio improves by increasing the span launch power, the nonlinear waveform distortion becomes remarkable, the signal quality takes a peak value at certain span launch power, and then the signal quality deteriorates at higher span launch power.

Transmission signal data whose number of symbols is 16384 is generated based on a random bit pattern for respective conditions of the numbers of transmission spans and launch power to study, transmission simulation is performed, and an output waveform is stored. Sets of input waveforms and output waveforms of transmission lines are used as datasets, 200 datasets in total are used, and parameters of the back propagation calculation are learned by the gradient descent method that uses the above expressions such that the nonlinear waveform distortion correction is optimized. In the back propagation calculation accompanied by learning of the parameters according to the present example, the number of steps per span is set to one. By contrast with this, in the back propagation calculation that is not accompanied by the learning, both of cases where the numbers of steps per span are one and two will be considered, and the effect is compared with those in the cases where the learning is not performed.

While the gradient descent method is used to learn each parameter, a method called AdaBelief proposed in Non-Patent Literature 9 is used as a specific implementation method for updating each parameter. Note that the learning is possible using methods other than AdaBelief. The update formula of AdaBelief is obtained as follows by putting $\mu_0=0$ and $v_0=0$.

[Expression 38]

$$\mu_i = b_1\mu_{i-1} + (1-b_1)\nabla J_i \qquad (38)$$
$$v_i = b_2 v_{i-1} + (1-b_2)(\nabla J_i - \mu_i)^2$$
$$\mu'_i = \frac{\mu_i}{1-b_1}$$
$$v'_i = \frac{v_i}{1-b_2}$$
$$\theta_i = \theta_{i-1} - \eta \frac{\mu'_i}{\sqrt{v'_i}+e}$$

In this regard, $\nabla J_i$ represents a gradient of an error function for the parameter θ at a time of i-th update, and $b_1=0.9$, $b_2=0.999$, and $e=10^{-8}$ are constants. η in expression (38) represents a learning coefficient, and a suitable value is set thereto for each parameter. In the present example, the learning coefficient for the parameter $D_2$ corresponding to the second-order dispersion value is put as $\eta=1.0$, $\eta=2.0\times 10^{-6}$ is used for the parameter g corresponding to the nonlinear coefficient, $\eta=2.0\times 10^{-5}$ is used for the parameter δ corresponding to the cross-polarization cross phase modulation coefficient, $\eta=2.0\times 10^{-4}$ is used for the parameter $d_n$ corresponding to the walk-off, and update according to expression (38) is repeated 30000 times to perform the learning. Note that the number of datasets is 200, and therefore an arrangement order of the datasets is rearranged at random every update is performed 200 times to perform repeated learning. Note that this operation does not cause overtraining. Moreover, when similar learning is performed by changing conditions such as a signal modulation format and the number of channels, the learning may be performed 30000 times or more until the parameters converge if necessary. All of 16384 symbols included in the dataset are used as $y_t$ and $d_t$ in expression (20). Another waveform that has a different bit pattern and whose number of symbols is 262144 is used for testing work after the learning to evaluate signal quality after the nonlinear waveform distortion correction.

Figure 7A:
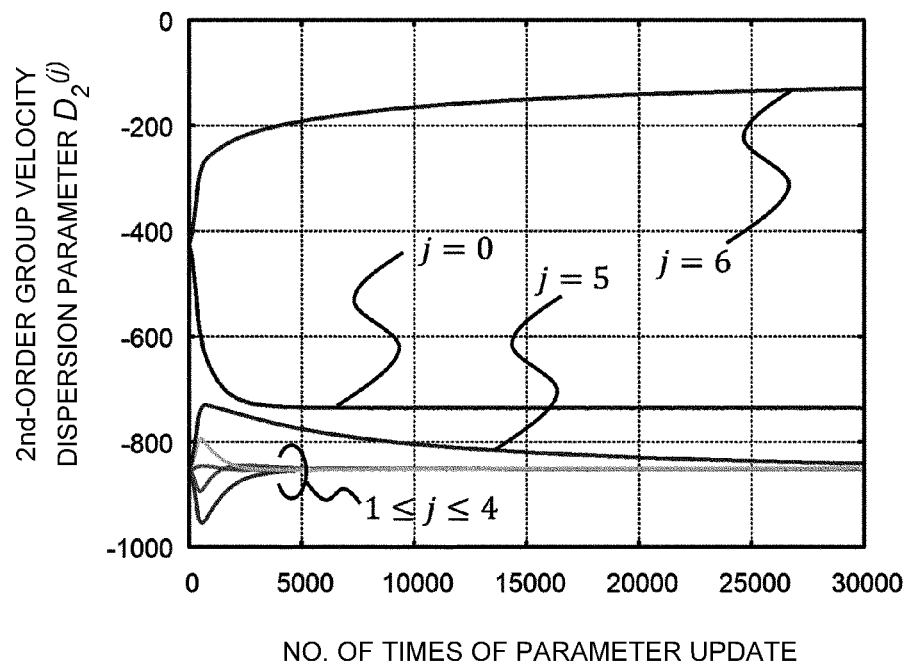
FIG. 7A is a diagram illustrating a second-order group velocity dispersion parameter $D_2^{(j)}$ with respect to the number of times of repeated learning in a learning process in a case where span launch power was +2 dBm/ch in a six-span ideal transmission line.

First, a result of the nonlinear waveform distortion correction in the ideal transmission line whose parameters have the same values in all spans will be described. FIGS. 7A to 7E illustrate fluctuations of various numerical values at a time when the parameters were repeatedly updated 30000 times in the back propagation that also took XPM into account for a dataset in a case where the span launch power was +2 dBm/ch in the ideal transmission line of six spans. FIG. 7A illustrates how the dispersion parameter $D_2^{(j)}$ in the linear step $L^{(j)}$ (0≤j≤6) fluctuates with respect to the number of times of repetition of parameter update. In linear steps of j=0 and 6, distances are half as those of the other steps, and therefore initial values of $D_2^{(j)}$ are also half. As the learning advances, the parameters of j=1, 2, 3, 4, and 5 converge to the same value, and the parameter of j=0 also converges to a close value. In contrast with this, only a linear step in a case of j=6, that is, the linear step that is the closest to the transmitter converges to a different value from the other values. These results do not match with a fact that the parameters are equal in all spans in the ideal transmission line that is the target to study, yet were obtained as results that the performance was optimized by the learning, and it is considered that it is one of factors that improve performance compared to a case where the learning is not performed as described later.

Figure 7B:
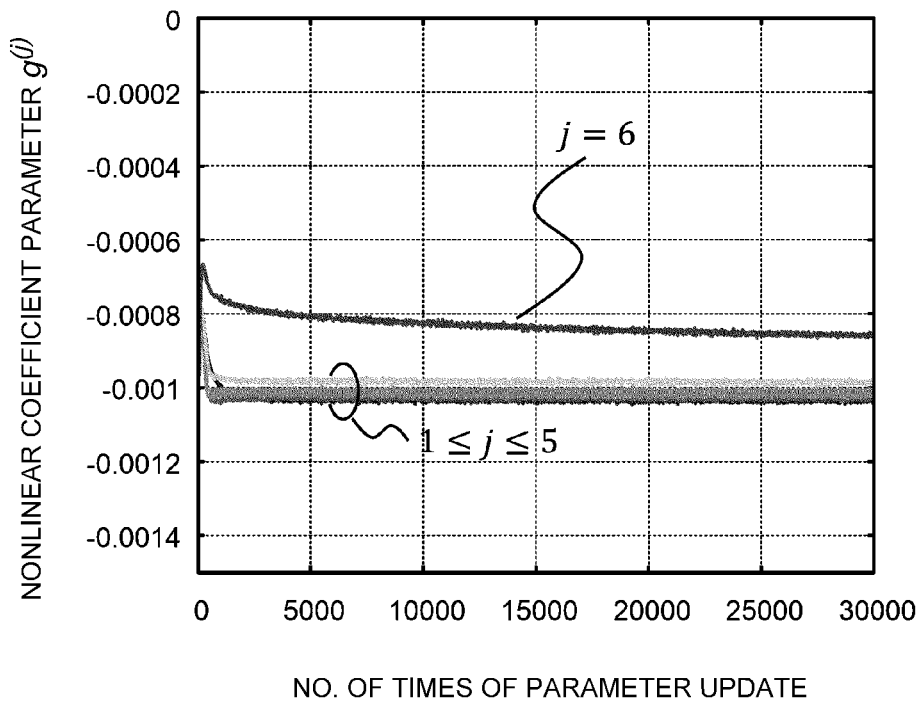
FIG. 7B is a diagram illustrating a nonlinear coefficient parameter g (with respect to the number of times of repeated learning in the learning process in the case where the span launch power was +2 dBm/ch in the six-span ideal transmission line.
Figure 7C:
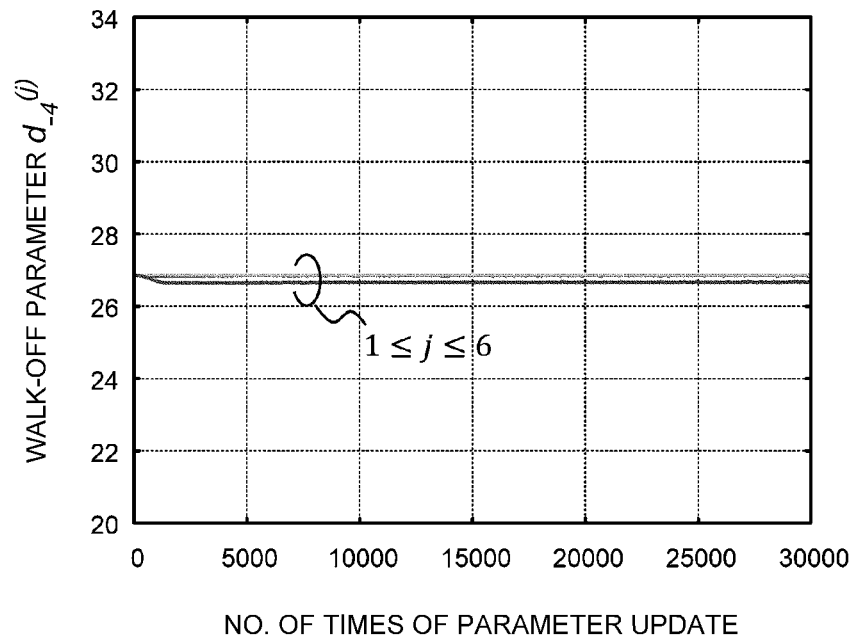
FIG. 7C is a diagram illustrating $d_{-4}^{(j)}$ with respect to the number of times of repeated learning in the learning process in the case where the span launch power was +2 dBm/ch in the six-span ideal transmission line.
Figure 7D:
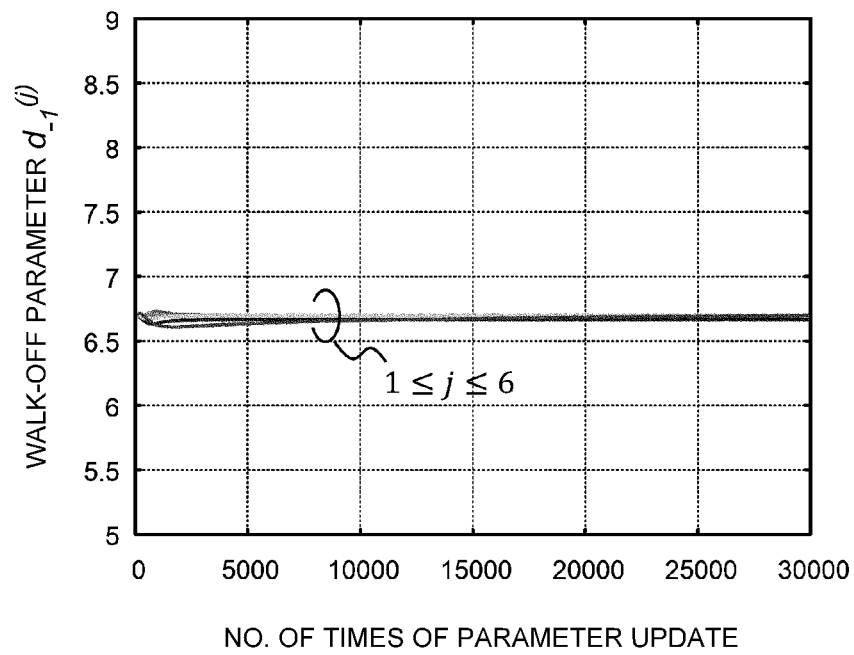
FIG. 7D is a diagram illustrating $d_{-1}^{(j)}$ with respect to the number of times of repeated learning in the learning process in the case where the span launch power was +2 dBm/ch in the six-span ideal transmission line.

FIG. 7B illustrates how the nonlinear parameter $g^{(j)}$ of the nonlinear step $N^{(j)}$ (1≤j≤6) fluctuates. Although only the nonlinear step in a case of j=6, that is, the nonlinear step that is the closest to the transmitter converges to a slightly different value from the other values, values of the other step converge to substantially same values. FIGS. 7C and 7D illustrate how the walk-off parameters $d_{-4}^{(j)}$ and $d_{-1}^{(j)}$ respectively change. Values in all steps substantially overlap, and change of parameters due to the learning is not substantially observed. The correct parameters that are common to each span are given as initial values at a time of start of the learning in the ideal transmission line, and therefore it is thought that the walk-off did not need to be adjusted by the learning. Although not illustrated, other walk-off parameters also converge similar to $d_{-4}^{(j)}$ and $d_{-1}^{(j)}$.

Figure 7E:
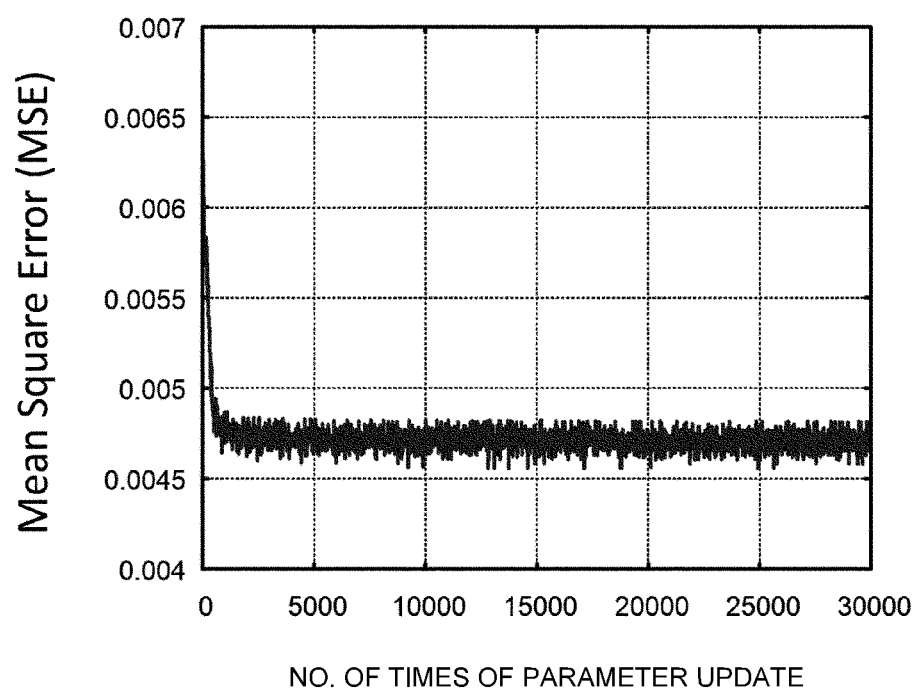
FIG. 7E is a diagram illustrating a mean squared error with respect to the number of times of repeated learning in the learning process in the case where the span launch power was +2 dBm/ch in the six-span ideal transmission line.

FIG. 7E plots MSE values calculated from a received signal waveform and a desired signal, i.e., a transmitted signal waveform. It is found that the MSE rapidly decreases immediately after start of the learning, substantially converges when the number of times of repetition reaches approximately 1000, and then stably transitions. In a case where this method is used for an actual transmission system, when the MSE vibrates near a lowest value, update may be terminated even if various parameters do not converge, and stationary waveform correction after the learning may be started.

Figure 8A:
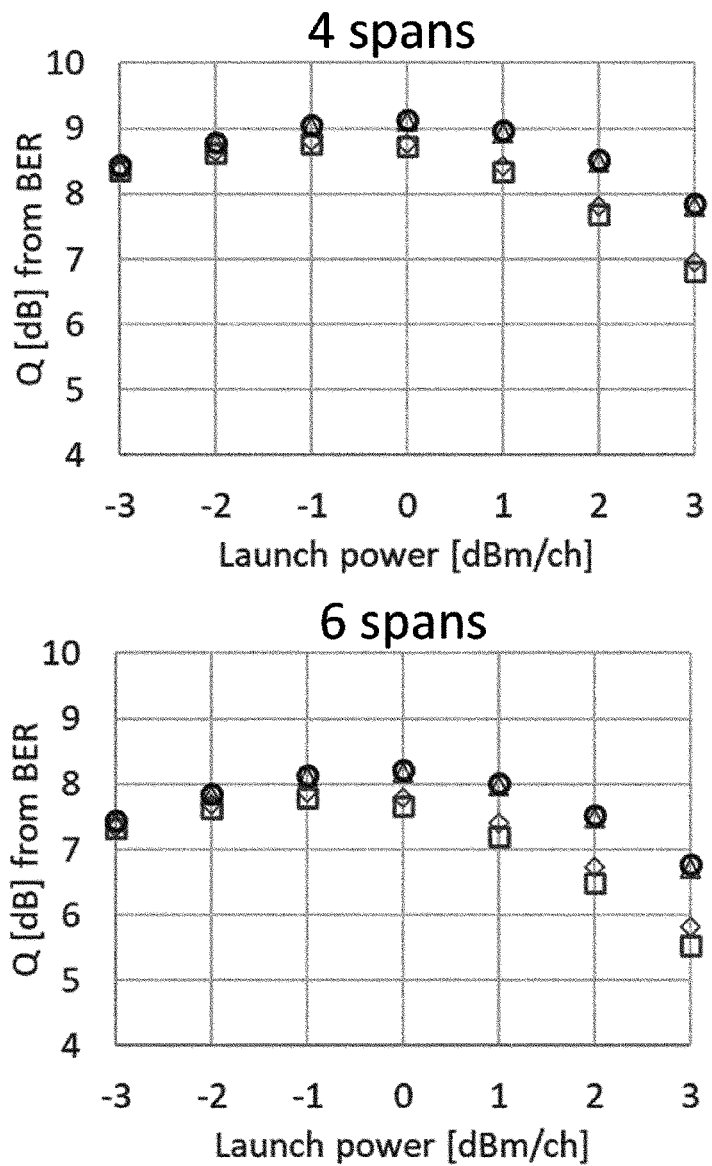
FIG. 8A is a diagram illustrating a result of a Q factor with respect to signal launch power in a case where nonlinear waveform distortion was corrected taking only SPM into account in ideal transmission lines of four spans and six spans.
Figure 8B:
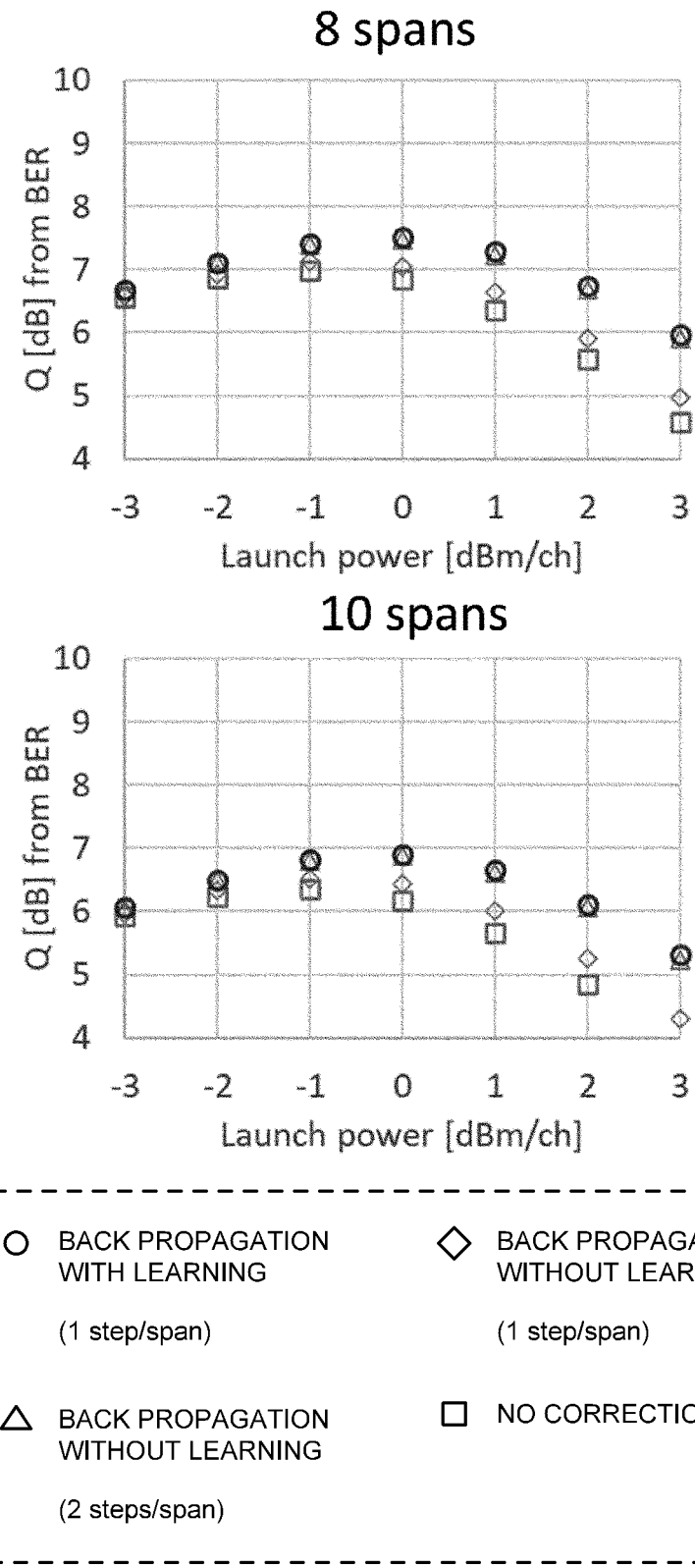
FIG. 8B is a diagram illustrating a result of a Q factor with respect to signal launch power in a case where nonlinear waveform distortion was corrected taking only SPM into account in ideal transmission lines of eight spans and 10 spans.

FIGS. 8A and 8B illustrate calculation results of a Q factor with respect to each span launch power in a case where the numbers of transmission spans were four, six, eight, and 10, and in cases where the nonlinear waveform distortion correction was performed by the back propagation calculation and was not performed. In this regard, as back propagation calculation conditions, FIGS. 8A and 8B assume a case where the back propagation calculation was performed without learning parameters in 1 step/span and 2 steps/span, and a case where the learning of parameters according to the present embodiment was performed in 1 step/span and then the back propagation calculation was performed, and respectively illustrate results obtained by correcting only distortion caused by SPM without correcting the nonlinear waveform distortion caused by XPM. Furthermore, the Q factor is converted from a value of a Bit Error Rate (BER) according to a following expression.

[Expression 39]

$$Q^2[dB] = 20 \log_{10}[\sqrt{2}\,\mathrm{erfc}^{-1}(2 \times BER)] \quad (39)$$

The results in FIGS. 8A and 8B represents as a whole that deterioration of the SN ratio causes deterioration of the Q factor in an area of low launch power, and, to the contrary, the nonlinear waveform distortion deteriorates the Q factor in an area of high launch power. Focusing on the result of the back propagation calculation in a case where the learning is not performed, a correction effect in the case of 1 step/span is little, and a reasonable correction effect in the case of 2 steps/span can be obtained. Moreover, a result of the back propagation calculation with the learning of the parameters by the method according to the present embodiment represents that, even though the number of steps per span is one, signal quality that slightly exceeds the result of 2 steps/span in a case where the learning is not performed is obtained. This suggests a probability that it is possible to acquire truly necessary parameters for the waveform correction by performing the learning, and it is essentially unnecessary to perform calculation of 2 steps/span. Although a result will not be described, if parameters are actually learned by the method according to the present embodiment in 2 steps/span, it is possible to obtain the same nonlinear waveform distortion correction performance as that in the case of 1 step/span under a condition that the MSE lowers to the minimum.

As for a case of the nonlinear waveform distortion correction by the physical phenomenon-specialized type neural network reported in Non-Patent Literature 8, Non-Patent Literature 8 reports a result that, while a result of 1 step/span is not substantially different from the result of 2 steps/span in a case of a transmission line of 12 spans, a reasonable correction effect could be obtained even though the performance deteriorated even in a case of a configuration of 0.5 step/span, i.e., a case where the number of steps was six. In view of the above, in a case where the method according to the present embodiment is used, it is considered that it is possible to obtain a sufficient correction effect with the number of steps less than that of 2 steps/span, and obtain a reasonable correction effect from a configuration less than 1 step/span.

Figure 9A:
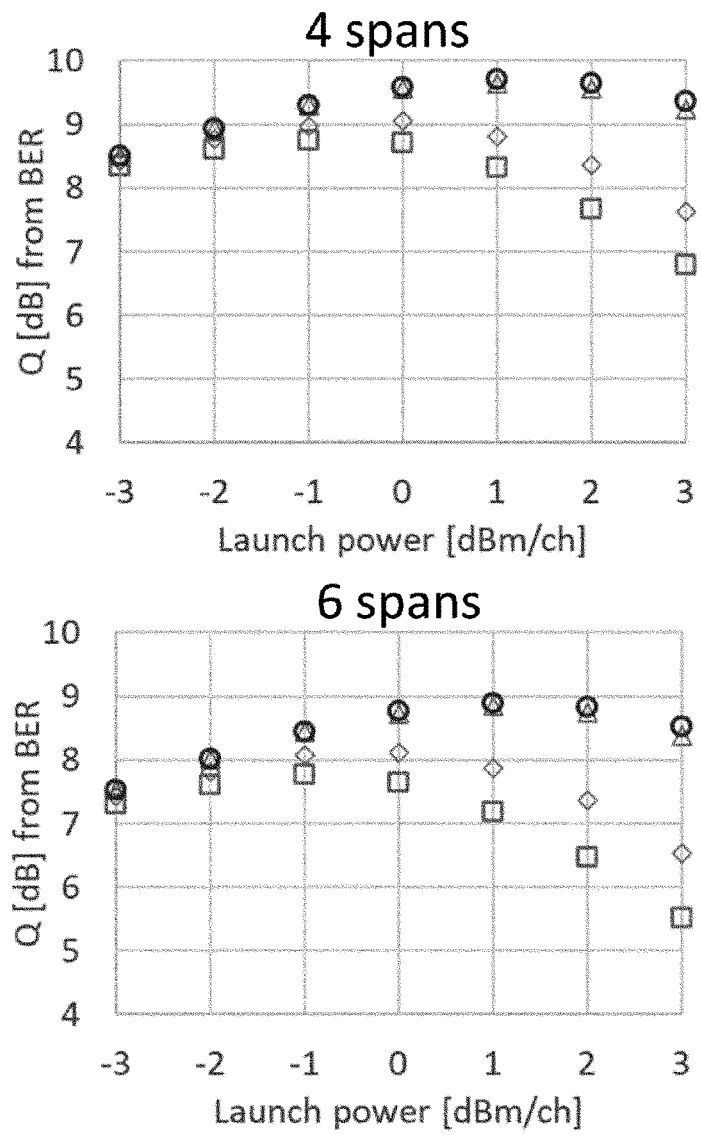
FIG. 9A is a diagram illustrating a result of a Q factor with respect to signal launch power in a case where nonlinear waveform distortion was corrected also taking XPM into account in ideal transmission lines of four spans and six spans.
Figure 9B:
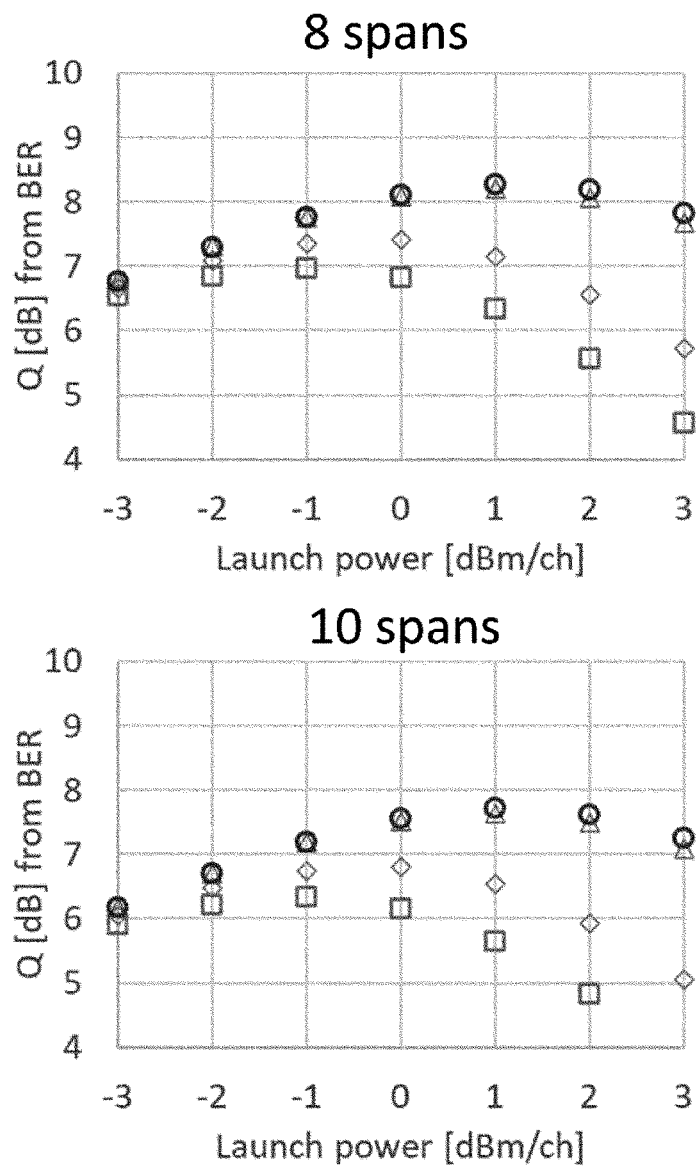
FIG. 9B is a diagram illustrating a result of a Q factor with respect to signal launch power in a case where nonlinear waveform distortion was corrected also taking XPM into account in ideal transmission lines of eight spans and 10 spans.

FIGS. 9A and 9B illustrate results that are similar to those in FIGS. 8A and 8B, and illustrate the results in a case where the back propagation calculation that also takes XPM into account in addition to SPM was performed. By correcting the distortion caused by XPM, signal quality improves, and, above all, signal quality obtained by correcting the waveform by the back propagation calculation of 1 step/span after the learning of the parameters according to the present embodiment is performed exceeds the result of the back propagation calculation of 2 steps/span without the learning, and is the best among these results. Moreover, comparison with the method according to Non-Patent Literature 4 represents that the method according to the present embodiment makes it possible to obtain a sufficient effect in 1 step/span, and can be performed with a realistic calculation amount.

Figure 10:
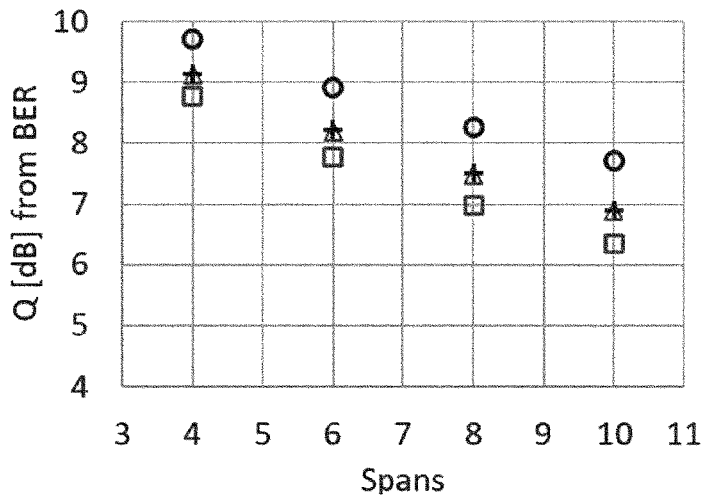
FIG. 10 is a diagram illustrating a result of a Q factor with respect to the number of transmission spans in cases where nonlinear waveform distortion correction was applied by various methods and was not applied in ideal transmission lines.

FIG. 10 illustrate results of the Q factors with respect to the number of spans under the optimal launch power in a case where the nonlinear waveform distortion correction is performed under some conditions and in a case where correction is not performed in view of the results of non-linear waveform distortion correction illustrated in FIGS. 8A, 8B, 9A, and 9B. When a threshold of the Q factor at which data can be received without an error is set to 7.5 dB, a maximum transmission distance in the case where correction is not performed is six spans. On the other hand, it is possible to perform transmission over 10 spans or more by using the method that is the scheme according to the present embodiment and learns the parameters taking both of SPM and XPM into account, and it is found that a transmission distance can be significantly extended.

Figure 11A:
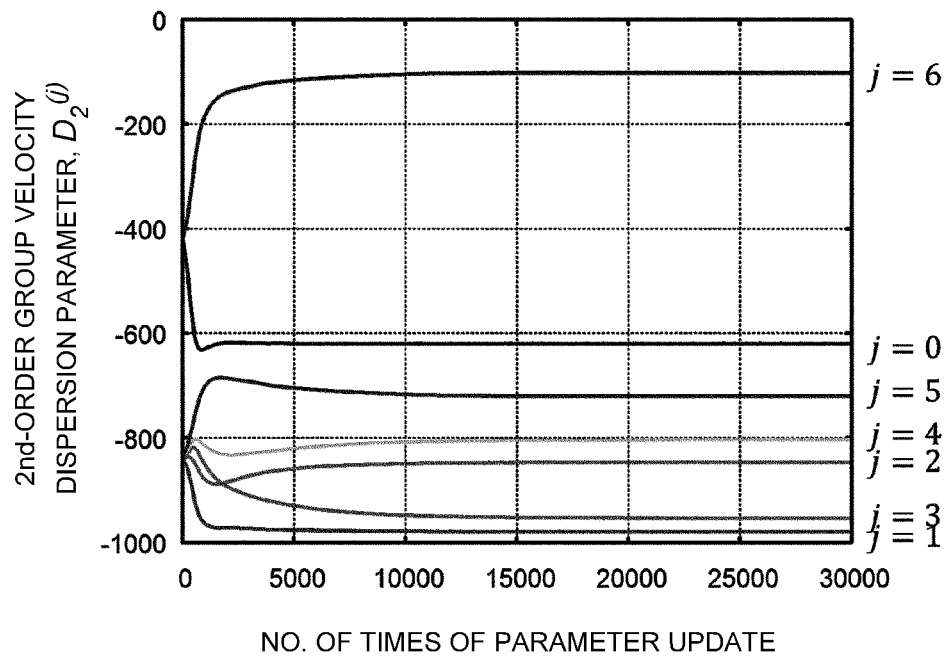
FIG. 11A is a diagram illustrating the second-order group velocity dispersion parameter $D_2^{(j)}$ with respect to the number of times of repeated learning in the learning process in the case where span launch power was +2 dBm/ch in a six-span realistic transmission line.
Figure 11B:
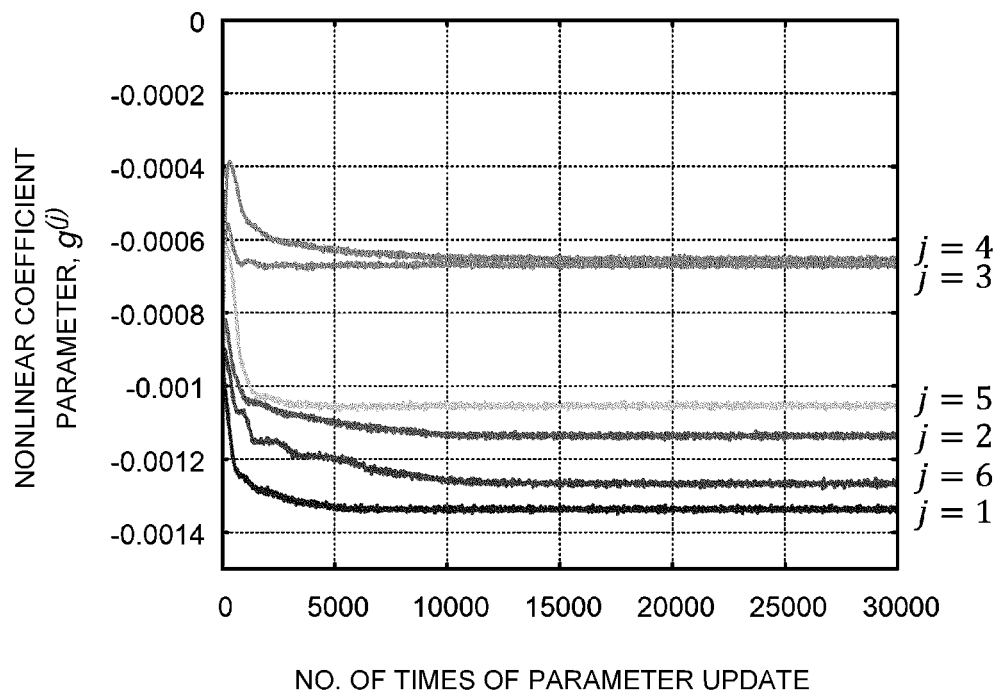
FIG. 11B is a diagram illustrating $g^{(j)}$ with respect to the number of times of repeated learning in the learning process in the case where the span launch power was +2 dBm/ch in the six-span realistic transmission line.
Figure 11C:
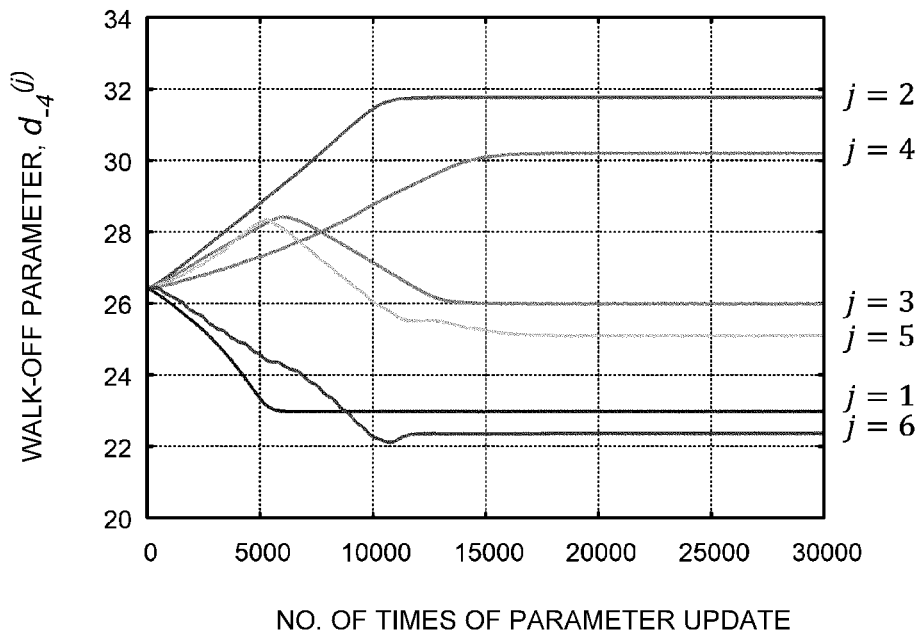
FIG. 11C is a diagram illustrating $d_{-4}^{(j)}$ with respect to the number of times of repeated learning in the learning process in the case where the span launch power was +2 dBm/ch in the six-span realistic transmission line.
Figure 11D:
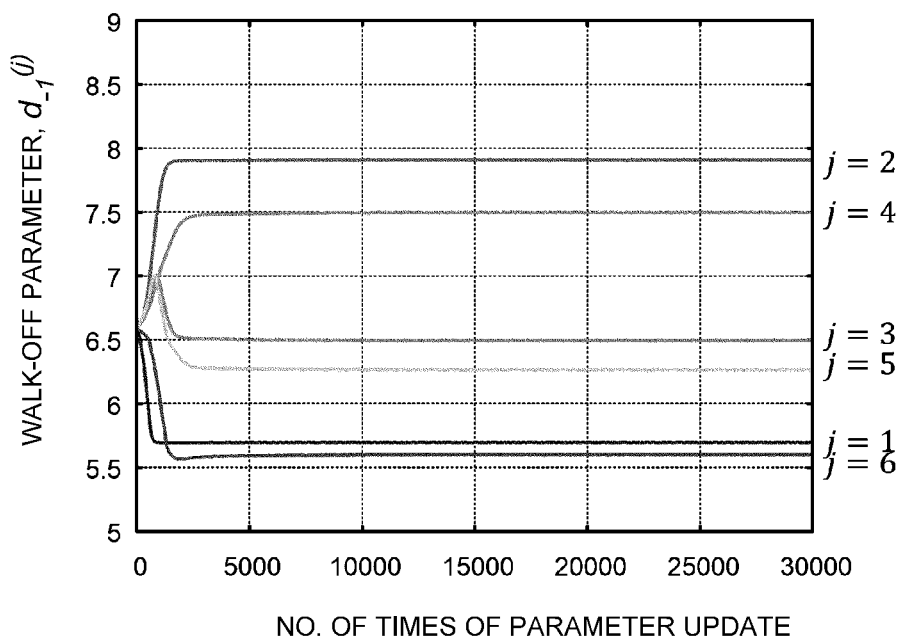
FIG. 11D is a diagram illustrating $d_{-1}^{(j)}$ with respect to the number of times of repeated learning in the learning process in the case where the span launch power was +2 dBm/ch in the six-span realistic transmission line.
Figure 11E:
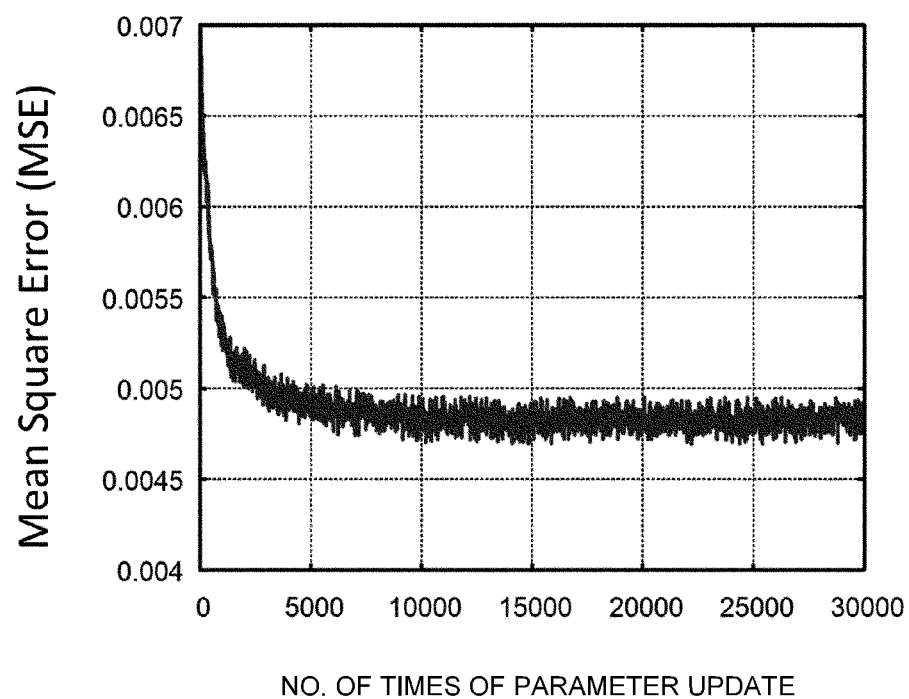
FIG. 11E is a diagram illustrating a mean squared error with respect to the number of times of repeated learning in the learning process in the case where the span launch power was +2 dBm/ch in the six-span realistic transmission line.

Next, FIGS. 11A to 14 illustrate results of the realistic transmission line whose parameters are illustrated in FIG. 6. FIGS. 11A to 11E illustrate fluctuations of various numerical values in a case where the parameters were repeatedly updated 30000 times during the back propagation that also took XPM into account for a dataset in a case where span launch power was +2 dBm/ch in the realistic transmission line of six spans. In this regard, assuming a situation that true parameters of the realistic transmission line illustrated in FIG. 6 are unknown, average values of the six spans are provided as initial values of the transmission line parameters to start the learning. FIG. 11A illustrates how the second-order group velocity dispersion parameter $D_2^{(j)}$ changes, FIG. 11B illustrates how the nonlinear parameter $g^{(j)}$ changes, and these parameters respectively converge to different values for each span. Although this result matches with the fact in a stationary manner that parameters of an original transmission line change for each span, the resulting values are values that maximize the nonlinear waveform distortion correction, and do not necessarily match with the transmission line parameters illustrated in FIG. 6. FIGS. 11C and 11D represent that the respective walk-off parameters $d_{-4}^{(j)}$ and $d_{-1}^{(j)}$ converge to different values in association with different dispersion values of each span. Although not illustrated, the other walk-off parameters also converge similar to $d_{-4}^{(j)}$ and $d_{-1}(j)$. Similar to FIG. 7E, FIG. 11E illustrates an MSE value with respect to the number of times of learning, and a result in a case of the realistic transmission line in FIG. 11E represents that convergence occurs when the number of times of repetition is approximately 10000 compared to a case of the ideal transmission line illustrated in FIG. 7E. Similar to the result illustrated in FIG. 7E, also in this case, when the MSE vibrates near the lowest value, update may be terminated even if the various parameters do not converge, and stationary waveform correction after the learning may be started.

Figure 12A:
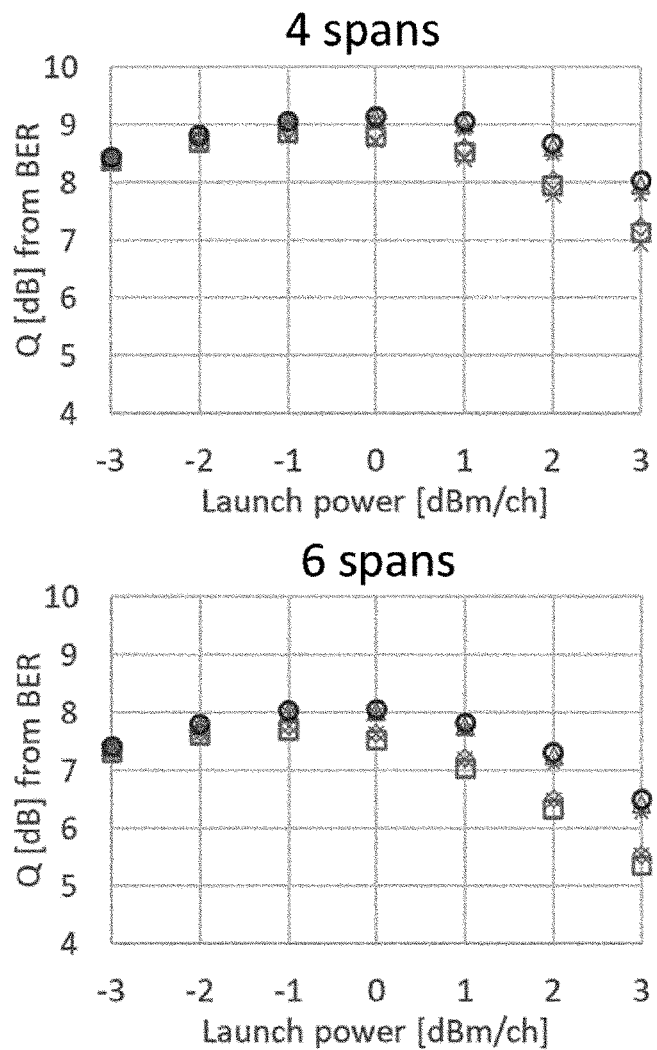
FIG. 12A is a diagram illustrating a result of a Q factor with respect to signal launch power in a case where nonlinear waveform distortion was corrected taking only SPM into account in realistic transmission lines of four spans and six spans.
Figure 12B:
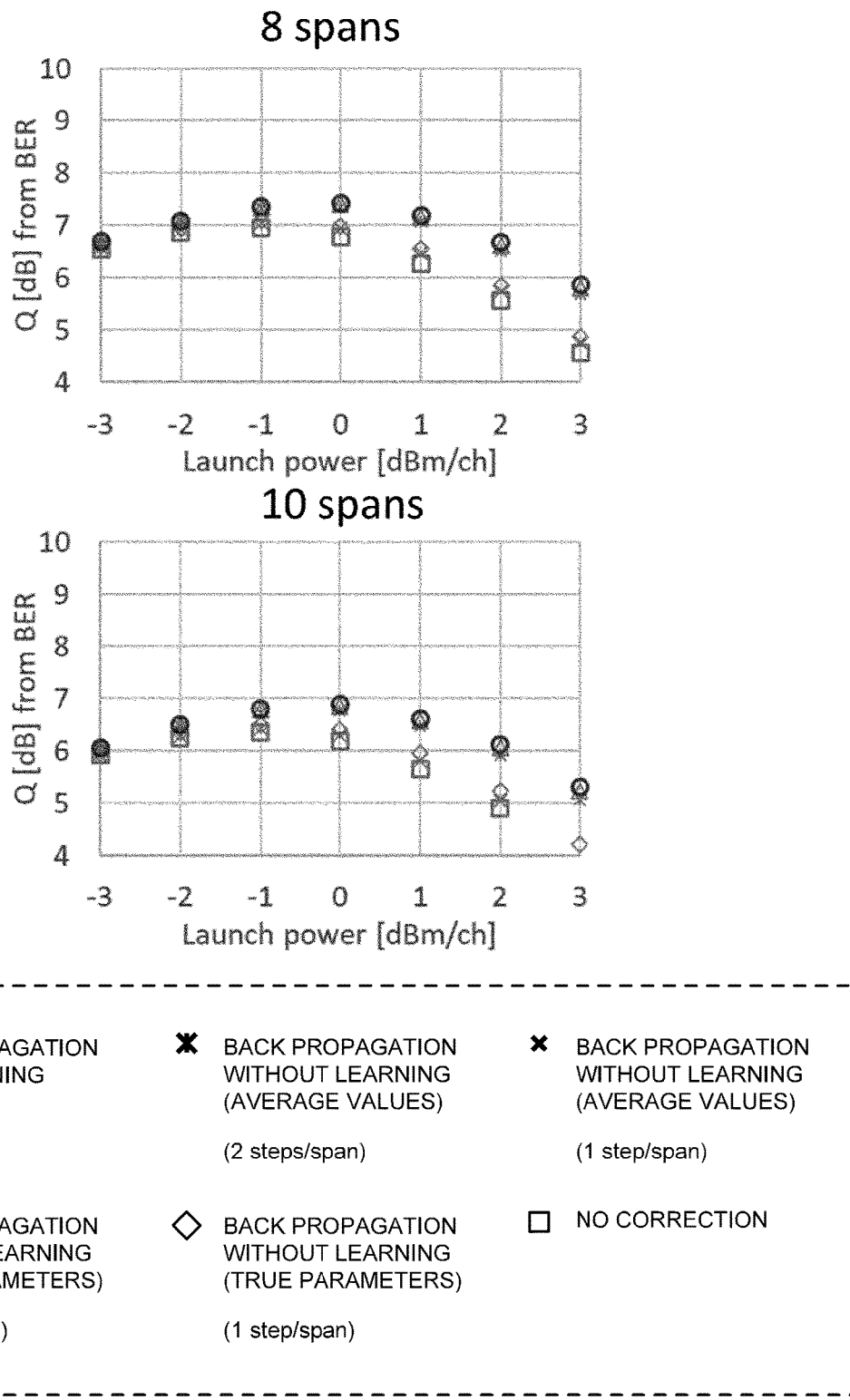
FIG. 12B is a diagram illustrating a result of a Q factor with respect to signal launch power in a case where nonlinear waveform distortion was corrected taking only SPM into account in realistic transmission lines of eight spans and 10 spans.

FIGS. 12A and 12B illustrate calculation results of the Q factor with respect to each span launch power in a case where the numbers of transmission spans are four, six, eight, and 10 similar to FIGS. 8A and 8B and in cases where the nonlinear waveform distortion correction was performed by the back propagation calculation and was not performed. In this regard, as back propagation calculation conditions, FIGS. 12A and 12B assume a case where the back propagation calculation was performed without learning parameters in 1 step/span and 2 steps/span, and a case where the learning of parameters according to the present embodiment was performed in 1 step/span and then the back propagation calculation was performed, and each illustrate results obtained by correcting only distortion caused by SPM without correcting the nonlinear waveform distortion caused by XPM. Moreover, as for the back propagation without the learning, FIGS. 12A and 12B illustrate results of both of a case where the true values illustrated in FIG. 6 were given as parameters used for calculation and a case where average values of the parameters were given. Similar to the results in FIGS. 8A and 8B obtained for the ideal transmission line, it is found also for the realistic transmission line, that signal quality obtained by correcting the waveform by the back propagation calculation with the learning of the parameters according to the present embodiment is the best among these results. As for the back propagation calculation without the learning, it is found that there is no substantial difference between the case where the true values of the transmission line parameters were given and the case where the average values were given, and the correction performance does not significantly depend on the transmission line parameters in a situation that only SPM is corrected.

Figure 13A:
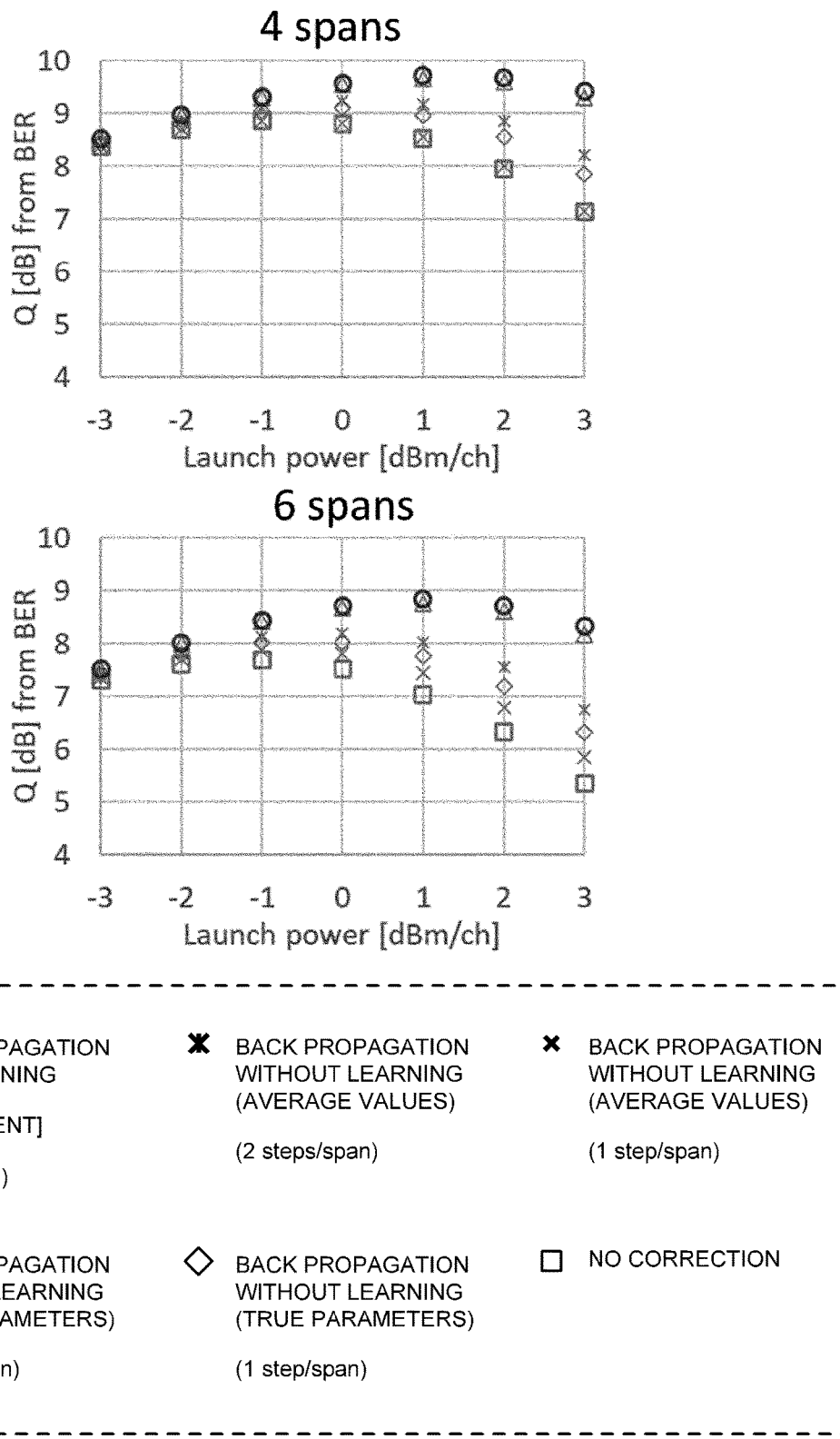
FIG. 13A is a diagram illustrating a result of a Q factor with respect to signal launch power in a case where nonlinear waveform distortion was corrected also taking XPM into account in realistic transmission lines of four spans and six spans.
Figure 13B:
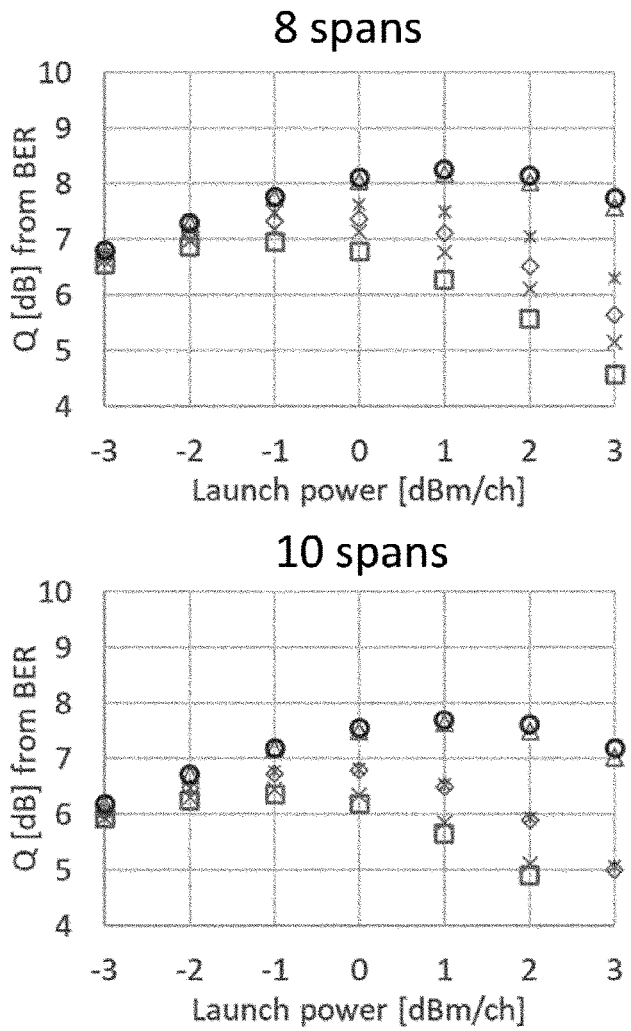
FIG. 13B is a diagram illustrating a result of a Q factor with respect to signal launch power in a case where nonlinear waveform distortion was corrected also taking XPM into account in realistic transmission lines of eight spans and 10 spans.

FIGS. 13A and 13B illustrate similar results to those in FIGS. 12A and 12B in a case where the nonlinear waveform distortion correction was performed taking not only SPM but also XPM into account. By correcting the distortion caused by XPM, signal quality improves also in the realistic transmission line, and, above all, signal quality obtained by correcting the waveform by the back propagation calculation of 1 step/span with learning the parameters according to the present embodiment exceeds the result of the back propagation calculation of 2 steps/span for which the true transmission line parameters were given without performing the learning, and is the best among these results. What should be focused on in the results in FIGS. 13A and 13B is that the result of the back propagation calculation without the learning in the case where the average values of the true values were given as the transmission line parameters represents remarkable deterioration compared to the result in the case where the true values were given. This deterioration is caused because, when XPM is corrected, if correct walk-off values indicating a temporal positional relationship between different channels are not given, phase shift caused by XPM cannot be correctly calculated, and the correction performance deteriorates. Therefore, in a situation that the transmission line parameters fluctuate for each span and the correct values are unknown, the fact that learning the transmission line parameters according to the method described in the present embodiment makes it possible to set optimal values as the walk-off, and being able to effectively correct XPM hold a very important meaning.

Figure 14:
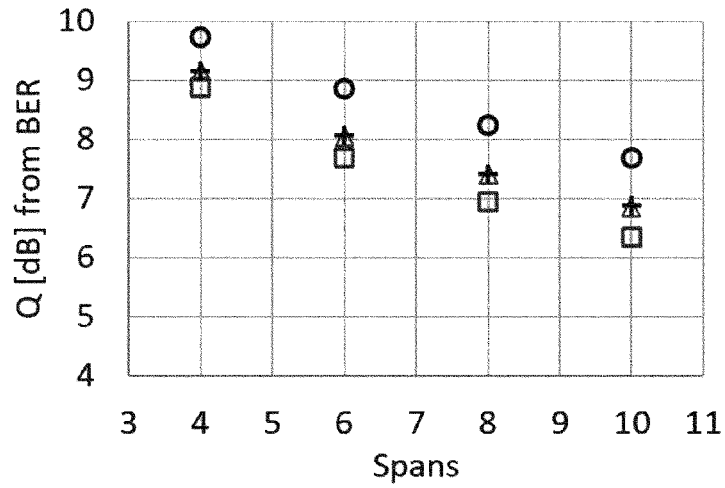
FIG. 14 is a diagram illustrating a result of a Q factor with respect to the number of transmission spans in cases where nonlinear waveform distortion correction was applied by various methods and was not applied in realistic transmission lines.

Similar to FIG. 10, FIG. 14 illustrates a result of the Q factors with respect to the number of spans under the optimal launch power in a case where the nonlinear waveform distortion correction is performed under some conditions and in a case where no correction is performed in view of the results of the nonlinear waveform distortion correction illustrated in FIGS. 12A, 12B, 13A, and 13B. A similar result to that in the case of the ideal transmission line is obtained also for the realistic transmission line, and it is possible to significantly extend a transmission distance by performing the back propagation calculation after performing the learning of the parameters according to the present embodiment.

Figure 15:
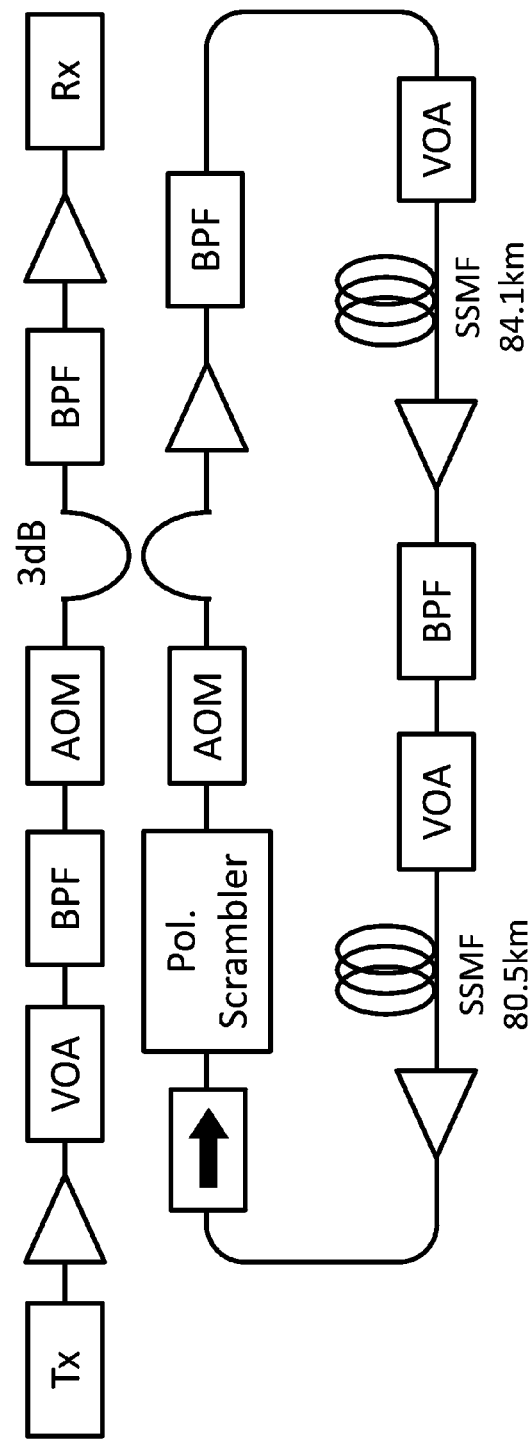
FIG. 15 is a schematic diagram illustrating a transmission system used for an experiment.

The effect of the embodiment was tested by a loop transmission experiment in addition to the above-described simulation results. FIG. 15 illustrates a loop transmission experiment system, and details of an experiment procedure that uses this system and an experiment result will be described below.

As a configuration of the Transmitter (Tx), continuous light of 11 channels with different wavelengths, is output from a wavelength tunable light source, is synthesized by a 16×1 polarization maintaining coupler, is then input to a Lithium Niobate (LN) dual-polarization IQ modulator, is modulated to an optical signal waveform by electric signals applied to the modulator, and is output. The center frequency is 193.1 THz (the wavelength is 1552.524 nm), the frequency of the continuous light of the 11 channels is set at an interval of 50 GHz from 192.85 THz to 193.35 THz, and a channel number n=−5, −4, . . . , 4, and 5 is assigned in order from a lower frequency. The electric signals of four channels to be applied to the modulator are generated by an arbitrary waveform generator whose sampling rate is 64 GSample/s, and each channel corresponds to an X polarization I channel component, an X polarization Q channel component, a Y polarization I channel component, and a Y polarization Q channel component of a dual-polarization IQ modulation signal. These electric signals of the four channels are respectively amplified by a driver amplifier, and applied to the modulator. An optical signal output from the modulator is a dual-polarization QAM signal whose symbol rate is 32 Gbaud, and that has a root Nyquist waveform whose roll-off factor is 0.1. As modulation formats, a uniform distribution 16-QAM signal whose number of bits per single polarization single symbol is four bits, and a Probabilistically Shaping (PS) 64-QAM signal whose number of bits per single polarization single symbol is five bits are used. For each modulation format of 16 QAM and PS-64 QAM, four patterns of the signal waveform that is modulated based on a random bit pattern and that includes 65536 symbols per single polarization are generated. When one of the four patterns is selected, the Tx repeatedly transmits the waveform of this pattern. Note that, although the WDM signals of the 11 channels obtained by modulation are modulated to the same waveforms across all channels, performing long distance transmission through a transmission line in which group velocity dispersion occurs causes the walk-off (group delay between channels), and therefore random XPM between waveforms occurs after the long distance transmission.

Optical power of the WDM signals of the 11 channels generated by the Tx is amplified by the optical amplifier, and is then adjusted by a Variable Optical Attenuator (VOA). After that, optical noise outside a signal band is removed by a Band-Pass Filter (BPF), and the WDM signals are input to an Acoustic Optical Modulator (AOM) that is a switch that switches a loop transmission operation. The signal is input to and output from a loop transmission line through a 3 dB coupler. The loop transmission line includes in order from an input side an optical amplifier, a BPF, a VOA, an SSMF whose length is 84.1 km, an optical amplifier, a BPF, a VOA, an SSMF whose length is 80.5 km, an optical amplifier, an isolator (rightward arrow), a polarization scrambler (Pol. Scrambler), and an AOM. That is, one loop includes the SSMFs of two spans. In the experiment, the transmission distance is set to one of six, eight, 10, 12, 14, and 16 spans, and a signal is transmitted over each distance to test an effect of the nonlinear waveform distortion correction. Note that the SSMF whose length is 84.1 km and the SSMF whose length is 80.5 km have slightly different dispersion characteristics, a measurement result represents that a group velocity dispersion value and a dispersion slope value at 193.1 THz in frequency in a case of the former SSMF are 17.14 ps/nm/km and 0.062 ps/nm$^2$/km, respectively, and the group velocity dispersion value and the dispersion slope value in a case of the latter SSMF are 16.55 ps/nm/km and 0.058 ps/nm 2/km, respectively, and the group velocity dispersion value and the dispersion slope were estimated as 16.85 ps/nm/km and 0.060 ps/nm$^2$/km, respectively, as the average characteristics of one loop of the loop transmission line.

As for the signal output from the loop transmission line, only one channel of the 11 channels is extracted by the BPF whose passband is 50 GHz, and is amplified by the optical amplifier, and then is input to a Receiver (Rx). The Rx is a digital coherent receiver that includes a 4-channel real time oscilloscope of 80 GSample/s whose electric band is 33 GHz, a Local Oscillator (LO), and an optical front end, demodulates, by offline digital signal processing, a real time waveform acquired by the oscilloscope, and then performs signal processing for the nonlinear waveform distortion correction offline likewise. In this regard, in the experiment, only signal quality of the center channel whose channel number is n=0 is focused upon, the learning for the nonlinear waveform distortion correction according to the embodiment is performed to maximize this signal quality, and the signal quality after the correction is evaluated.

To perform the back propagation calculation for the nonlinear waveform distortion correction offline after the WDM signal is received, waveforms of all of the 11 channels are received for each channel. Normal demodulation processing that performs up to evaluation on signal quality without performing the back propagation calculation includes dispersion compensation, application of the same root Nyquist filter as that applied at a time of transmission as a matched filter, polarization rotation and demultiplexing of dual-polarization components, resampling to 2 samples/ symbols, retiming, carrier frequency estimation and compensation, carrier-phase recovery and 3-tap feed forward-type linear adaptive equalization processing, and symbol decision and acquisition of a bit pattern. Here, the 3-tap equalization processing is butterfly-type 2×2 MIMO processing that can handle a dual-polarization signal, and is effective to compensate for the polarization crosstalk that occurs due to birefringence in a transmission line, XPM, and the like. On the other hand, the signal waveform demodulated in this way greatly changes from the waveform at the time of reception as a result of application of the root Nyquist filter, and the back propagation calculation cannot be applied as is. Hence, the root Nyquist filter is not applied to the waveform after the dispersion compensation is applied during the normal demodulation processing, the processing performed in the subsequent demodulation process is performed likewise, and the waveform immediately after reception is reproduced as closely as possible.

Incidentally, originally, the optical signals of all of the channels should be simultaneously received by using plural transceivers, the back propagation calculation for the nonlinear waveform distortion correction according to the present embodiment should be performed by using waveforms of all of the channels without demodulating them, and the demodulation should be performed finally. However, in the experiment conducted herein, since the one Rx is used to receive and demodulate each channel in order, the measured waveforms of all of the channels are not synchronized between the channels. Especially, in a WDM signal after transmission through an optical fiber of a long distance, the group delay (walk-off) between the channels occurs in addition to the linear waveform distortion by the effect of the group velocity dispersion, and when the back propagation calculation is performed, it is necessary to start calculation while keeping an accurate group delay amount at the time of reception. However, if the back propagation calculation is performed as is without demodulating the waveform received in an asynchronous manner, the aforementioned condition is not satisfied. Hence, a procedure is adopted that the signals of all of the channels are independently received once, demodulation including dispersion compensation is performed, known pilot symbols are detected from resulting waveforms, timings of all of the channels are synchronized, the compensated group velocity dispersion values are allocated again to give the walk-off to each channel, a WDM signal waveform that would be obtained at a time of collective reception is reproduced, and the back propagation calculation is started.

In the experiment, under each condition of a different number of transmission spans and launch power, a signal of each modulation format is transmitted, received, and demodulated, and a transmitted waveform that is common to all channels and a collectively received waveform of all channels described above are synthesized to generate a dataset. Four datasets are generated for each modulation format in association with four different waveform patterns. Note that, to correctly process the walk-off that occurs during the back propagation calculation, measurement is performed such that symbols much more than 65536 symbols included in one period of the transmitted waveform are included at a time of reception. A frequency difference between the center signal whose channel number is n=0 and an edge channel whose channel number is n=±5 is 250 GHz, the maximum number of transmission spans is 16. Therefore, a maximum value of walk-off is estimated as approximately 43500 ps. This walk-off value corresponds to approximately 1400 symbols with respect to a 32-Gbaud signal, and therefore by performing measurement under a condition including the number of symbols greater than the 1400 symbols, it is possible to correctly calculate a walk-off influence when the back propagation is performed using a dataset having a finite time width. Hence, a waveform obtained by adding 5000 symbols to each of both edges in the time domain of the waveform whose one period is 65536 symbols is used to form a dataset.

Prior to the experiment, the following new facts were found by advance study based on simulation. That is, by learning the transmission line parameters only for a waveform obtained for high launch power (e.g., launch power per channel is +3 dBm) equal to or more than a certain value using a signal of a modulation format (e.g., DP-16QAM) having certain complexity, it is possible to apply the resulting parameters to the nonlinear waveform distortion correction for a signal of an arbitrary modulation format whose launch power is equal to or less than the values used for the learning. Based on this fact, in the experiment, the DP-16-QAM signal whose launch power per channel is +3 dBm is transmitted, received, and demodulated to form a dataset, and learn transmission line parameters used for the back propagation calculation. Next, a DP-PS-64-QAM signal whose launch power per channel is −5 dBm to +2 dBm is transmitted, received, and demodulated to form a dataset, perform the nonlinear waveform distortion correction using the previously obtained transmission line parameters, and evaluate an improvement amount of signal quality.

At a time of learning the transmission line parameters, in one learning step, one of four datasets of the DP-16-QAM signal is selected at random to perform the back propagation calculation, then continuous 1024 symbols among 65536 symbols are selected at random, an amplitude waveform of these symbols is put as an output signal waveform $y_t$ in expression (20), a corresponding transmitted signal waveform is used as the desired signal $d_t$, and a gradient of each parameter is calculated from an error signal to update parameters. By performing such learning, it is possible to randomize the learning process for a limited number of datasets, and advance the learning without causing overfitting. Note that above-described AdaBelief is used as an algorithm of the gradient descent method used for learning.

Figure 16A:
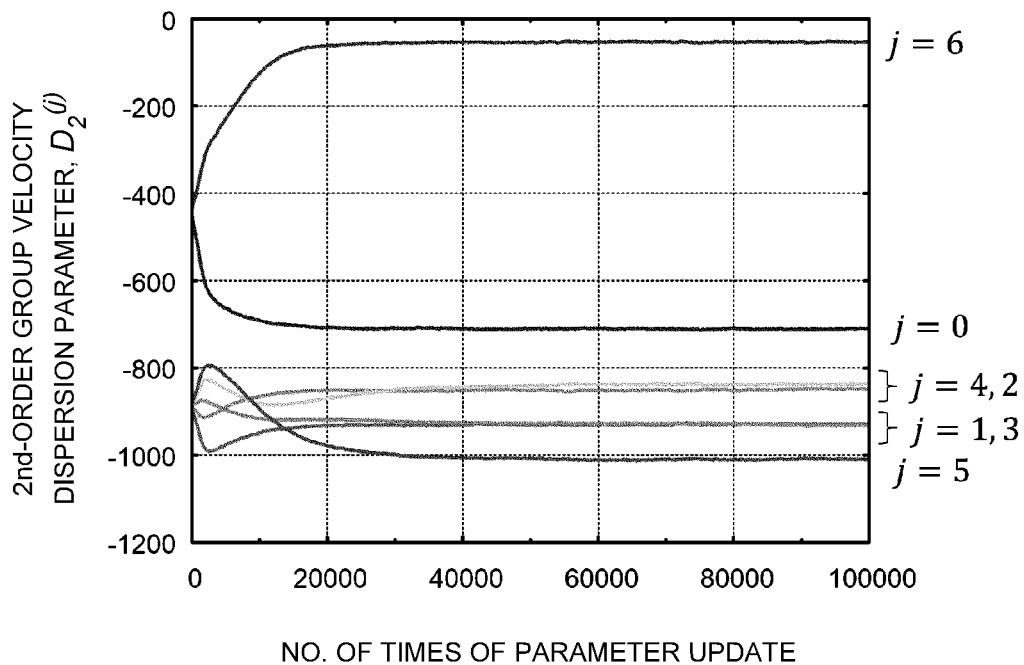
FIG. 16A is a diagram illustrating a change of the second-order group velocity dispersion parameter $D_2^{(j)}$ with respect to the number of times of parameter update.
Figure 16B:
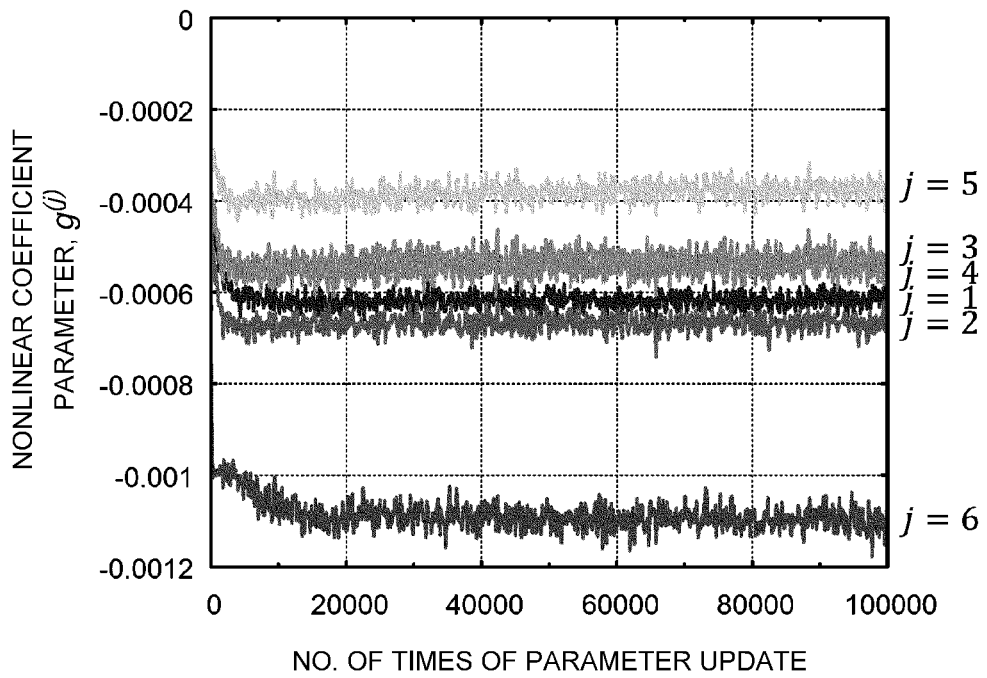
FIG. 16B is a diagram illustrating a change of the nonlinear coefficient parameter $g^{(j)}$ with respect to the number of times of parameter update.
Figure 16C:
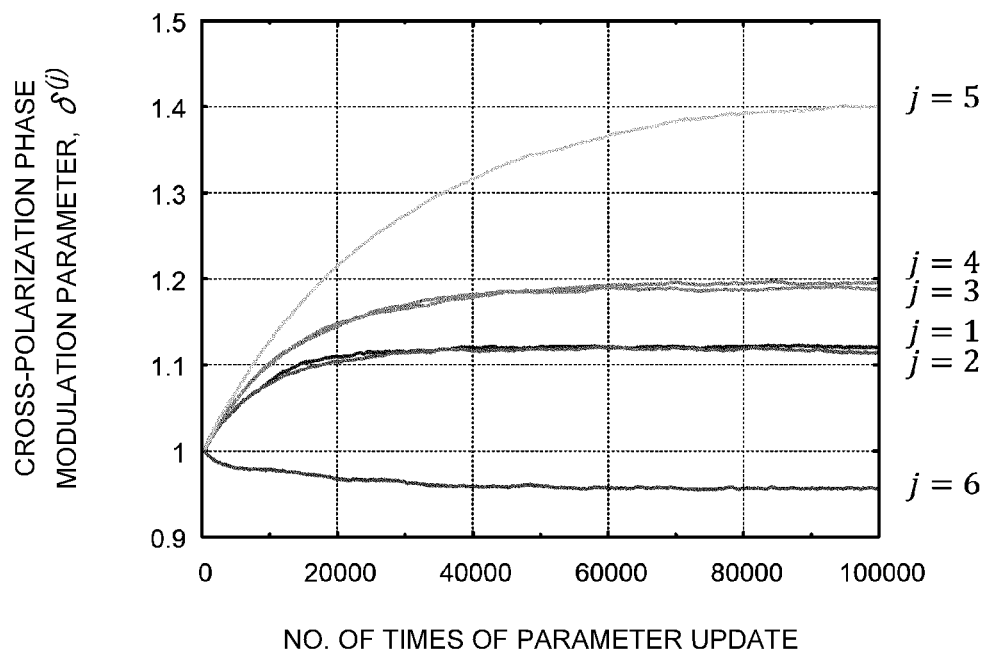
FIG. 16C is a diagram illustrating a change of a cross-polarization phase modulation parameter 80 with respect to the number of times of parameter update.
Figure 16D:
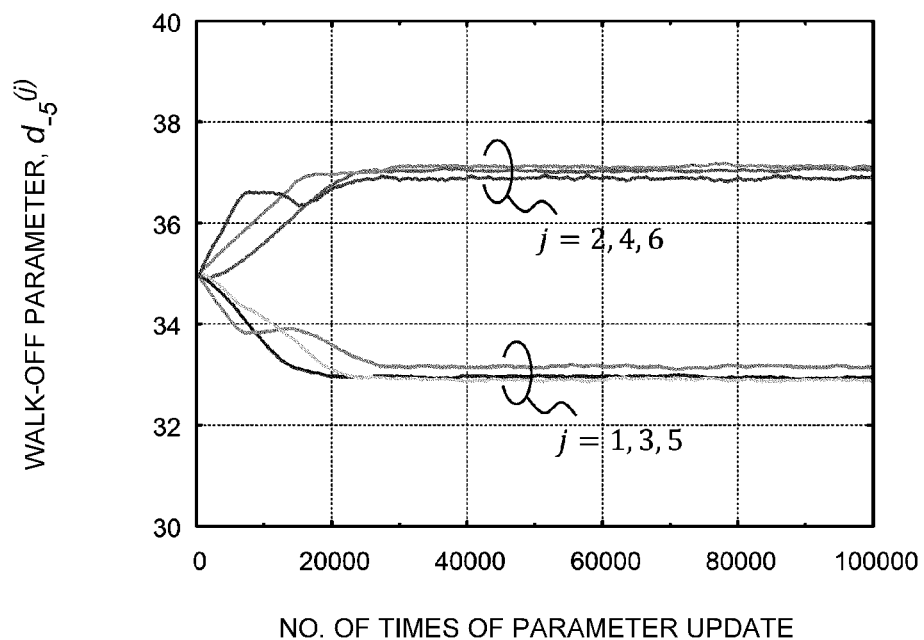
FIG. 16D is a diagram illustrating a change of a walk-off parameter $d_{-5}^{(j)}$ with respect to the number of times of parameter update.
Figure 16E:
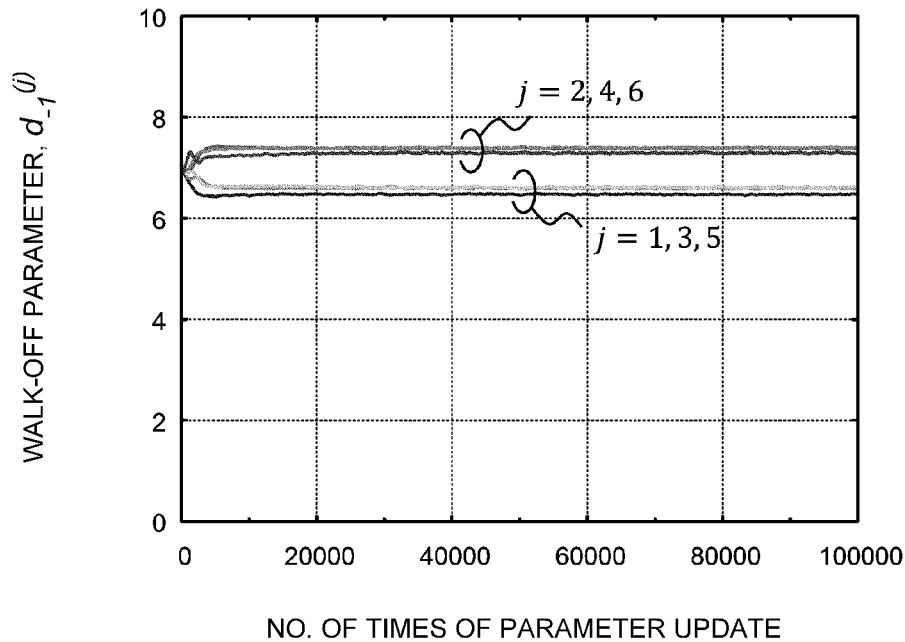
FIG. 16E is a diagram illustrating a change of a walk-off parameter $d_{-1}^{(j)}$ with respect to the number of times of parameter update.
Figure 16F:
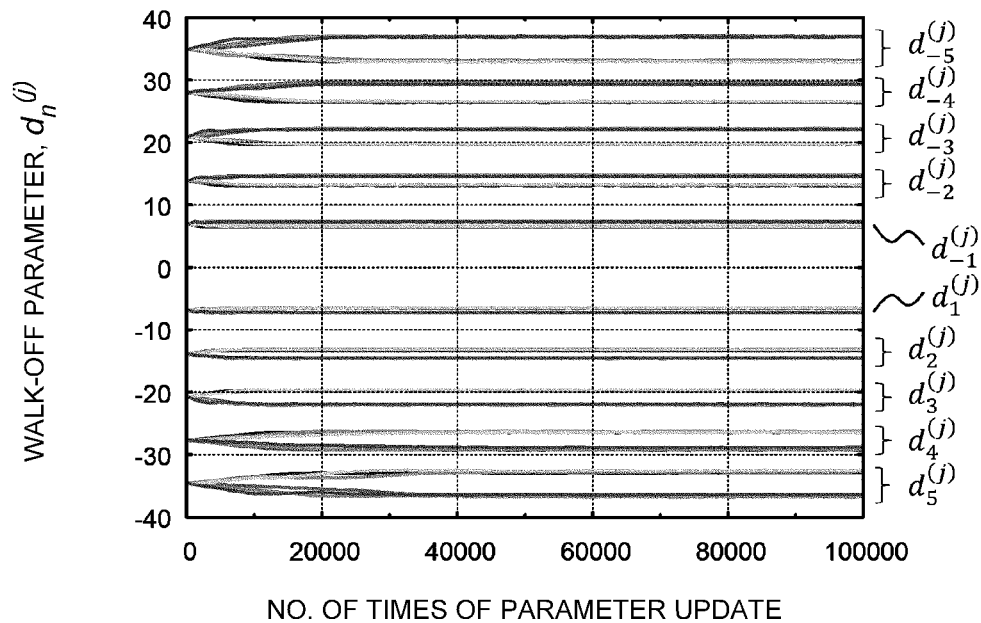
FIG. 16F is a diagram illustrating a change of a walk-off parameter $d_n^{(j)}$ with respect to the number of times of parameter update.
Figure 16G:
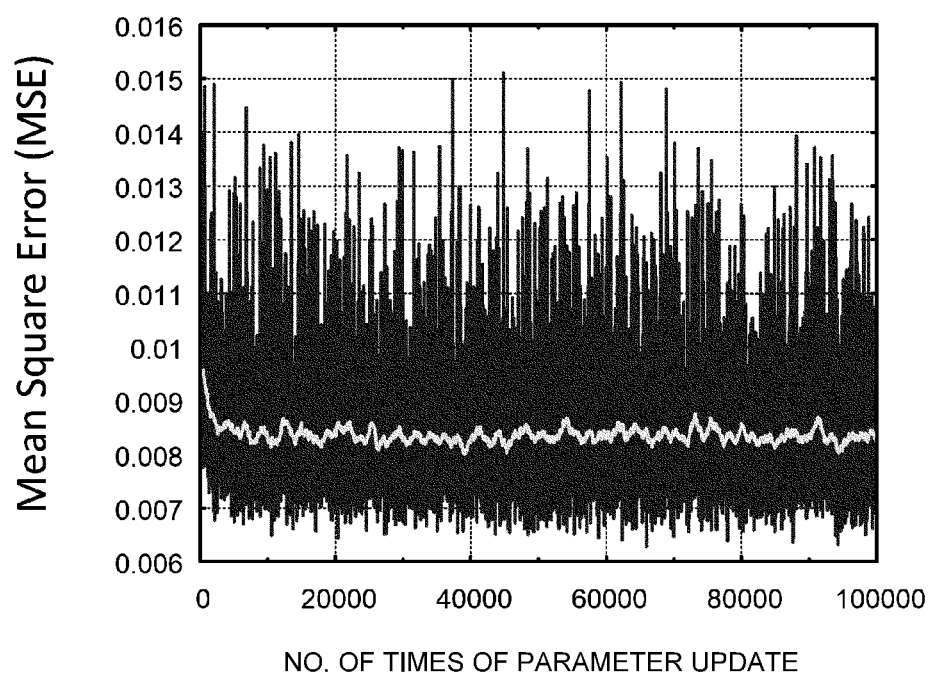
FIG. 16G is a diagram illustrating a change of a Mean Squared Error (MSE) and a moving average of the MSE with respect to the number of times of parameter update.
Figure 17:
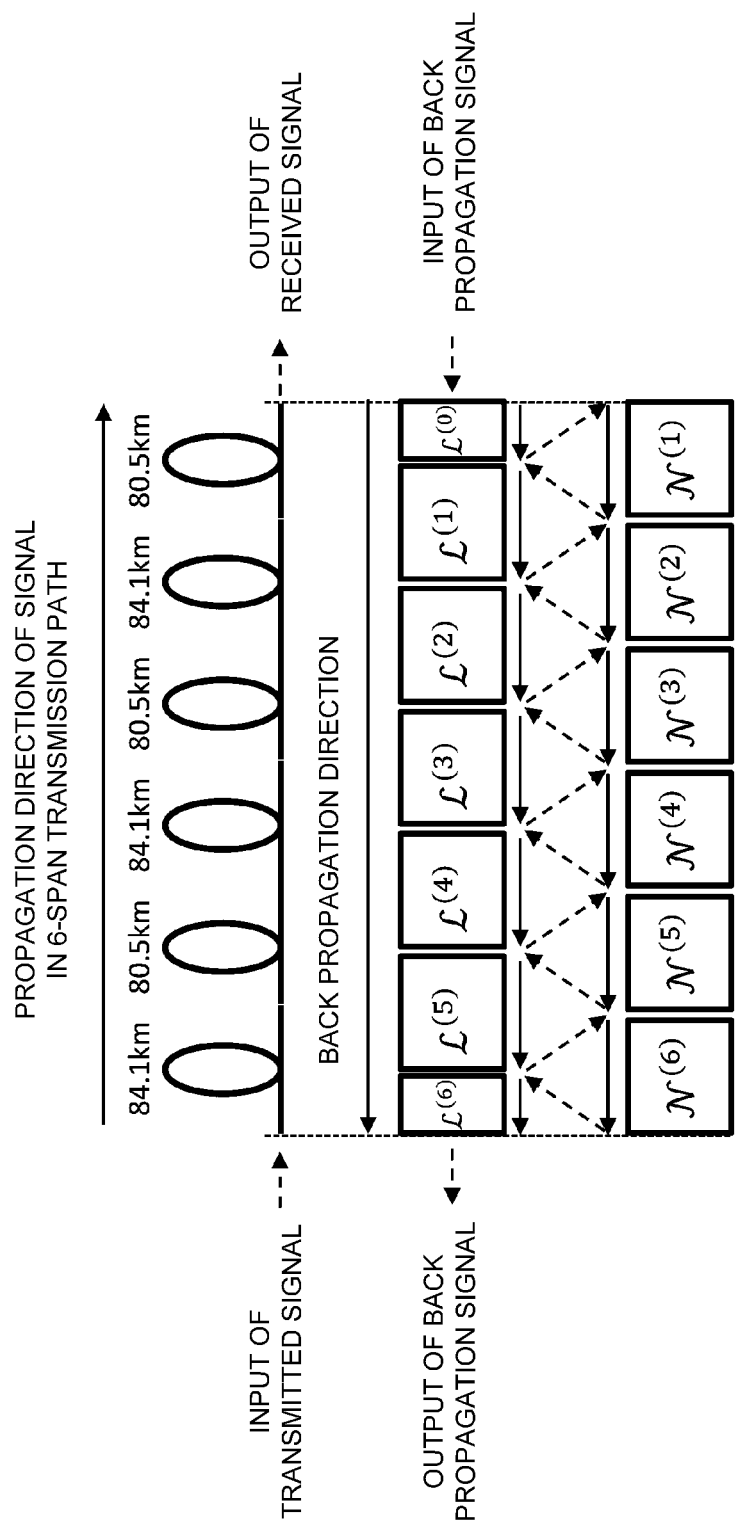
FIG. 17 is a schematic diagram illustrating an optical fiber connection situation of a six-span transmission line, and a back propagation calculation order.
Figure 18A:
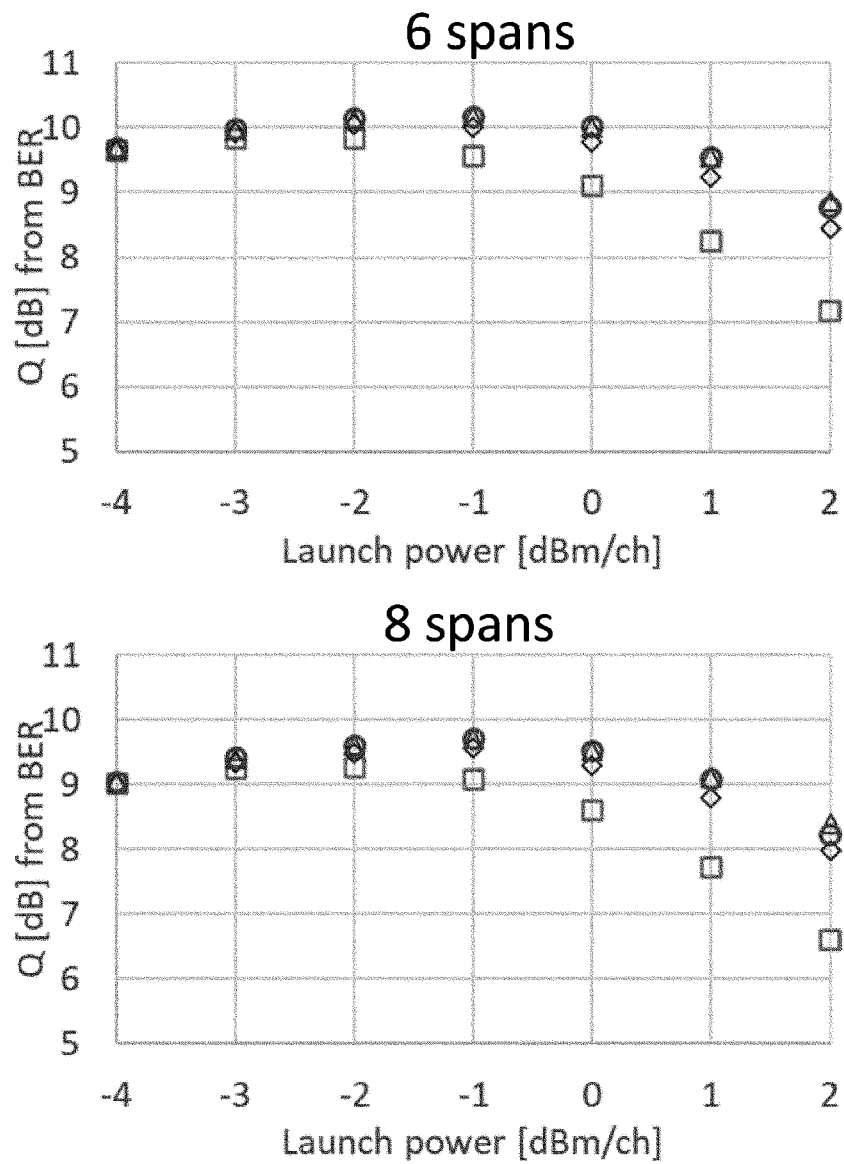
FIG. 18A is a diagram illustrating signal quality with respect to launch power in a case where nonlinear waveform distortion correction was performed taking only SPM into account in a six-span transmission line and an eight-span transmission line.
Figure 18B:
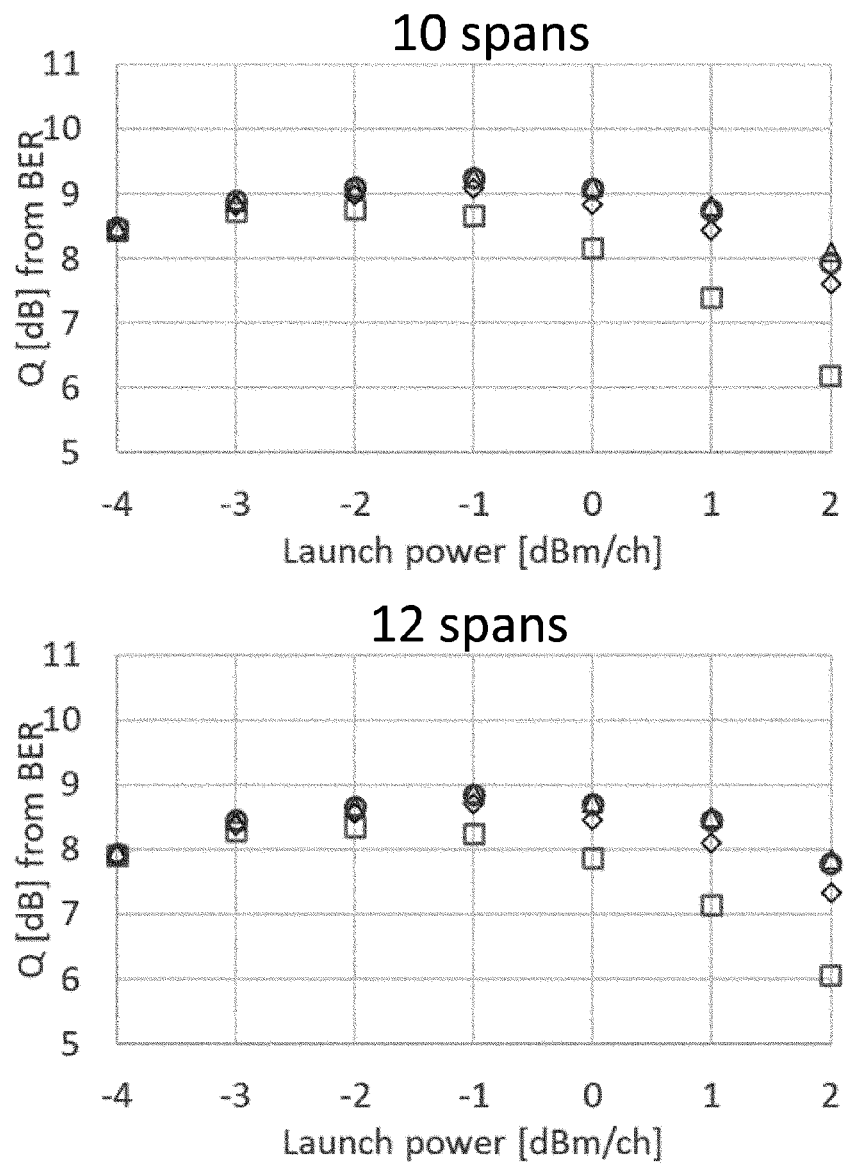
FIG. 18B is a diagram illustrating signal quality with respect to launch power in a case where nonlinear waveform distortion correction was performed taking only SPM into account in a 10-span transmission line and a 12-span transmission line.
Figure 18C:
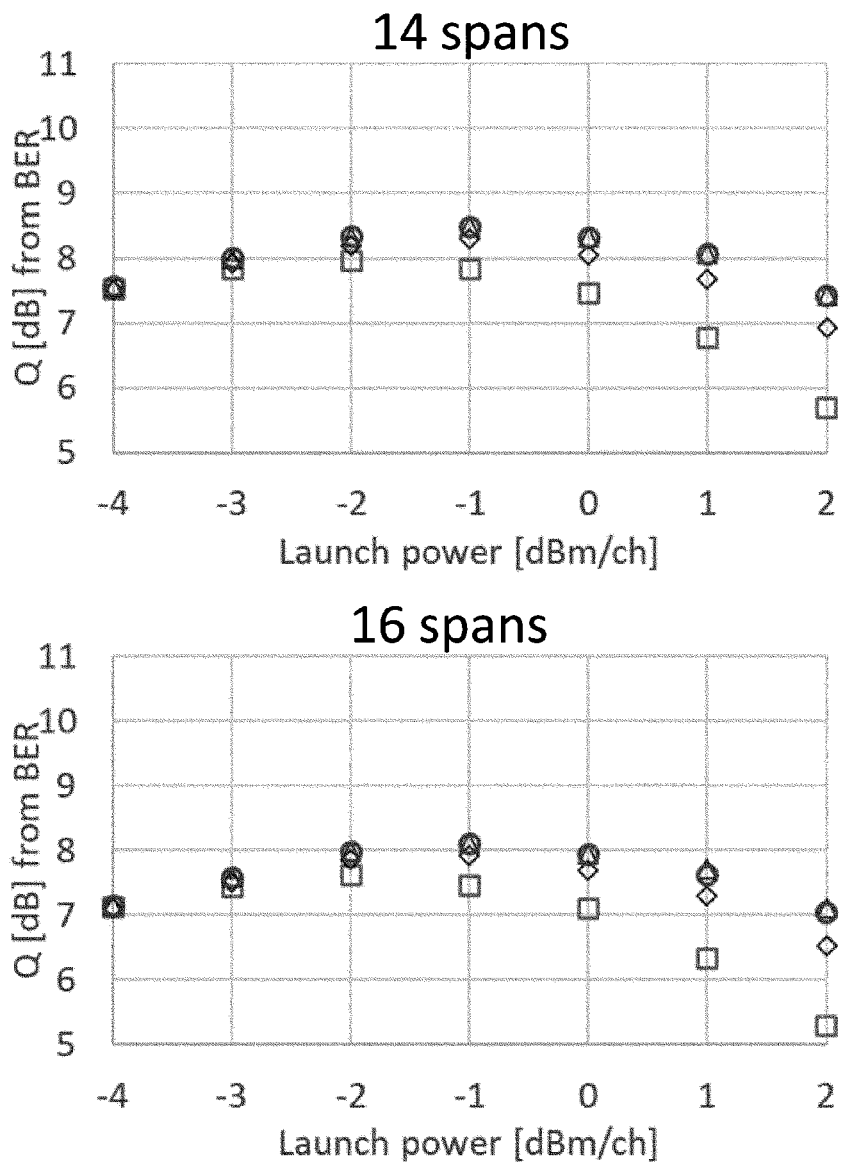
FIG. 18C is a diagram illustrating signal quality with respect to launch power in a case where nonlinear waveform distortion correction was performed taking only SPM into account in a 14-span transmission line and a 16-span transmission line.
Figure 19A:
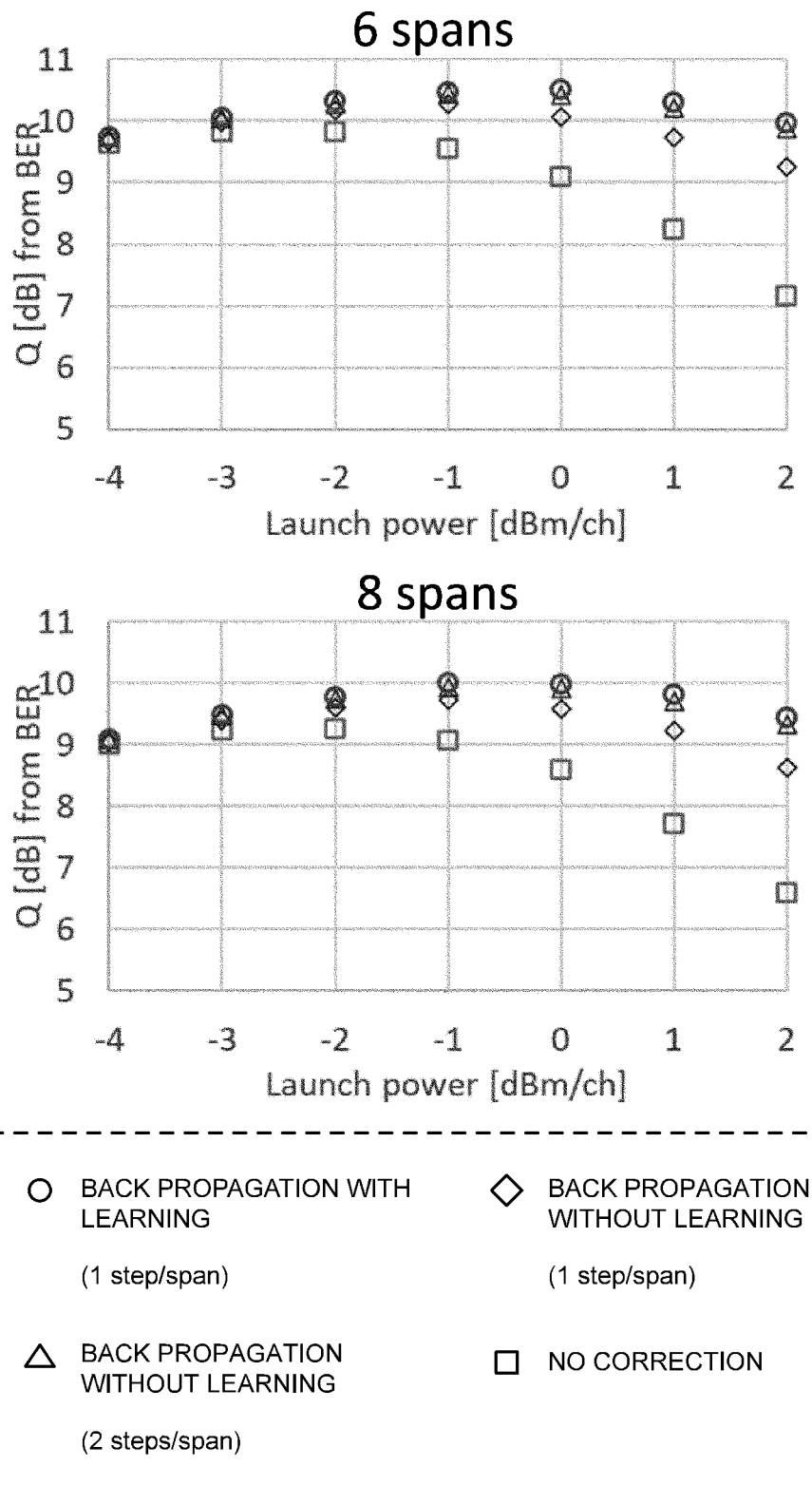
FIG. 19A is a diagram illustrating signal quality with respect to launch power in a case where nonlinear waveform distortion correction was performed taking SPM and XPM into account in a six-span transmission line and an eight-span transmission line.
Figure 19B:
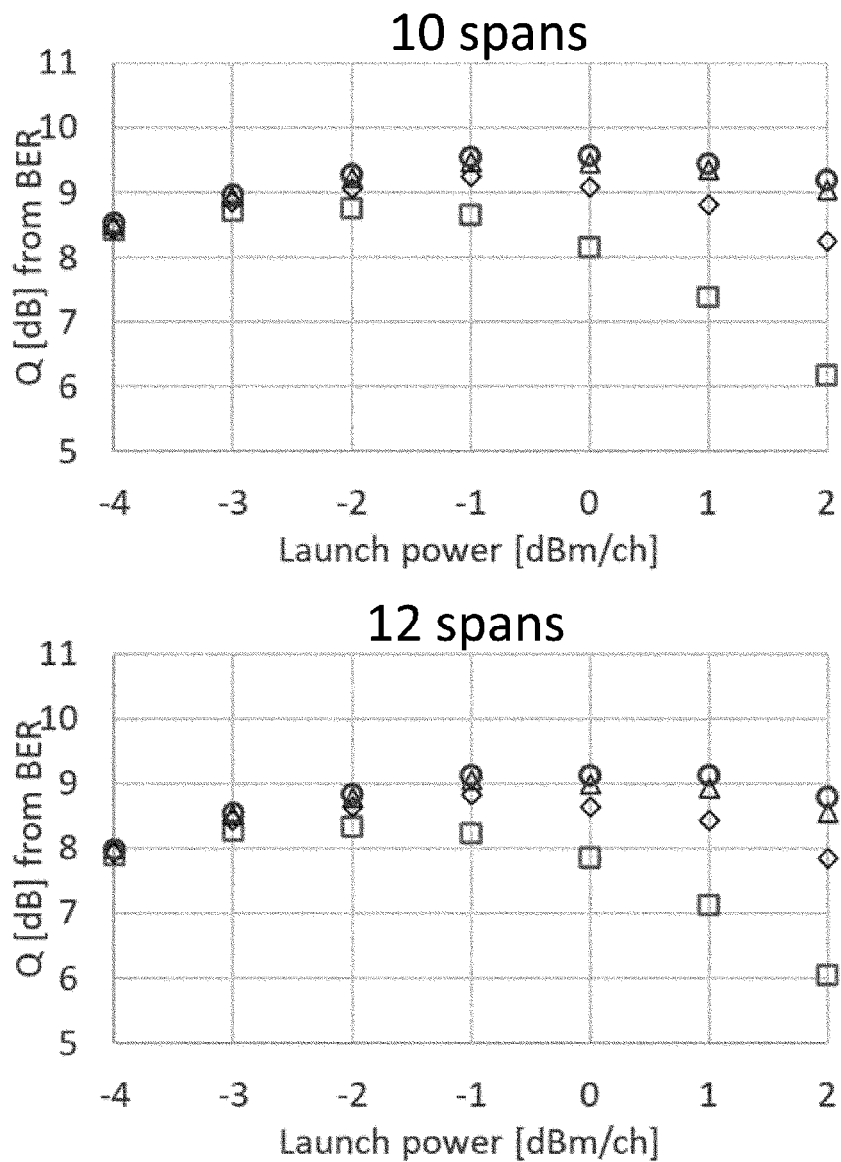
FIG. 19B is a diagram illustrating signal quality with respect to launch power in a case where nonlinear waveform distortion correction was performed taking SPM and XPM into account in a 10-span transmission line and a 12-span transmission line.
Figure 19C:
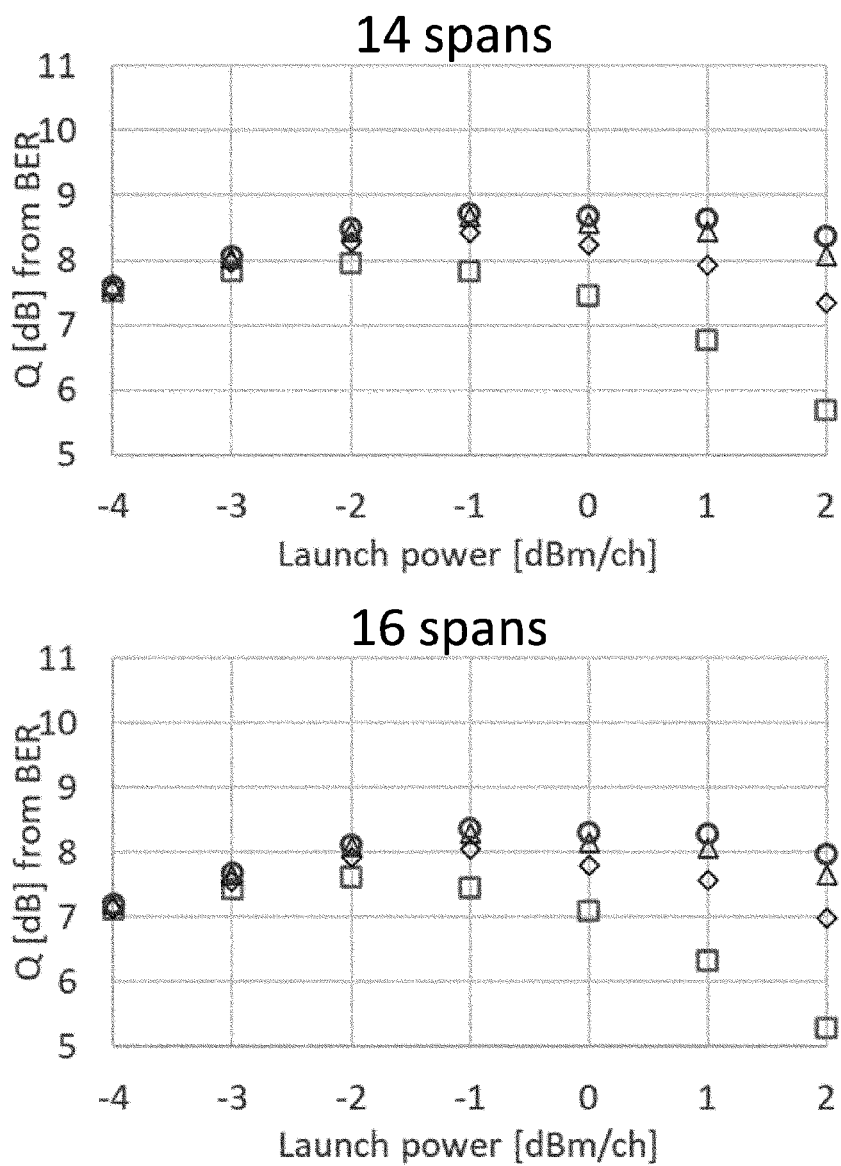
FIG. 19C is a diagram illustrating signal quality with respect to launch power in a case where nonlinear waveform distortion correction was performed taking SPM and XPM into account in a 14-span transmission line and a 16-span transmission line.
Figure 19C:
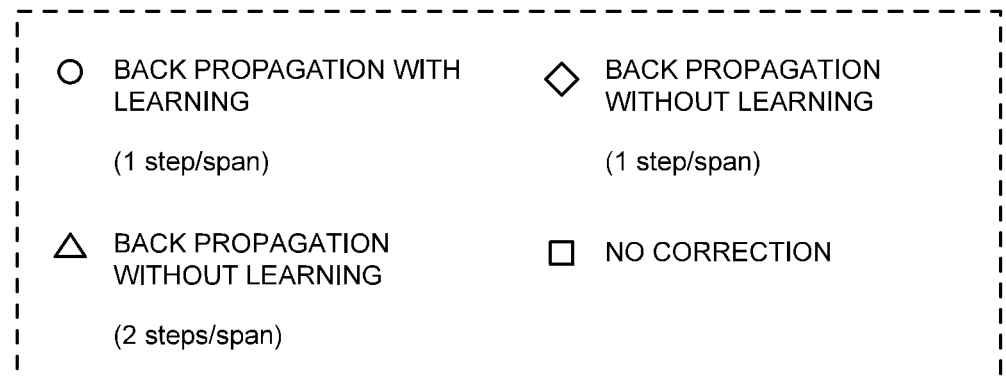

FIGS. 16A to 16G illustrate how various parameters are updated in a process of learning the transmission line parameters for the nonlinear waveform distortion correction that takes XPM compensation according to the embodiment into account under a back propagation condition of 1 step/span in a case where the number of transmission spans is six. Moreover, FIG. 17 illustrates as a schematic view how optical fibers constituting a six-span transmission line used for the experiment are connected, a fiber length of each span, and a calculation order of the linear step $L^{(j)}$ ($0 \leq j \leq 6$) and the nonlinear step $N^{(j)}$ ($1 \leq j \leq 6$) in the back propagation calculation. According to results of FIGS. 16A to 16G, it is found that the transmission line parameters and signal quality converge after the parameters are updated a certain number of times. In FIGS. 16D and 16E, the walk-off parameters $d^{(j)}$−5 and $d^{(j)}$−1 converge to the substantially same value less than an initial value in case of j=1, 3, and 5, and converge to the substantially same value greater than the initial value in a case of j=2, 4, and 6. This is a result that the fact is reflected that the fiber whose length is 84.1 km and the fiber whose length is 80.5 km illustrated in FIG. 15 have slightly different dispersion characteristics. That is, this means that, although the walk-off parameter $d^{(1)}_n$ included in the nonlinear step $N^{(j)}$ ($1 \leq j \leq 6$) is a parameter corresponding to a group delay amount per unit distance of a signal whose channel number is n with respect to a signal of the center channel (number is n=0), and takes a value proportional to a dispersion slope value of the fiber, the parameters of the fiber that had a small dispersion slope value and whose length was 80.5 km in a case of j=1, 3, and 5, and the parameters of the fiber that had a large dispersion slope value and whose length was 84.1 km could be correctly learned. This suggests that, even in a real environment used in the experiment, the learning method proposed by the embodiment makes it possible to correctly learn the effective parameters for the nonlinear waveform distortion correction.

Figure 20:
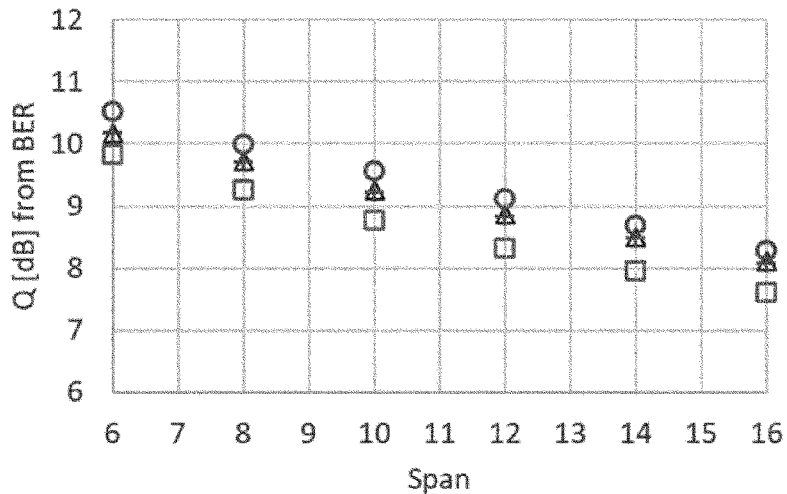
FIG. 20 is a diagram illustrating a change of signal quality with respect to a transmission span.

The learning was finished, and the transmission line parameters to perform the nonlinear waveform correction was performed were obtained for each number of transmission spans. An effect of the nonlinear waveform distortion correction for the PS-64-QAM signals of the 11 channels whose launch power range per channel was a range of −4 dBm to +2 dBm was tested based on these parameters. FIGS. 18A to 18C and 19A to 19C plot signal quality with respect to launch power per channel in a case of each number of transmission spans similar to FIGS. 8A, 8B, 9A, and 9B. Similar to the above-described simulation result, it is found that the signal quality is best in a case where the method of the nonlinear waveform distortion correction according to the embodiment is performed, that is, the back propagation calculation of 1 step/span is performed in which the nonlinear shift caused by the XPM that occurs between the channels is taken into account in addition to SPM that occurs in the channel and the parameters are optimized by the learning. Similar to FIG. 10, FIG. 20 plots a result of the signal quality with respect to the number of transmission spans according to whether or not the nonlinear waveform distortion correction is performed or per type, and the similar experiment result to the simulation result was obtained after all. As described above, the experiment result also represents that the effect according to the embodiment is obtained.

Hereinafter, a calculation amount required in a case where the nonlinear waveform distortion correction according to the embodiment is performed and a calculation amount required in a case where a conventional technique is used are compared to indicate that, under a condition of a certain number of channels or less, the calculation amount required for the method according to the embodiment is substantially the same as the calculation amount required for the conventional method. Note that the calculation amount in a case where the back propagation calculation is performed fixing the optimized parameters obtained by finishing the learning will be focused upon hereinafter, although the nonlinear waveform distortion correction according to the embodiment means that the waveform correction is performed by the back propagation calculation after learning optimized values of the transmission line parameters by using the gradient descent method in order to perform the back propagation calculation of 1 step/span while taking both of distortions caused by SPM and XPM into account. The calculation amount in this case is the same as that in a case of the back propagation calculation that takes XPM into account in 1 step/span, and does not perform the learning. Moreover, the conventional technique supposes that only the correction of the distortion caused by SPM is taken into account, the distortion caused by XPM is not corrected, and the back propagation calculation of 2 steps/span is performed. As a precondition for deriving the calculation amount, it is assumed that results of numerical parameters that can be fixed irrespectively of an input waveform are calculated in advance and stored in a Look-Up Table (LUT), and are read and used every time a different waveform is input, and the number of times of arithmetic operations necessary for that calculation itself is not taken into account.

The number of spans is put as S, a data length is put as N, the number of channels to be taken into account for calculation for XPM correction is put as C, and the number of times of calculation per channel and per polarization is calculated. A calculation load of the DSP is mainly a product arithmetic operation, and therefore the number of times of product arithmetic operations is calculated. Assuming that the number of times of product arithmetic operations of real numbers required for a product of complex numbers, $$a \times b = Re[a]Re[b] - Im[a]Im[b] + i(Re[a]Im[b] + Re[b]Im[a]),$$

is four, a total value of the numbers of times of product arithmetic operations of the real numbers is calculated. Furthermore, the number of times of product operations of complex numbers to perform FFT on a complex number signal whose size is $N=2^n$, is generally $N(\log_2 N-2)/2$, and therefore the number of times of production operations of the real numbers is $2N(\log_2 N-2)$ that is four times $N(\log_2 N-2)/2$.

First, a calculation amount required for expression (6) that is the linear step is estimated. Assuming that A~ represents a symbol with ~ above A, the number of times of product operations of real numbers to calculate $A\sim_{p,\,n}(0, \omega) = FA_{p,\,n}(0, t)$ is $2N(\log_2 N-2)$. A value of $\exp(-\alpha h/2 + i(D_2\omega^2 + D_{3\omega}^3 - T_n\omega))$ is irrelevant to an input waveform and therefore is stored in the LUT, and the number of times of product arithmetic operations of real numbers to multiply this value to $A\sim_{p,\,n}(0, \omega)$ is 4N. Lastly taking an arithmetic operation required for inverse FFT into account, a total number of times of production operations of real numbers for the entire linear step is $4N + 2 \times 2N(\log_2 N-2) = 4N(\log_2 N-1)$.

Next, the calculation amount required for calculation according to expressions (11) to (13) that are nonlinear steps is estimated. When the nonlinear phase shift amount φ, which is a real number, is obtained, the number of times of product operations of the real numbers required for calculation of $e^{i\varphi}$ is 6N in total, because, in following fourth-order Taylor expansion, 2N is required for calculation of $\varphi^2/2$, 2N is required for calculation of $(\varphi^2)^2/24$ by reusing a result of $\varphi^2$, and 2N is required for calculation of $\varphi^2 \times \varphi/6$.

[Mathematical 40]

$$e^{i\varphi} = 1 - \frac{1}{2}\varphi^2 + \frac{1}{24}(\varphi^2)^2 + i\left(\varphi - \frac{1}{6}\varphi^2 \times \varphi\right) \quad (40)$$

Moreover, the number of times of product operations of real numbers to calculate $B_{p,\,0}(0, t) \times e^{i\varphi}$ that is a product of complex numbers is 4N. Next, when phase shift $\varphi_{SPM}(t)$ caused by SPM is calculated according to expression (12), $P_{p,\,0}(t) = Re[B_{p,\,0}(t)]^2 + Im[B_{p,\,0}(t)]^2$ holds, therefore the number of times of product operations of real numbers is 2N, and, taking multiplication of a coefficient $gH_0$ into account, the number of times of product operations of real numbers is 3N in total. Furthermore, because N times of product operations is required when an intensity $P_{3-p,\,0}(t)$ of an orthogonal polarization component to be additionally supplied is multiplied with a coefficient $g\delta H_0$, the number of times of product operations of the real numbers to calculate $\varphi_{SPM}(t)$ is 4N in the end.

Next, a calculation amount required to calculate phase shift $\varphi_{XPM}(t)$ caused by XPM according to expression (13) is estimated. The intensity waveform $P_{p,\,0}(t)$ has already been obtained at a time when $\varphi_{SPM}(t)$ is calculated, and the number of times of product operations of the real numbers to calculate $P\sim_{p,\,0}(\omega)$ by applying FFT to this intensity waveform $P_{p,\,0}(t)$ is $2N(\log_2 N-2)$. $P\sim_{p,\,0}(\omega)$ does not appear in expression (13), yet needs to be supplied to perform the nonlinear waveform distortion correction of other channels, and therefore a calculation amount of $P\sim_{p,\,0}(\omega)$ is taken into account. On the other hand, assuming that $P\sim_{p,\,n}(\omega)$ in a case of n≠0, which appears in expression (13), is separately calculated and supplied, a calculation amount necessary therefor is not taken into account. When $P\sim_{p,\,n}(\omega)$ and $P\sim_{3-p,\,n}(\omega)$ are multiplied with 2 g and δg that are coefficients of real numbers, product arithmetic operations of real numbers need to be performed 2N times for each multiplication, that is, 4N times of product operations of real numbers is required in total. Assuming that $H_n(h, \omega)$ in expression (14) is stored in the LUT, the number of times of product operations of real numbers required to multiply a result of $2gP\sim_{p,\,n}(\omega) + \delta g P\sim_{3-p,\,n}(\omega)$ with $H_n(h, \omega)$ is 4N, and therefore the number of times of product operations of the real numbers required to obtain $H_n(h, \omega) \cdot 2gP\sim_{p,\,n}(\omega) + \delta_q P\sim_{3-p,\,n}(\omega))$ is 8N in total. This arithmetic operation is required for C-1 channels of n≠0, and therefore the number of times of product operations of the real numbers is 8N(C-1). Finally taking into account a calculation amount for applying inverse FFT, the calculation amount required to calculate $\varphi_{XPM}(t)$ is $2N(\log_2 N-2) + 8N(C-1) + 2N(\log_2 N-2) = 4N(\log_2 N + 2C - 4)$. In view of the above, the calculation amount in a case where $\varphi_{XPM}(t)$ is not taken into account for one nonlinear step is $6N + 4N + 4N = 14N$, and the calculation amount in a case where $\varphi_{XPM}(t)$ is taken into account to compensate XPM is $14N + 4N(\log_2 N + 2C - 4)$.

In the back propagation calculation where the number of steps per span is M in a transmission line whose number of spans is S, the number of linear steps is MS+1 in total, and the number of nonlinear steps is MS in total. The above-described result represents that the number of times of production operations of real numbers in a case where XPM compensation is not performed is as follows.

$$4N(\log_2 N-1) \times (MS+1) + 14N \times MS$$

The number of times of production operations of the real numbers in a case where XPM compensation is performed is as follows.

$$4N(\log_2 N-1) \times (MS+1) + \{14N + 4N(\log_2 N + 2C - 4)\} \times MS$$

Figure 21:
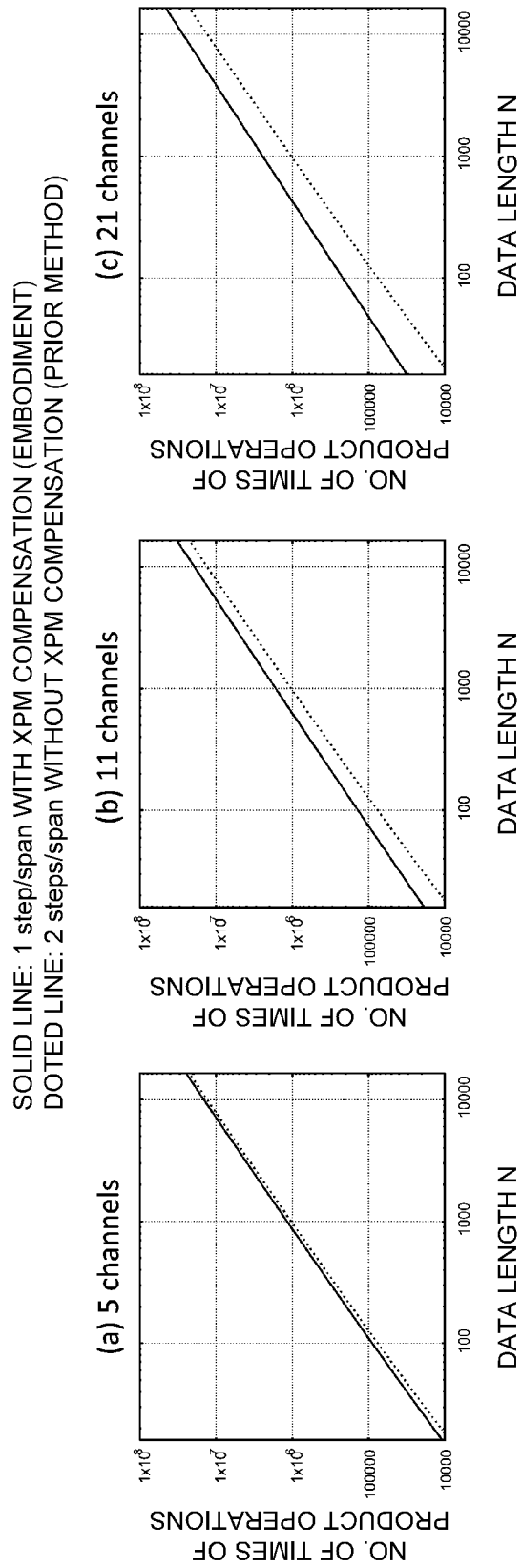
FIG. 21 is a diagram illustrating the number of product arithmetic operations with respect to a data length N in cases of five channels, 11 channels, and 21 channels.

FIG. 21 plots the number of times of production operations of real numbers with respect to the data length N in a case where the number of spans is S=10 and the number of channels is C=5, 11, and 21, and in a case where XPM compensation is performed for M=1 step/span as the present embodiment and in a case where XPM compensation is not performed for M=2 steps/span as the conventional scheme. In a case where the number of channels is five, the present embodiment can be carried out with the substantially same calculation amount as that of the conventional scheme. The calculation amount according to the present embodiment is greater than and is 1.6 times that of the conventional scheme in the case where the number of channels is 11, yet stays at the substantially same order of the calculation amount, so that, as indicated above by the simulation result in the case of the nine channels and the experiment result in the case of the 11 channels, it is possible to obtain a great nonlinear waveform distortion correction effect. In a case where the number of channels is 21, the calculation amount required for the present embodiment rises approximately 2.4 times that of the conventional scheme, yet stays at the same order still.

Although the embodiment of the present invention has been described above, the present invention is not limited to this. Although, for example, the example where the stochastic gradient descent method is used has been described, various variations of the gradient descent method are applicable. Furthermore, as described above, it may be possible to obtain a sufficient effect even by taking influences of both of SPM and XPM into account only for part of steps instead of taking the influences of SPM and XPM into account for all steps.

Note that the DSP includes an arithmetic operation unit and a memory. Furthermore, not only the DSP, but also another processor may execute the above-described processing. Furthermore, a program for causing the processor to execute the above-described processing is recorded in a non-volatile memory, and executed when commands included in the program is read out and executed by the processor at a time of execution. Furthermore, a dedicated circuit or a combination of the dedicated circuit and the DSP or the like may execute the above-described processing.

The aforementioned embodiments are summarized as follows.

A method for correcting optical waveform distortion, which relates to a first aspect in the present embodiments, is an optical waveform distortion correction method for correcting optical waveform distortion by estimating a waveform at a time of transmission by alternately calculating linear terms and nonlinear terms in a nonlinear Schrödinger equation after receiving an optical signal whose waveform shape changed by a nonlinear optical effect and a group velocity dispersion effect of an optical fiber that is a transmission line and digitizing a waveform of the received optical signal, characterized in that calculation is performed taking into account not only waveform distortion caused by self-phase modulation that occurs in a channel but also waveform distortion caused by cross-phase modulation that occurs between channels in a time of wavelength-division multiplexing transmission, parameters used for the calculation are optimized by a gradient descent method, and the number of steps per one span of the transmission line is less than 2. It is possible to improve the accuracy while suppressing a calculation load.

The aforementioned number of steps per one span of the transmission line may be equal to or less than 1. Even when the number of steps is reduced like this, it is possible to improve the accuracy.

Furthermore, the aforementioned parameters may include second-order group velocity dispersion, a nonlinear coefficient and walk-off.

A method for correcting optical waveform distortion, which relates to a second aspect in the present embodiment, includes (A) a step of optimizing, by a gradient descent method, a first parameter that is used in back propagation processing and is associated with cross-phase modulation and a second parameter that is used in the back propagation processing and is associated with self-phase modulation and the cross-phase modulation, wherein the back propagation processing is processing to estimate a waveform at a time of transmission by alternately calculating linear terms and nonlinear terms in a nonlinear Schrödinger equation after receiving an optical signal whose waveform shape changed in a transmission line and digitizing a waveform of the received optical signal, and correct, for each channel of plural channels in the transmission line at a time of wavelength-division multiplexing transmission, waveform distortion caused by the self-phase modulation (SPM) that occurs in the channel and waveform distortion caused by the cross-phase modulation (XPM) that occurs in relation with channels other than the channel; and (B) a step of executing the aforementioned back propagation processing by using the optimized first and second parameters.

As described above, by optimizing not only the second parameter (e.g., D2, D3, g, $\delta$, and $\alpha_0$) but also the first parameter (e.g., $\alpha_n$ and $d_n$) and executing the back propagation processing to correct the waveform distortion caused by the SPM and XPM by using the optimized first and second parameters, even when the calculation load is suppressed by decreasing the number of steps per one span of the transmission line, it becomes possible to obtain sufficient calculation accuracy.

Incidentally, the aforementioned waveform distortion caused by the cross-phase modulation may be corrected under approximation that an initial waveform is maintained for an intensity, independent of a propagation distance, and a delay proportional to the propagation distance occurs along a time axis. It is possible to further suppress the calculation load of the correction (also called compensation) by such approximation.

Furthermore, the aforementioned second parameter may include group velocity dispersion $D_2$ and a nonlinear coefficient g, and the aforementioned first parameter may include a walk-off parameter $d_n$. When limiting parameters to be optimized, it is possible to further suppress the calculation load.

The invention claimed is:

1. A method for correcting optical waveform distortion, comprising:

optimizing, by a gradient descent method, a first parameter that is used in back propagation processing and is associated with cross-phase modulation and a second parameter that is used in the back propagation processing and is associated with self-phase modulation and the cross-phase modulation, wherein the back propagation processing is processing to estimate a waveform at a time of transmission by alternately calculating linear terms and nonlinear terms in a nonlinear Schrödinger equation after receiving an optical signal whose waveform shape changed in a transmission line and digitizing a waveform of the received optical signal, and correct, for each channel of plural channels in the transmission line at a time of wavelength-division multiplexing transmission, waveform distortion caused by the self-phase modulation that occurs in the channel and waveform distortion caused by the cross-phase modulation that occurs in relation with channels other than the channel; and executing the aforementioned back propagation processing by using the optimized first and second parameters.

2. The method according to claim 1, wherein the waveform distortion caused by the cross-phase modulation is corrected under approximation that an initial waveform is maintained for an intensity, independent of a propagation distance, and a delay proportional to the propagation distance occurs along a time axis.

3. The method according to claim 1, wherein the second parameter comprises the group velocity dispersion $D_2$ and nonlinear coefficient g, and the first parameter comprises a walk-off parameter $d_n$.

4. An apparatus, comprising:
a memory; and
a processor coupled to the memory and configured to optimize, by a gradient descent method, a first parameter that is used in back propagation processing and is associated with cross-phase modulation and a second parameter that is used in the back propagation processing and is associated with self-phase modulation and the cross-phase modulation, wherein the back propagation processing is processing to estimate a waveform at a time of transmission by alternately calculating linear terms and nonlinear terms in a nonlinear Schrödinger equation after receiving an optical signal whose waveform shape changed in a transmission line and digitizing a waveform of the received optical signal, and correct, for each channel of plural channels in the transmission line at a time of wavelength-division multiplexing transmission, waveform distortion caused by the self-phase modulation that occurs in the channel and waveform distortion caused by the cross-phase modulation that occurs in relation with channels other than the channel.

5. An optical receiver, comprising:
a memory; and
a processor coupled to the memory and configured to execute back propagation processing by using a first parameter that is used in back propagation processing and is associated with cross-phase modulation and a second parameter that is used in the back propagation processing and is associated with self-phase modulation and the cross-phase modulation, wherein the back propagation processing is processing to estimate a waveform at a time of transmission by alternately calculating linear terms and nonlinear terms in a nonlinear Schrödinger equation after receiving an optical signal whose waveform shape changed in a transmission line and digitizing a waveform of the received optical signal, and correct, for each channel of plural channels in the transmission line at a time of wavelength-division multiplexing transmission, waveform distortion caused by the self-phase modulation that occurs in the channel and waveform distortion caused by the cross-phase modulation that occurs in relation with channels other than the channel, and
wherein the first and second parameters are optimized by a gradient descent method.

* * * * *